US011250528B2

(12) United States Patent
Li

(10) Patent No.: US 11,250,528 B2
(45) Date of Patent: *Feb. 15, 2022

(54) BLOCKCHAIN-BASED TRUSTED PLATFORM

(71) Applicant: Advanced New Technologies Co., Ltd., Grand Cayman (KY)

(72) Inventor: Zhiguo Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/714,455

(22) Filed: Dec. 13, 2019

(65) Prior Publication Data

US 2021/0049716 A1    Feb. 18, 2021

Related U.S. Application Data

(63) Continuation of application No. PCT/CN2019/100271, filed on Aug. 12, 2019.

(51) Int. Cl.
*H04L 29/00* (2006.01)
*G06Q 50/18* (2012.01)
(Continued)

(52) U.S. Cl.
CPC .............. *G06Q 50/18* (2013.01); *G06F 9/54* (2013.01); *H04L 9/0637* (2013.01);
(Continued)

(58) Field of Classification Search
CPC ......... G06Q 50/18; G06F 9/54; H04L 9/0637; H04L 9/0643; H04L 2209/56; H04L 2209/38; H04L 2209/127
See application file for complete search history.

(56) References Cited

U.S. PATENT DOCUMENTS 10,826,681 B1 * 11/2020 Dayan .................. H04L 9/3239
2014/0281523 A1    9/2014 Golino
(Continued)

FOREIGN PATENT DOCUMENTS

CN    109508984    3/2019
CN    109726597    5/2019
(Continued)

OTHER PUBLICATIONS

International Search Report and Written Opinion in PCT Appln. No. PCT/CN2019/100271, dated May 9, 2020, 8 pages.
(Continued)

*Primary Examiner* — Don G Zhao
(74) *Attorney, Agent, or Firm* — Fish & Richardson P.C.

(57) ABSTRACT

A blockchain-based trusted platform enhances trustworthiness of data generated by application programs that provide services, such as legal services. Included is an application layer having at least one blockchain-based application program configured to perform steps to provide a service, and a trusted service layer having a trusted timing module, a trusted identity module, and a trusted computing module. For each step of at least some of a plurality of steps, the application program is configured to obtain a verified time stamp from the trusted timing module and a verified identity from the trusted identity module, and/or obtain a computation result based on a processing of blockchain data using the trusted computing module. The trusted computing module records information about a corresponding step that is performed by the application program and the verified time stamp, the verified identity, and/or the computation result in a blockchain.

5 Claims, 21 Drawing Sheets

(51) Int. Cl.
 *G06F 9/54* (2006.01)
 *H04L 9/06* (2006.01)

(52) U.S. Cl.
 CPC ...... *H04L 9/0643* (2013.01); *H04L 2209/127* (2013.01); *H04L 2209/38* (2013.01); *H04L 2209/56* (2013.01)

(56) References Cited

U.S. PATENT DOCUMENTS

| | | |
|---|---|---|
| 2016/0364787 A1* | 12/2016 | Walker .................. H04L 9/0891 |
| 2017/0017958 A1 | 1/2017 | Golino |
| 2017/0331635 A1 | 1/2017 | Barinov et al. |
| 2017/0163733 A1* | 6/2017 | Grefen .................. H04L 9/3236 |
| 2017/0206532 A1* | 7/2017 | Choi ....................... G06Q 30/02 |
| 2017/0301033 A1 | 10/2017 | Brown et al. |
| 2018/0046766 A1 | 2/2018 | Deonarine et al. |
| 2018/0089436 A1 | 3/2018 | Smith et al. |
| 2018/0167198 A1* | 6/2018 | Muller .................... G06F 21/44 |
| 2018/0285839 A1 | 10/2018 | Fang et al. |
| 2018/0287780 A1* | 10/2018 | Safford .................. G06F 21/51 |
| 2019/0004789 A1* | 1/2019 | Mills ........................ G06F 8/36 |
| 2019/0043050 A1* | 2/2019 | Smith .................. G06Q 20/389 |
| 2019/0361842 A1* | 11/2019 | Wood ..................... H04L 9/3247 |
| 2020/0012527 A1* | 1/2020 | Hartsock ................ H04L 9/0894 |
| 2020/0067907 A1* | 2/2020 | Avetisov ................ H04L 9/3218 |
| 2020/0074464 A1* | 3/2020 | Trevethan ............. H04L 9/0637 |
| 2020/0082117 A1* | 3/2020 | Simmons .............. H04L 9/3247 |
| 2020/0186332 A1* | 6/2020 | Moeller .................. H04L 63/12 |
| 2020/0313890 A1* | 10/2020 | Mondello ............. H04W 4/023 |
| 2021/0073212 A1* | 3/2021 | Conley ............... G06F 16/2365 |

FOREIGN PATENT DOCUMENTS

| | | |
|---|---|---|
| CN | 110019216 | 7/2019 |
| WO | WO 2019120327 | 6/2019 |

OTHER PUBLICATIONS

Extended Search Report in European Application No. 19861258.2, dated Sep. 25, 2020, 7 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

BLOCKCHAIN-BASED TRUSTED PLATFORM

CROSS-REFERENCE TO RELATED APPLICATIONS

This application is a continuation of PCT Application No. PCT/CN2019/100271, filed on Aug. 12, 2019, which is hereby incorporated by reference in its entirety.

TECHNICAL FIELD

This specification relates to blockchain-based trusted platforms for enabling trusted digital transactions.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

Digital networks have enabled people around the world to find information and interact with each other conveniently and efficiently. For example, social media platforms allow people to easily share messages, photos, and videos with friends and colleagues. Online shopping web sites allow consumers to easily find information on a variety of products and send payments electronically to purchase products from businesses all over the world. News web sites provide users with up-to-date information about events happening around the world. Media platforms provide a large collection of music and movies for users to download or stream online. Users can search for legal services online. Ride hailing platforms allow riders to easily find and pay for transportation using mobile phones. As more people are connected to the Internet and more transactions are conducted digitally, the number of fraudulent online activities and disputes between parties of digital transactions also increase.

It would be desirable to allow users to submit evidence related to online digital transactions to court systems in a convenient manner.

SUMMARY

This specification describes technologies for enabling trusted transactions. These technologies generally involve: providing, by a blockchain-based trusted platform, a service to a user in a plurality of steps; for each step of the plurality of steps, performing at least one of obtaining a verified time stamp from a trusted timing module of the trusted platform, obtaining a verified identity from a trusted identity module of the trusted platform, or obtaining a computation result from a trusted computing module of the trusted platform; and recording data associated with the service provided to the user and at least one of the verified time stamp, the verified identity, or the computation result associated with the step in a blockchain.

This specification also describes technologies for facilitating service of processes. These technologies generally involve: receiving a request generated based on a blockchain-based application for delivering a notice associated with a legal action from a serving party to a party to be served, wherein the request comprises an identity associated with the serving party and an identity associated with the party to be served; determining that the serving party is a registered user of the blockchain-based application based on matching the identity of the serving party with an identity included in registration information of the serving party recorded on a blockchain; recording a time that the request is received on the blockchain; determining whether the party to be served is a registered user of the blockchain-based application based on the identity associated with the party to be served; in response to determining that the party to be served is a registered user, identifying one or more manners of delivering the notice based on available communication methods included in the registration information of the serving party and registration information of the party to be served; and delivering the notice to the party to be served based on at least one of the one or more manners.

This specification also describes technologies for legal documentation. These technologies generally involve: receiving a request for providing a service initiated from an account of a user associated with a blockchain-based application, wherein the request comprises an identity associated with the user; determining that the user is a registered user of the blockchain-based application based on matching the identity with an identity included in registration information of the user associated with the blockchain-based application and recorded on a blockchain; identifying one or more electronic forms to be filled out and submitted in a plurality of steps for providing the service; at each step of the plurality of steps: generating a unique identifier (ID) based on a time that the step is performed and digital content on the electronic form at the time; recording the unique ID, the time, and the digital content on the blockchain; embedding the unique ID in the digital content at the time by changing one or more attributes associated with the digital content to be representative of the unique ID, wherein the embedding produces information-embedded digital content that enables retrieval of the time and the digital content from the blockchain based on the unique ID; and recording the information-embedded digital content to the blockchain.

This specification also describes technologies for dispute resolution. These technologies generally involve: at a blockchain-based application, receiving a request for resolving a dispute between at least a first party and a second party, wherein the request comprises a first identity associated with the first party and a second identify associated with the second party; determining that the first party and the second party are registered users of the blockchain-based application based on matching the first identity with an identity included in registration information of the first party recorded on a blockchain and matching the second identity with an identity included in registration information of the second party recorded on the blockchain; recording a time that the request is received on the blockchain; receiving one or more potential dispute solutions from one or more dispute solution providers that are registered on the blockchain-based application; receiving a first selection from the first party and a second selection from the second party, wherein the first selection comprises a first set of the one or more potential dispute solutions and the second selection comprises a second set of the one or more potential dispute solutions; recording a time that the first selection is received on the blockchain and a time that the second selection is received on the blockchain; and determining at least one of (i) at least one common potential dispute solution between the first set of the one or more potential dispute solutions and the second set of the one or more potential dispute solutions, or (ii) that none of the potential dispute solutions are acceptable to the first and second parties.

This specification also describes technologies for handling court ordered judgment. These technologies generally involve: receiving a request associated with an account of a blockchain-based application for collecting a monetary award issued in an order of a court, wherein the request comprises an identity associated with the account; determining, by a trusted identity module, that the order is authentic based on matching with a hash value associated with the order recorded on a blockchain; recording, by a trusted timing module, a first verified time stamp representing a time the request is received on the blockchain; invoking the trusted computing module to determine, based on parsing the order, a creditor of the monetary award, a debtor of the monetary award, and an amount of the monetary award; determining, based on the trusted identity module, that the account is associated with the creditor based on the identity and registration information of the account recorded on the blockchain; invoking the trusted computing module to identify, based on the registration information, a payment account of the creditor and one or more payment accounts of the debtor with an aggregated balance greater than or equal to the amount of the monetary award; invoking the trusted computing module to transfer the amount of the monetary award from the one or more payment accounts of the debtor to the payment account of the creditor; and recording, by the trusted timing module, a second verified time stamp representing a time the amount of the monetary award is transferred.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
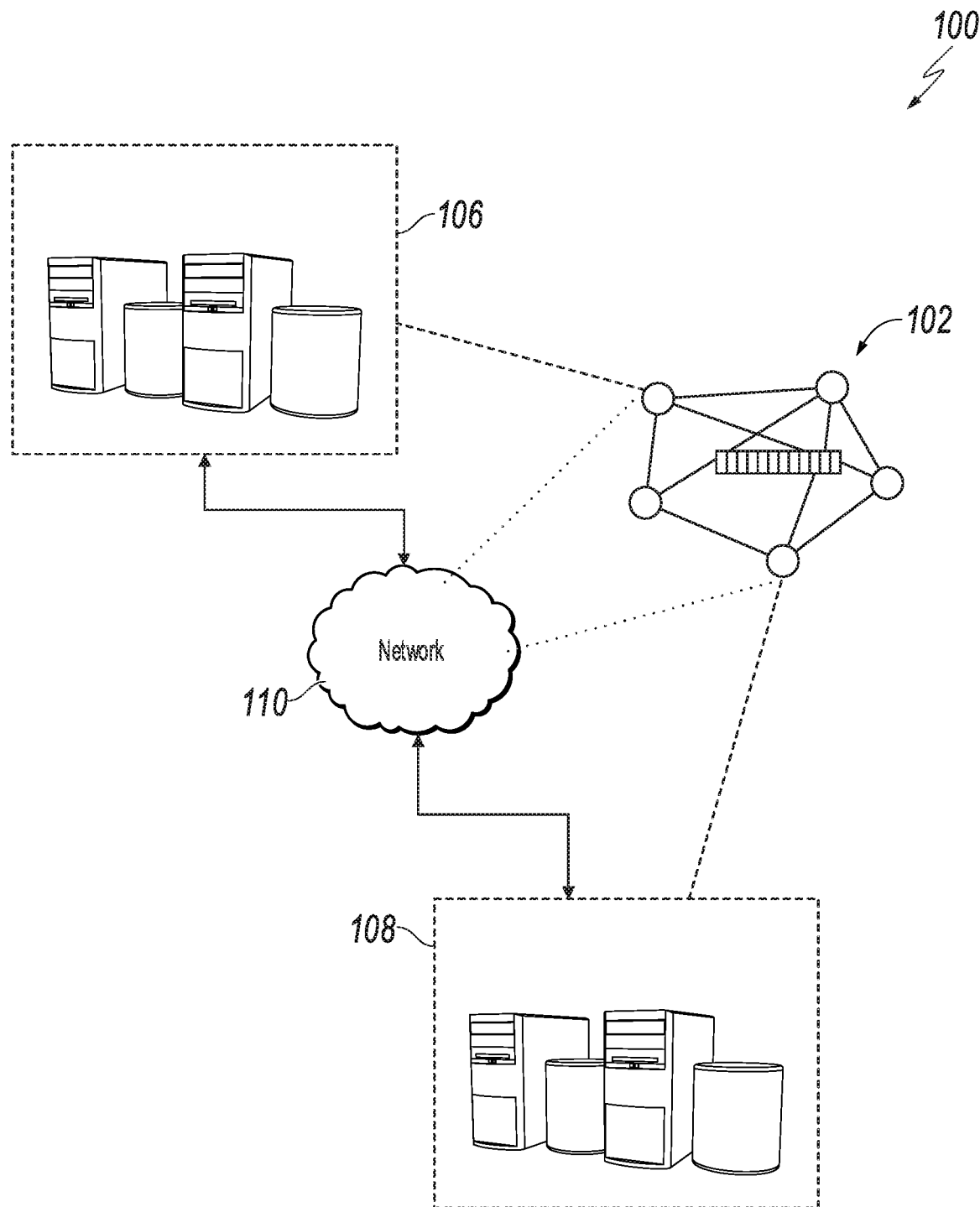
FIG. 1 is a diagram illustrating an example of an environment that can be used to execute embodiments of this specification.

This specification describes technologies for enabling trusted transactions. These technologies generally involve: providing, by a blockchain-based trusted platform, a service to a user in a plurality of steps; for each step of the plurality of steps, performing, based on a processing of blockchain data using a trusted computing module of the trusted platform, at least one of obtaining a verified time stamp from a trusted timing module of the trusted platform, obtaining a verified identity from a trusted identity module of the trusted platform, or obtaining a computation result, and recording data associated with the service provided to the user and at least one of the verified time stamp, the verified identity, or the computation result associated with the step.

This specification also describes technologies for facilitating service of processes. These technologies generally involve: receiving a request generated based on a blockchain-based application for delivering a notice associated with a legal action from a serving party to a party to be served, wherein the request comprises an identity associated with the serving party and an identity associated with the party to be served; determining that the serving party is a registered user of the blockchain-based application based on matching the identity of the serving party with an identity included in registration information of the serving party recorded on a blockchain; recording a time that the request is received on the blockchain; determining whether the party to be served is a registered user of the blockchain-based application based on the identity associated with the party to be served; in response to determining that the party to be served is a registered user, identifying one or more manners of delivering the notice based on available communication methods included in the registration information of the serving party and registration information of the party to be served; and delivering the notice to the party to be served based on at least one of the one or more manners.

This specification also describes technologies for legal documentation. These technologies generally involve: receiving a request for providing a service initiated from an account of a user associated with a blockchain-based application, wherein the request comprises an identity associated with the user; determining that the user is a registered user of the blockchain-based application based on matching the identity with an identity included in registration information of the user associated with the blockchain-based application and recorded on a blockchain; identifying one or more electronic forms to be filled out and submitted in a plurality of steps for providing the service; at each step of the plurality of steps: generating a unique identifier (ID) based on a time that the step is performed and digital content on the electronic form at the time; recording the unique ID, the time, and the digital content on the blockchain; embedding the unique ID in the digital content at the time by changing one or more attributes associated with the digital content to be representative of the unique ID, wherein the embedding produces information-embedded digital content that enables retrieval of the time and the digital content from the blockchain based on the unique ID; and recording the information-embedded digital content to the blockchain.

This specification also describes technologies for dispute resolution. These technologies generally involve: at a blockchain-based application, receiving a request for resolving a dispute between at least a first party and a second party, wherein the request comprises a first identity associated with the first party and a second identify associated with the second party; determining that the first party and the second party are registered users of the blockchain-based application based on matching the first identity with an identity included in registration information of the first party recorded on a blockchain and matching the second identity with an identity included in registration information of the second party recorded on the blockchain; recording a time that the request is received on the blockchain; receiving one or more potential dispute solutions from one or more dispute solution providers that are registered on the blockchain-based application; receiving a first selection from the first party and a second selection from the second party, wherein the first selection comprises a first set of the one or more potential dispute solutions and the second selection comprises a second set of the one or more potential dispute solutions; recording a time that the first selection is received on the blockchain and a time that the second selection is received on the blockchain; and determining at least one of (i) at least one common potential dispute solution between the first set of the one or more potential dispute solutions and the second set of the one or more potential dispute solutions, or (ii) that none of the potential dispute solutions are acceptable to the first and second parties.

This specification also describes technologies for handling court ordered judgment. These technologies generally involve: receiving a request associated with an account of a blockchain-based application for collecting a monetary award issued in an order of a court, wherein the request comprises an identity associated with the account; determining, by a trusted identity module, that the order is authentic based on matching with a hash value associated with the order recorded on a blockchain; recording, by a trusted timing module, a first verified time stamp representing a time the request is received on the blockchain; invoking the trusted computing module to determine, based on parsing the order, a creditor of the monetary award, a debtor of the monetary award, and an amount of the monetary award; determining, based on the trusted identity module, that the account is associated with the creditor based on the identity and registration information of the account recorded on the blockchain; invoking the trusted computing module to identify, based on the registration information, a payment account of the creditor and one or more payment accounts of the debtor with an aggregated balance greater than or equal to the amount of the monetary award; invoking the trusted computing module to transfer the amount of the monetary award from the one or more payment accounts of the debtor to the payment account of the creditor; and recording, by the trusted timing module, a second verified time stamp representing a time the amount of the monetary award is transferred.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing device (not shown), or each computing device 106, 108 can be a separate cloud computing device including a number of computers interconnected by a network and functioning as a distributed processing system.

In the depicted example, the computing devices 106, 108 can each include any appropriate computing device that enables participation as a node in the consortium blockchain network 102. Examples of computing devices include, without limitation, a server, a desktop computer, a laptop computer, a tablet computing device, and a smartphone. In some examples, the computing devices 106, 108 host one or more computer-implemented services for interacting with the consortium blockchain network 102. For example, the computing device 106 can host computer-implemented services of a first entity (e.g., user A), such as a transaction management system that the first entity uses to manage its transactions with one or more other entities (e.g., other users). The computing device 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing devices 106, 108 provide nodes of the first entity, and second entity respectively, which participate in the consortium blockchain network 102.

Figure 2:
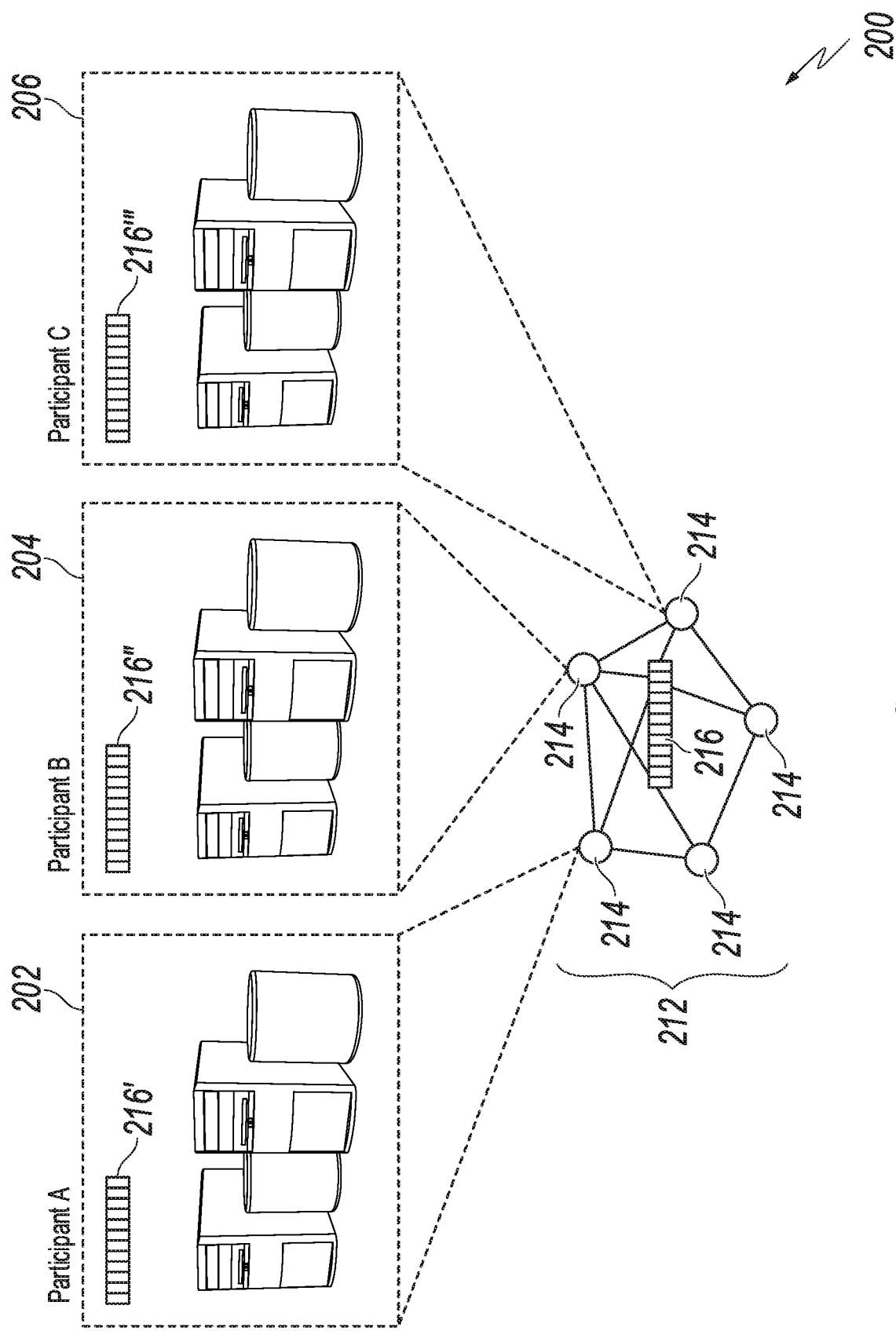
FIG. 2 is a diagram illustrating an example of an architecture in accordance with embodiments of this specification.

FIG. 2 depicts an example of an architecture 200 in accordance with embodiments of this specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216", and 216''' of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each of the consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data.

An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some embodiments, nodes of the blockchain network, and/or nodes that communicate with the blockchain network can operate using trusted execution environments (TEEs). At a high-level, a TEE is a trusted environment within hardware (one or more processors, memory) that is isolated from the hardware's operating environment (e.g., operating system (OS), basic input/output system (BIOS)). In further detail, a TEE is a separate, secure area of a processor that ensures the confidentiality, and integrity of code executing, and data loaded within the main processor. Within a processor, the TEE runs in parallel with the OS. At least portions of so-called trusted applications (TAs) execute within the TEE, and have access to the processor and memory. Through the TEE, the TAs are protected from other applications running in the main OS. Further, the TEE cryptographically isolates TAs from one another inside the TEE.

An example of a TEE includes Software Guard Extensions (SGX) provided by Intel Corporation of Santa Clara, Calif., United States. Although SGX is discussed herein by way of example, it is contemplated that embodiments of this specification can be realized using any appropriate TEE.

SGX provides a hardware-based TEE. In SGX, the trusted hardware is the die of the central processing until (CPU), and a portion of physical memory is isolated to protect select code and data. The isolated portions of memory are referred to as enclaves. More particularly, an enclave is provided as an enclave page cache (EPC) in memory and is mapped to an application address space. The memory (e.g., DRAM) includes a preserved random memory (PRM) for SGX. The PRM is a continuous memory space in the lowest BIOS level and cannot be accessed by any software. Each EPC is a memory set (e.g., 4 KB) that is allocated by an OS to load application data and code in the PRM. EPC metadata (EPCM) is the entry address for respective EPCs and ensures that each EPC can only be shared by one enclave. That is, a single enclave can use multiple EPCs, while an EPC is dedicated to a single enclave.

During execution of a TA, the processor operates in a so-called enclave mode when accessing data stored in an enclave. Operation in the enclave mode enforces an extra hardware check to each memory access. In SGX, a TA is compiled to a trusted portion, and an untrusted portion. The trusted portion is inaccessible by, for example, OS, BIOS, privileged system code, virtual machine manager (VMM), system management mode (SMM), and the like. In operation, the TA runs and creates an enclave within the PRM of the memory. A trusted function executed by the trusted portion within the enclave is called by the untrusted portion, and code executing within the enclave sees the data as plaintext data (unencrypted), and external access to the data is denied. The trusted portion provides an encrypted response to the call, and the TA continues to execute.

An attestation process can be performed to verify that expected code (e.g., the trusted portion of the TA) is securely executing within the SGX-provided TEE. In general, the attestation process includes a TA receiving an attestation request from a challenger (e.g., another node in the blockchain network, a key management system (KMS) of the blockchain network). In response, the TA requests that its enclave produce a remote-attestation, also referred to as a quote. Producing the remote-attestation includes a local-attestation being sent from the enclave to a so-called quoting enclave, which verifies the local-attestation, and converts the local-attestation into the remote-attestation by signing the local-attestation using an asymmetric attestation key. The remote-attestation (quote) is provided to the challenger (e.g., KMS of the blockchain network).

The challenger uses an attestation verification service to verify the remote-attestation. For SGX, Intel provides the Intel Attestation Service (IAS), which receives the remote-attestation from the challenger, and verifies the remote-attestation. More particularly, the IAS processes the remote-attestation, and provides a report (e.g., attestation verification report (AVR)), which indicates whether the remote-attestation is verified. If not verified, an error can be indicated. If verified (the expected code is securely executing in the TEE), the challenger can start, or continue interactions with the TA. For example, in response to the verification, the KMS (as challenger) can issue asymmetric encryption keys (e.g., a public-key and private-key pair) to the node executing the TEE (e.g., through a key exchange process, such as elliptical curve Diffie-Hellman (ECDH)) to enable the node to securely communicate with other nodes, and/or clients. Additional details of the TEE technology is described in, e.g., PCT application PCT/CN2019/081180, filed on Apr. 3, 2019, the contents of which are incorporated by reference.

The blockchain and TEE technologies described above can be used to generate highly reliable records related to online transactions. An online transaction typically involves multiple steps. Instead of generating a verified record of the end result of a transaction, such as generating a hash value of data generated at the end of the transaction, the novel systems described in this specification use data generated during multiple events that occurred throughout the multiple steps of the transaction to generate a record that can be used to verify the transaction. A verified record of the data derived from events associated with the multiple steps of a transaction is much more reliable than a verified record based on just the end result of the transaction. In some embodiments, for each piece of data that needs to be verified, not only is the piece of data itself verified, the process of generating the piece of data is also verified. The process of generating the piece of data may involve multiple steps, and each step of the process is verified. This ensures that the final piece of data is highly reliable because the probability that every step of the process has been fraudulently modified is very low. In some embodiments, a tool is provided for gathering evidence in the form of digital data. For each piece of evidence that needs to be verified, not only is the evidence itself verified, the process of collecting or generating the evidence is also verified. The process of collecting or generating the evidence may involve multiple steps, and each step of the process is verified. This ensures that the evidence collected or generated at the end of the process is highly reliable because the probability of someone fraudulently modifying the data in every step of the process is very low.

Figure 3:
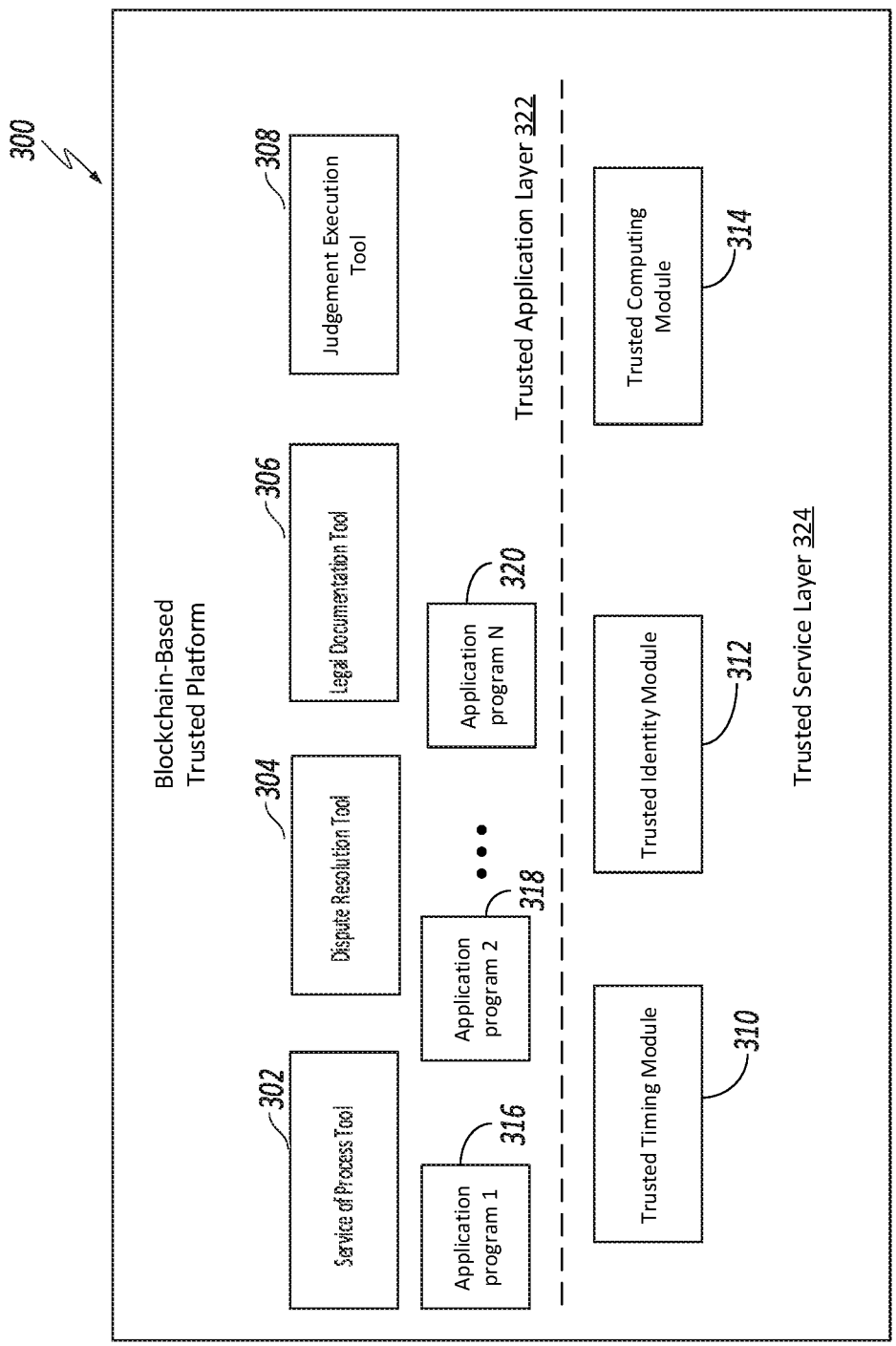
FIG. 3 is a diagram illustrating an example of a blockchain-based trusted platform in accordance with embodiments of this specification.

Referring to FIG. 3, this specification describes technologies for enabling a blockchain-based trusted platform 300 (which can be a trusted online platform) that enhances trust among users and provides various legal service or process tools to allow users to conduct legal proceedings, or transactions associated with legal services, in an efficient manner. The legal service tools provided by the blockchain-based trusted platform 300 include, e.g., a blockchain-based service of process tool 302, a blockchain-based dispute resolution tool 304, a blockchain-based legal documentation tool 306, and a blockchain-based judgement execution tool 308. The service of process tool 302 allows a plaintiff to serve notice (e.g., serve summons or other related documents) to a defendant digitally while complying with the legal requirements for service of process. The dispute resolution tool 304 allows two or more parties in dispute to find one or more potential (or candidate) solutions to the dispute from multiple dispute resolution providers (e.g., dispute mediators) in a convenient manner. The legal documentation tool 306 allows users to fill out and submit legal documents digitally in ways that comply with relevant legal requirements. The judgement execution tool 308 allows a plaintiff to execute a court ordered judgement, such as serving a bank levy court order to a defendant's bank digitally, in a way that complies with relevant legal requirements. The tools 302, 304, 306, and 308 are provided in a trusted application layer 322 of the trusted platform 300. The trusted platform 300 also includes a trusted service layer 324 that includes, e.g., a trusted timing module 310, a trusted identity module 312, and a trusted computing module 314 to support the operations of the various legal service tools in the trusted application layer 322.

Conducting legal transactions online in a digital manner has the advantage that the transactions can be performed quickly and efficiently in part because there is no need to fill out legal paper documents and send the legal paper documents by hand delivery or postal mail. However, the ephemeral nature of digital data also makes it difficult to authenticate or verify the transactions that have been completed digitally online in a manner that satisfies court evidentiary rules. Unlike a paper document in which modifying contents printed on the paper medium often leaves evidence of the modification, such as alterations to the paper fibers or ink molecules, modifying a digital document often does not leave any trace of modification. Furthermore, digital documents can be corrupted due to hardware errors, such as failure of storage systems such as magnetic disk drives, solid state drives, and/or memory devices. As a result, the contents of a digital document, the identity of the user associated with the digital document, and the timing associated with the digital document may be questionable.

There are techniques for authenticating a digital document exchanged between two parties, such as computing the hash value of the digital document and sharing the hash value with the two parties. There are techniques for authenticating the identities of parties associated with a digital document, such as using verified digital signatures. However, while such techniques are useful in authenticating the contents of individual documents and/or the identities of parties associated with the individual documents in limited situations, legal disputes often arise in situations in which no such agreed-upon hash values or verified digital signatures are available.

For example, party A (e.g., an author of a copyrighted material) accuses party B (e.g., an online publisher) of hosting web pages having contents that infringe the copyright of party A. Party A files a complaint with a court and submits to the court a copy of the web pages that allegedly include the copyright-infringing contents. Party B denies ever hosting such copyright-infringing material on the web pages and alleges that Party A modified the contents or the URL of the web pages used as evidence in support of the false accusation. Party A alleges that Party B modified the web pages published on the web site and removed the copyright-infringing contents after learning of the lawsuit. Party B alleges that the person who filed the complaint is not party A, but someone else who is not eligible to file the complaint. In this case, both the evidence and the identity of the party are in question. As another example, party C (e.g., a seller) alleges that party D (e.g., a buyer) placed an order for a product on an online flea market and never paid for the product. Party C files a complaint with the court and submits to the court a copy of the digital order. Party D denies ever placing the order and alleges that the order was placed by someone else who pretended to be party D. As yet another example, party E and party F negotiate an agreement, make several modifications to the earlier drafts of the agreement, and eventually sign a final version of the agreement. The entire process was completed online without exchanging any paper document. Later, party E files a complaint with the court alleging that party F did not comply with certain terms of the agreement. Party F states that it complied with all the terms of the agreement, and counterclaims that party E fraudulently modified the agreement after it has been signed digitally. Party E and party F produce two different versions of the final digitally signed agreement. Further to the example, Party F countersigned the agreement, but sent to a wrong e-mail address until discovered several days later before delivering to the correct e-mail address of Party E. Party E then relied on the delivery date to perform the agreement while Party F relied on the date the contract was countersigned. When the court receives the complaints mentioned above, it may be difficult for the court to properly adjudicate the disputes because of the difficulty verifying the authenticity of the evidence provided by the parties.

In some examples, the parties can hire lawyers to gather evidence and file affidavits with the court attesting the authenticity of the evidence. However, hiring and coordinating with lawyers can be expensive and time consuming. In some situations, events that are in dispute have already occurred, the relevant digital documents have already been altered, and even the lawyers have difficulty gathering relevant evidence.

The blockchain-based trusted platform 300 solves the problems described above by providing a suite of legal service application programs that utilize the functions of the trusted timing module 310, the trusted identity module 312, and the trusted computing module 314 to authenticate documents and/or identities of users in a manner that complies (or is more compliant compared with previous systems) with relevant evidentiary rules.

Some court systems and government agencies allow citizens to file legal complaints online. For example, the Internet Court in Hangzhou, China, accepts complaints and filings electronically and tries cases via livestreaming. The British Columbia Civil Resolution Tribunal is an online tribunal in Canada that resolves certain types of disputes online. For example, the trusted platform 300 can connect with the court systems and provide an integrated user interface so that users can file complaints and submit evidence to the court systems in a convenient manner.

In some embodiments, a novel feature of the blockchain-based trusted platform 300 is that the platform provides trusted time, trusted identity, and trusted computing to enable application programs that provide legal services to preserve verified records of information (e.g., who, what, and when) about events that occur during each of multiple steps or critical time points of the services in ways that comply (or are more compliant compared to previous systems) with evidentiary rules. These records can be added to a blockchain through consensus of blockchain nodes associated with legal, law enforcement, or dispute resolution authorities. Once added, the records become immutable and can be trusted by the court or the parties as evidence for the corresponding legal services or processes.

For example, there are tools that provide hash and digital signature functions to allow a user to digitally sign data so that other users can verify that the data has not been changed since it was signed, and to verify the identity of the user who signed the data. However, there is still a possibility that the digitally signed data contain errors, e.g., the data was corrupted or tampered with unbeknownst to the signer before the data was signed, or that the original digitally signed data was intercepted by a hacker during transmission and replaced with forged digitally signed data. Based on the digitally signed data alone, it may be difficult to prove or disprove the authenticity and accuracy of the data. Thus, it may be difficult to use the digitally signed data in legal proceedings without further proof, such as an affidavit from a notary or a licensed attorney attesting to the authenticity and accuracy of the data. A technical problem to be solved is how to increase the confidence level of data produced by online application programs that provide legal services.

The blockchain-based trusted platform 300 enhances the trustworthiness of data produced by an application program that provides a legal service over the network and reduces the probability of forgery or tampering by capturing snapshots of each of multiple steps (or at several critical time points) in the process of providing the legal service, each snapshot including information provided by the trusted timing module 310 and/or the trusted identity module 312, and storing the snapshots in a blockchain using the trusted computing module 314 to process the blockchain data. The snapshots can include, e.g., information such as who, when, and what associated with the events that occur during the corresponding steps or time points. The probability of forgery or tampering in every one of the multiple steps (or time points) becomes much smaller than the probability of forgery or tampering in a single step (or time point). The trusted time module 310 provides trusted or verified time stamps, the trusted identity module 312 provides trusted or verified identity information, and the trusted computing module 314 ensures trustworthiness of the data recorded in relevant blockchains.

In some embodiments, functions of the modules 310, 312, 314 can be invoked by one or more blockchain-based application programs or smart contract executed in a TEE. The TEE is hosted by one or more data processors isolated from the one or more data processors' operating system and is configured to provide enhanced confidentiality and integrity of code executing and data loading within the one or more data processors. In some examples, the application programs or smart contract can invoke the functions of the modules through an application program interface (API).

The blockchain-based trusted platform 300 produces a technical effect in which data related to the legal service provided by the legal service application program supported by the blockchain-based trusted platform 300 have a higher level of trustworthiness (compared with previous systems). The data verifying the identities of parties related to the legal service have a higher level of trustworthiness. The data verifying the actions performed by the parties have a higher level of trustworthiness. The data verifying the timing of events that occurred during the provision of the legal service have a higher level of trustworthiness. The data verifying the documents that were shown to, provided to, or edited by parties related to the legal service at each of multiple steps or time points have a higher level of trustworthiness. A highly reliable record of a history of transactions that occurred during the provision of the legal service, including a history of modifications to documents and responses from various parties, can be preserved.

In some embodiments, the trusted service layer 324 can include additional modules, such as a trusted positioning module, that provides a verified position indicating where a transaction occurred. For example, the trusted positioning module can be used to prove that an infringement action occurred in a certain geographical region, and that a complaint can be filed in the court that has jurisdiction. For example, the trusted positioning module can generate verified position information based on data provided by a verified GPS receiver connected to a client terminal 404 (FIG. 4).

The trusted platform 300 includes additional application programs, e.g., a first application program 316, a second application program 318, . . . , and an N-th application program 320 that utilize the functions of the trusted timing module 310, the trusted identity module 312, and the trusted computing module 314. The following describes an example in which the first application program 316 provides an "Internet evidence gathering web browser" 424 (FIG. 4) that can be used to collect evidence on the Internet.

Figure 4:
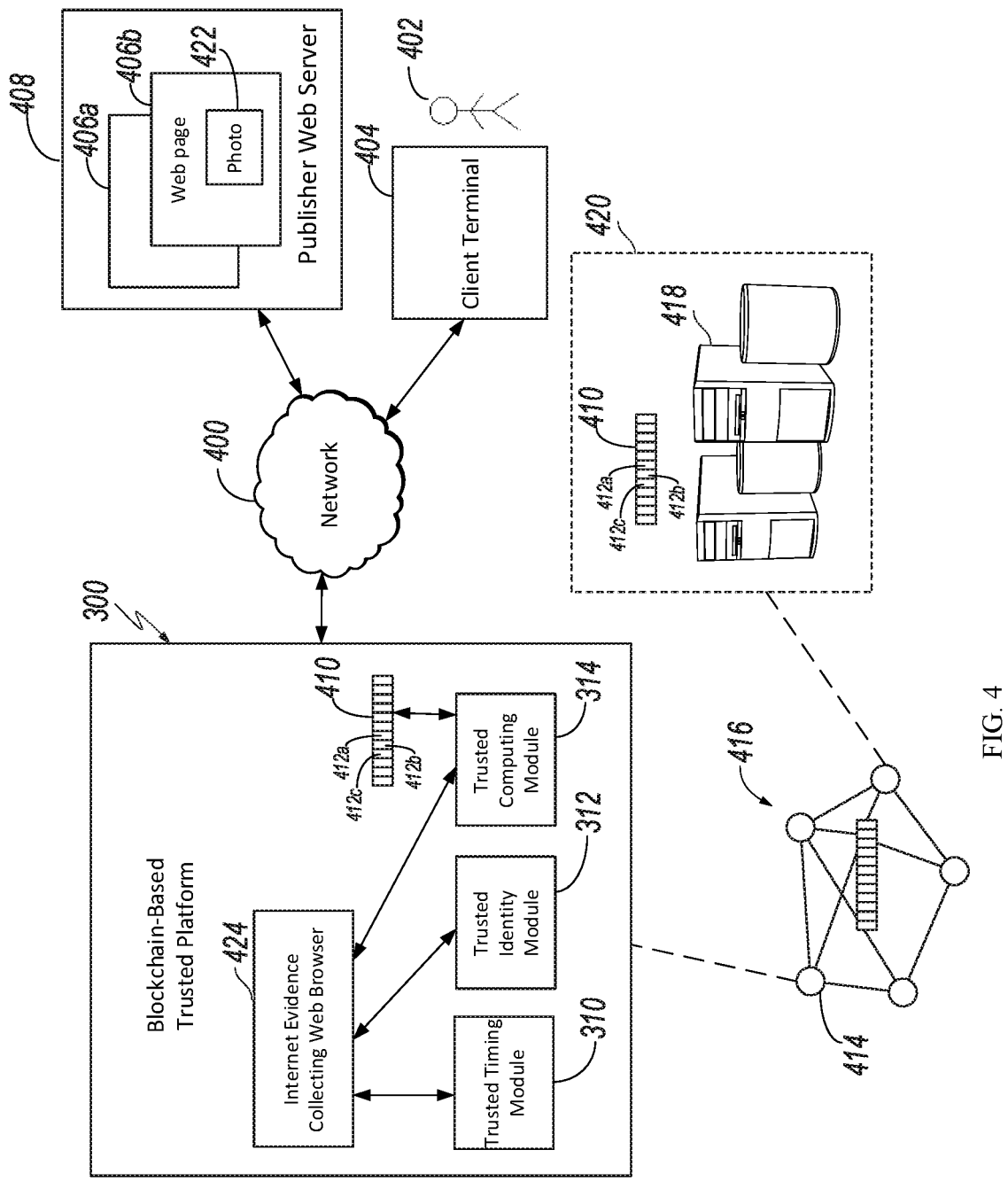
FIG. 4 is a diagram illustrating an example of a system for collecting evidence in accordance with embodiments of this specification.

Referring to FIG. 4, in some embodiments, the trusted platform 300 can be accessed through a network 400, such as the Internet. A user 402 accesses the trusted platform 300 using a client terminal 404, which can be, e.g., a mobile phone, a personal computer, or any computing device that can connect to the network 400. In some examples, the trusted platform 300 provides limited functions to users who have not registered with the platform 300. The platform 300 provides more (e.g., full) functions of the tools 302, 304, 306, 308, the application programs 316, 318, 320, and the modules 310, 312, 314 to users who have registered with the platform 300.

Upon registration with the platform 300, the user has a user identifier (ID) that is used to identify the user 402 when the user 402 uses the tools and services of the platform 300. Each registered user has an account associated with the platform 300 and can access the functions of the platform 300 after logging into the account. In some examples, the user can register with the platform 300 by providing personal information, such as a phone number and an e-mail address of the user. In some examples, the user can register with the platform 300 by providing biometric information, such as one or more fingerprints, one or more voiceprints, or iris information through a fingerprint sensor, a microphone, or an iris scanner communicably coupled to the modules 310, 312, 314. As the user accesses functions of the trusted platform 300, the user may provide additional information to the trusted platform 300, and the trusted platform 300 associates the additional information with the user account.

For example, the user 402 may provide a mobile phone number so that the user 402 can receive messages from the trusted platform 300 on a mobile phone. The user 402 may provide payment account information so that the user 402 can pay for services on the trusted platform 300. For example, the user account may include one or more of the following information that can be used to verify the identity of the user 402: (i) a mobile phone number, (ii) a credit card number, (iii) a user ID associated with an online payment system, (iv) a user ID associated with an online shopping account, (v) a user ID associated with a music streaming or downloading account, (vi) a user IDS associated with a movie streaming or downloading account, (vii) a user ID associated with a messaging or chat account, (viii) a user ID associated with an online banking account, (ix) a user ID associated with a ride hailing service, (x) a user ID associated with an online food ordering service, (xi) a social security number, (xii) a driver's license number, (xiii) a passport number, (xiv) a user ID associated with an online gaming service, (xv) an ID issued by a government entity, (xvi) one or more fingerprints, (xvii) one or more voiceprints, or (xviii) iris information.

In the example of FIG. 4, the user 402 accesses the Internet evidence collecting web browser 422 to search for and view web pages on the Internet 400. A client component (not shown in the figure) of the web browser executes at the client terminal 404 and provides a user interface for displaying the web pages to the user 402 and receiving the user's instructions for handling the web pages, such as clicks for controlling navigation among the web pages. Similarly, in some embodiments, when the user 402 accesses the tool 302, 304, 306, or 308, or the application program 318 or 320, a corresponding client component executes at the user terminal 404 and provides a corresponding user interface for interacting with the user 402.

For example, the user 402 uses the web browser 422 to access web pages 406 (including, e.g., web pages 406a and 406b) hosted on a web server 408 of a publisher. The user 402 may initially provide the URL of the home page of the publisher, and click on web links to browse the web pages hosed on the web server 408. In some embodiments, when the user 402 uses the Internet evidence collecting web browser 424 to browse web pages, the web browser 424 invokes the trusted identity module 312 to verify the identity of the user 402. For example, the trusted identity module 312 can use any number of information associated with the user account to verify the identity of the user 402. For example, the trusted identity module 312 can use one or more of the following information to verify the identity of the user 402: (i) a mobile phone number, (ii) a credit card number, (iii) a user ID associated with an online payment system, (iv) a user ID associated with an online shopping account, (v) a user ID associated with a music streaming or downloading account, (vi) a user ID associated with a movie streaming or downloading account, (vii) a user ID associated with a messaging or chat account, (viii) a user ID associated with an online banking account, (ix) a user ID associated with a ride hailing service, (x) a user ID associated with an online food ordering service, (xi) a social security number, (xii) a driver's license number, (xiii) a passport number, (xiv) a user ID associated with an online gaming service, (xv) an ID issued by a government entity, (xvi) one or more fingerprints, (xvii) one or more voiceprints, or (xviii) iris information.

For example, each time a pre-specified type of event occurs in connection with the use of the web browser 424 by the user 402, the web browser 424 invokes the trusted timing module 310 to obtain a verified time stamp regarding when the event occurred. The pre-specified type of events can include, e.g., receiving an input from the user 402, providing an output to the user 402, and performing a pre-specified type of action or computation. Receiving an input from the user 402 can include, e.g., receiving a URL of a web page, receiving a click command or a selection command from the user 402, receiving an edit command, such as a copy command, from the user 402, or receiving a file command, such as a save command, from the user 402. Providing an output to the user 402 can include, e.g., displaying the contents of a web page to the user 402, playing an audio file to the user 402, or playing a video file to the user 402.

Thus, each time an event occurs, in which the user 402 performs a pre-specified type of action, such as providing a URL to the web browser 424, clicking on a web link on the web page 406, copying text or images from the web page 406, or downloading content from the web page 406, the web browser 424 performs the action requested by the user 402 and also invokes the trusted timing module 310 to obtain a verified time stamp indicating a time when the action was performed or when the event occurred. The web browser 424 invokes the trusted computing module 314 to generate a snapshot of the event, in which the snapshot can be in the format of a record that includes the identity of the user 402, a description of the event (such as a description of the action that was performed), a verified time stamp indicating when the event occurred (such as when the action was performed), and information (e.g., URL) about the web page associated with the action. The trusted computing module 314 generates a hash value of the record, and adds a block that includes the record and the hash value to a blockchain 410 that stores records associated with the user 402.

For example, the following events may be associated with the browsing activities of the user 402.

a. Event 1: The user 402 provides a URL of a first web page 406a of the publisher to the web browser 424.
b. Event 2: The web browser 424 retrieves the first web page 406a from the web server 408 and shows the web page 406a to the user 402.
c. Event 3: The user 402 clicks on a link that points to a second web page 406b.
d. Event 4: The web browser 424 retrieves the second web page 406b from the web server 408 and shows the web page 406b to the user 402.
e. Event 5: The user 402 saves a photo 422 on the second web page 406b and writes a note: "Copyrighted photo found on publisher X's web page having URL xxx."
f. Event 6: The user 402 exits the web browser 424.

Upon the occurrence of each event, the web browser 424 invokes the trusted timing module 310 to obtain a verified time stamp indicating the time that the event occurred. The web browser 424 invokes the trusted computing module 314 to update the blockchain 410 to add a record having information about the event. In this example, a block 412a stores the record having information about event 1, block 412b stores the record having information about event 2, block 412c stores the record having information about event 3, and so forth.

The trusted platform 300 is associated with one of the nodes 414 of a blockchain network 416 in which the blockchain 410 is replicated across the blockchain network 416. For example, one of the nodes 414 can be associated with a computer server 418 of a court that maintains a version of the blockchain 410. If the user 402 files a complaint with the court alleging copyright infringement by the publisher of the web pages 406, a court staff can access the records in the blockchain 410 maintained at the court computer server 418 to retrieve information about the events 1 to 6 described above. The court staff can determine that the user 402 viewed the second web page 406b and saved the photo 422 from the second web page 406b with a note: "Copyrighted photo found on publisher X's web page having URL xxx." Because the records in the blockchain 410 has a high level of trustworthiness, the court accepts the information provided by the records in the blockchain 410 as evidence submitted by the user 402.

Figure 5:
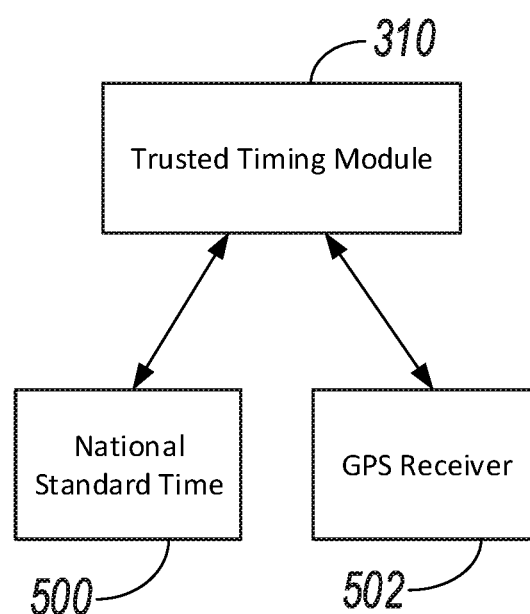
FIG. 5 is a diagram illustrating an example of a system for providing trusted timing in accordance with embodiments of this specification.

Referring to FIG. 5, in some embodiments, the trusted timing module generates verified time stamps based on the coordinated universal time (UTC) 500 that is distributed by a national standard institution, or timing information generated by a global positioning system (GPS) receiver 502 that derives the timing information from positioning systems such as the BeiDou Navigation Satellite System maintained by China, the Global Positioning System maintained by the United States, the Galileo global navigation satellite system maintained by the European Union, the Global Orbiting Navigation Satellite System (GLONASS) maintained by Russia, and/or the Quasi-Zenith Satellite System) maintained by Japan.

In some embodiments, the trusted platform 300 can be accessed by worldwide users located in many countries. Different countries may have different requirements or preferences regarding what timing information is acceptable as evidence in legal proceedings. For example, a court in Beijing may accept timing information derived from UTC time provided by the National Time Service Center, or timing information derived from the BeiDou Navigation Satellite System. A court in New York may accept timing information derived from UTC time provided by the National Institute of Standard and Technology or timing information derived from the U.S. Global Positioning System. The trusted platform 300 is configured to determine the legal jurisdiction in which a user resides, and use the timing reference acceptable to the corresponding court system when generating time stamps for the activities associated with the user. In some examples, the trusted platform 300 allows the user to select which timing reference to use.

Figure 6:
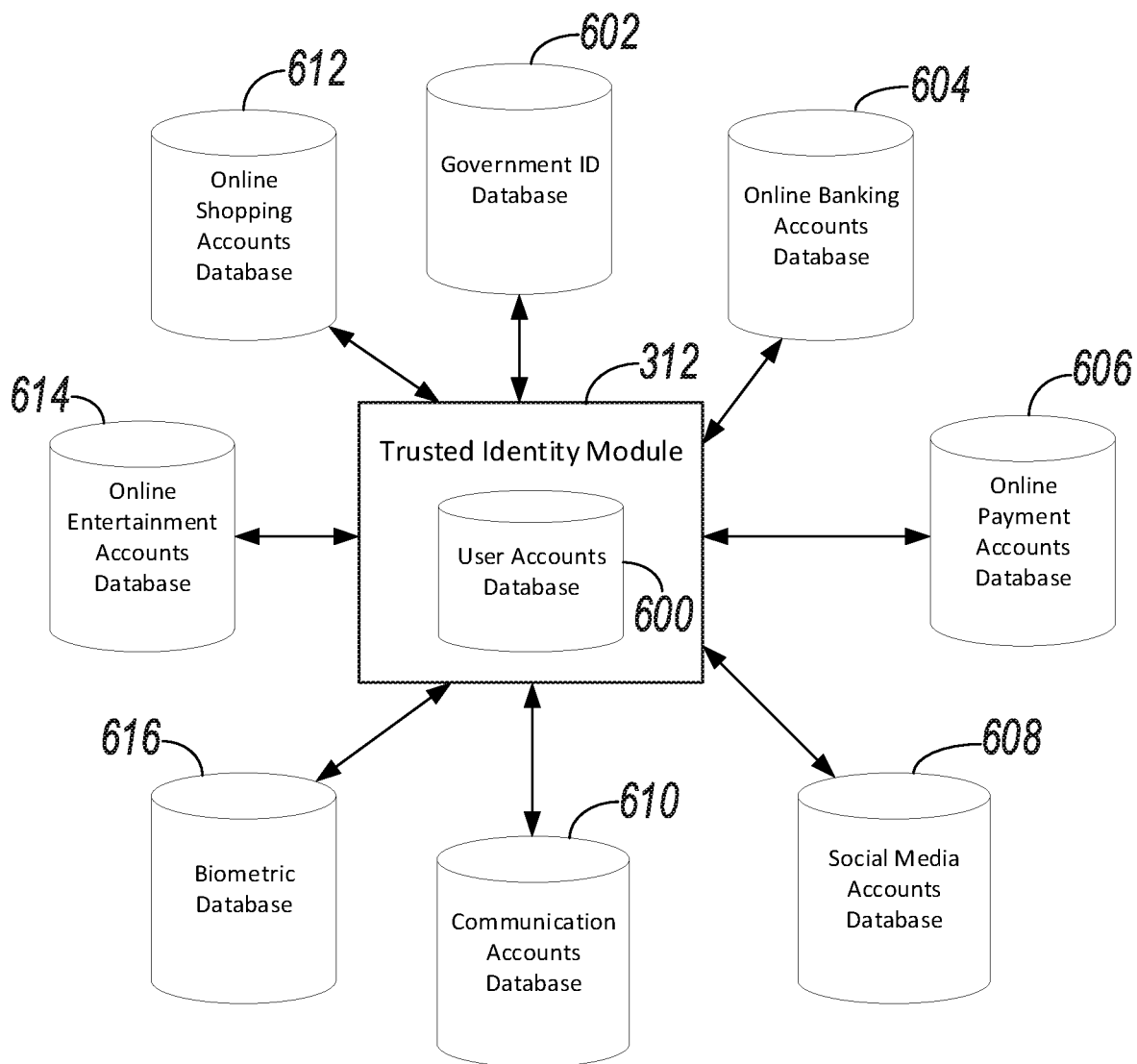
FIG. 6 is a diagram illustrating an example of a system for providing trusted identity in accordance with embodiments of this specification.

Referring to FIG. 6, in some embodiments, the trusted identity module 312 maintains a user account database 600 that includes information about registered users provided by the users themselves. The trusted identity module 312 also accesses other databases to verify the account information provided by the users. For example, the trusted identity module 312 can access a government ID database 602 to verify the accuracy of the government ID provided by the user. For example, if the trusted identity module 312 determines that the government ID provided by the user matches the name or phone number of another user listed in the government ID database 602, the trusted identity module 312 may generate an alert message indicating the possibility of fraudulent identity. The tool (e.g., 302, 304, 306, or 308) or application program (e.g., 316, 318, or 320) upon receiving the alert message from the trusted identity module 312 may request additional information from the user in order to verify the identity of the user.

In some embodiments, the trusted platform 300 may provide online banking services and maintain a database 604 of the accounts of the users who access the online banking services. The trusted platform 300 can provide online payment services, such as Alipay, that allow users to digitally pay for services provided on the trusted platform 300. The trusted platform 300 can maintain a database 606 of the accounts of the users who use the online payment services provided on the trusted platform 300. The trusted platform 300 can provide social media services that allow users to connect with family members, relatives, friends, colleagues, and/or fans. The trusted platform 300 can maintain a database 608 of the accounts of the users who use the social media services provided on the trusted platform 300. The trusted platform 300 can provide communication services, such as instant messaging or chat services, that allow users to communicate with other people. The trusted platform 300 can maintain a database 610 of the accounts of the users who use the communication services provided on the trusted platform 300. The trusted platform 300 can have contracts with mobile phone companies in which the mobile phone companies assist in verifying whether a mobile phone number and other account information provided by a user to the trusted platform 300 during registration match corresponding information registered with the mobile phone companies.

The trusted platform 300 can provide online shopping services that allow users to shop for products online. The trusted platform 300 can maintain a database 612 of the accounts of the users who use the online shopping services provided on the trusted platform 300. The trusted platform 300 can provide online shopping services that allow users to shop for products online. The trusted platform 300 can maintain a database 612 of the accounts of the users who use the online shopping services provided on the trusted platform 300. The trusted platform 300 can provide online entertainment services to allow users to listen to music or watch movies by downloading or streaming the music or movies. The trusted platform 300 can maintain a database 614 of the accounts of the users who use the online entertainment services provided on the trusted platform 300. The trusted platform 300 can maintain a biometric database 616 that stores biometric information, such as one or more fingerprints, one or more voiceprints, or iris information, provided by the users during registration.

In some embodiments, the various databases 600, 602, 604, 606, 608, 610, 612, 614, 616 can be maintained independently of one another. For example, a user can modify the information in the online banking account without modifying the information in the online shopping account. A user may update information in different accounts at different periods of time. The same user can use different user names or aliases for different services. Multiple users can share the same account, e.g., family members may share the same movie streaming account. The same user can open multiple accounts with a service, e.g., a user can have multiple mobile phone numbers, e-mail addresses, and/or messaging IDs. Thus, based on the information of a single database, it may not be sufficient to accurately verify the identity of a user. However, by combining information from multiple databases, the identity of the user can be more reliably verified.

A feature of the trusted platform 300 is that the trusted identity module 312 attempts to verify the identity of the user using multiple databases, thus increasing the trustworthiness of the verified identity information provided by the trusted identity module 312. The trusted identity module 312 can access one or more of the government ID database 602, the online banking accounts database 604, the online payment accounts database 606, the social media accounts database 608, the mobile communication accounts database 610, the online shopping accounts database 612, the online entertainment accounts database 614, and the biometrics database 616 as part of the process of verifying the identity of the user. For example, if the name and e-mail address provided by the user during registration do not match those in the online banking accounts database 604 and/or the online payment accounts database 606, the trusted identity module 312 may generate an alert message indicating the possibility of fraudulent identity, and the trusted platform 300 may request additional information from the user in order to verify the identity of the user.

In some embodiments, when a tool or application program invokes the trusted identity module 312 to verify the identity of a user, the tool or application program sends the ID and other information of the user to the trusted identity module 312, and the trusted identity module 312 compares the ID and other information of the user provided by the tool or application program with the user information stored in the user accounts database 600 and the other databases 602, 604, 606, 608, 610, 612, 614, and 616. If the user information provided by the tool or application program is consistent with the user information stored in the databases, the trusted identity module 312 verifies the identity of the user. On the other hand, if the user information provided by the tool or application program is inconsistent with the user information stored in one or more of the databases, the trusted identity module 312 generates an alert message indicating that the identity of the user cannot be verified.

In some embodiments, the trusted identity module 312 can generated a trust score along with the verified identity. For example, if a user accesses one of the tools or application programs on the trusted platform 300, and the accounts associated with the user have been inactive for many years, the trusted identity module 312 can generate a low trust score for the identity of the user because the stale data in the databases may not be entirely accurate. On the other hand, if a user is very active on the trusted platform 300, uses many services provided by the trusted platform 300, and account information in the majority or all the databases associated with the user are consistent with one another, the trusted identity module 312 can generate a high trust score for the identity of the user because there is a low probability that the account information in the majority or all of the databases are consistently fraudulent.

Figure 7:
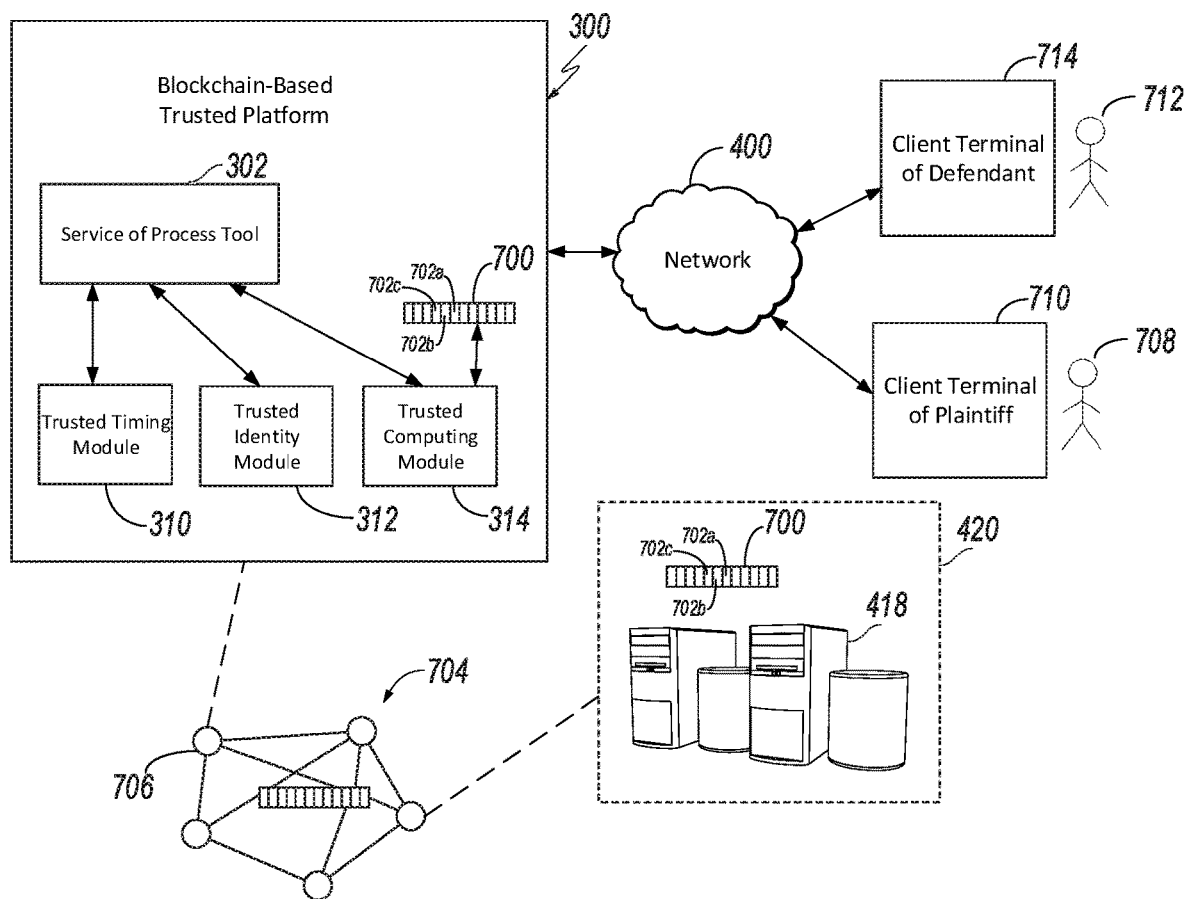
FIG. 7 is a diagram illustrating an example of a system for providing service of process in accordance with embodiments of this specification.

The following describes an example of using the service of process tool 302 to serve notice. Referring to FIG. 7, in some embodiments, a first user 708 (which can be, e.g., the plaintiff or an attorney representing the plaintiff) accesses the trusted platform 300 using a client terminal 710, which can be, e.g., a mobile phone, a personal computer, or any computing device that can connect to the network 400. In this example, the first user 708 has previously registered with the trusted platform 300. After logging into the trusted platform 300, the first user 708 can access the service of process tool 302.

In some embodiments, the service of process tool 302 can require users to open an account and follow an additional registration process to provide additional personal information in order to verify the identity of the users. For example, the user account associated with the service of process tool 302 may include one or more of the following information that can be used to verify the identity of the user: (i) a mobile phone number, (ii) a credit card number, (iii) a user ID associated with an online payment system, (iv) a user ID associated with an online shopping account, (v) a user ID associated with a music streaming or downloading account, (vi) a user IDS associated with a movie streaming or downloading account, (vii) a user ID associated with a messaging or chat account, (viii) a user ID associated with an online banking account, (ix) a user ID associated with a ride hailing service, (x) a user ID associated with an online food ordering service, (xi) a social security number, (xii) a driver's license number, (xiii) a passport number, (xiv) a user ID associated with an online gaming service, (xv) an ID issued by a government entity, (xvi) one or more fingerprints, (xvii) one or more voiceprints, or (xviii) iris information.

Assume that the first user 708 has previously registered with the service of process tool 300. During the log-in process, the service of process tool 302 can invoke the trusted identity module 312 to verify the identity of the first user 708. After the trusted identity module 312 verifies the identity of the first user 708, the service of process tool 302 can grant access to the first user 708. The first user 708 can access the service of process tool 302 to serve court issued documents, such as a summons or subpoena, to another user 712 (second user 712), which can be, e.g., a defendant 714 or an attorney for the defendant. A client component (not shown in the figure) of the service of process tool 302 can be executed at the client terminal 710 and provides a user interface for interacting with the first user 708.

For example, each time a pre-specified type of event occurs in connection with the use of the service of process tool 302 by the first user 708, the service of process tool 302 invokes the trusted timing module 310 to obtain a verified time stamp regarding when the event occurred. The pre-specified type of events can include, e.g., receiving an input from the first user 708, providing an output to the first user 708, transmitting a document to the second user 712, confirming receipt of the document by the second user 712, and performing a pre-specified type of action or computation. Receiving an input from the first user 708 can include, e.g., receiving the user ID or other personal information associated with the second user 712 who is supposed to receive notice, and receiving an upload file, such as a court issued summons or subpoena, from the first user 708. Providing an output to the first user 708 can include, e.g., displaying evidence that the document has been served on the second user 712, or a message indicating that the second user 712 cannot be reached.

As described above, the service of process tool 302 can invoke services from the trusted service layer 324. In some embodiments, each time an event occurs, such as a user 708 complainant enters an identity information through the service of process tool 302, the service of process tool 302 can invoke the trusted timing module 310 to record a verified time stamp indicating a time when the triggering event occurred. In some embodiments, the service of process tool 302 can invoke the trusted computing module 314 to generate a snapshot of the event. For example, the snapshot can include the identity of the user 708 or 712, a description of the event (e.g., a notice of a legal action sent through e-mail), a verified time stamp indicating a time of the triggering event, and supplemental information (e.g., document format), etc. In some embodiments, the trusted computing module 314 can further generate hash values corresponding to the records generated by the trusted modules 310, 312, 314. The hash values can then be recorded to a blockchain 700 such that they can be used by users of the trusted platform 302 to verify authenticity of the records.

For example, the following events may be associated with the service of process activities of the first user 708.

g. Event 1: The first user 708 provides the user ID, address, and phone number of the second user 712 to the service of process tool 302.

h. Event 2: The first user 708 uploads the document to be served, such as the summons or subpoena, to the service of process tool 302.

i. Event 3: The service of process tool 302 determines all the communication methods that can be used to send the document to the second user 712. For example, the communication methods can include sending the document to one or more e-mail accounts, instant messaging accounts, or mobile phone messaging accounts of the second user 712.

j. Event 4: The service of process tool 302 sends the document to the second user 712 using all available communication methods supported by the service of process tool 302.

k. Event 5: The service of process tool 302 receives confirmation that the document has been sent to the second user 712. For example, a mobile phone messaging system may indicate that the second user 712 is online and has received the document.

l. Event 6: Alternatively, the service of process tool 302 may not receive any confirmation that the document has been received by the second user 712, and determines that the second user 712 is off-line and cannot be reached.

m. Event 7: The service of process tool 302 notifies the first user 708 that the document has been served on the second user 712, or that the second user 712 cannot be reached.

Upon the occurrence of each event, the service of process tool 302 can invoke the trusted timing module 310 to obtain a verified time stamp indicating the time that the event occurred. The service of process tool 302 invokes the trusted computing module 314 to update the blockchain 700 to add a record having information about the event. In this example, a block 702*a* stores the record having information about event 1, a block 702*b* stores the record having information about event 2, a block 702*c* stores the record having information about event 3, and so forth. In some embodiments, multiple events can be combined and stored in a single block in the blockchain 700.

The service of process tool 302 is associated with one of the nodes 706 of a blockchain network 704 in which the blockchain 700 is replicated across the blockchain network 704. For example, one of the nodes 706 can be associated with a computer server 418 of a court that maintains a version of the blockchain 700. If the first user 708 notifies the court that the summons or subpoena has been served on the second user 712, a court staff can access the records in the blockchain 700 maintained at the court computer server 418 to retrieve information about the events 1 to 7 described above. The court staff can determine that the first user 708 has served the summons or the subpoena to the second user 712. Because the records in the blockchain 700 has a high level of trustworthiness, the court accepts the information provided by the records in the blockchain 700 as evidence that the second user 712 has been properly served notice.

A feature of the service of process tool 302 is that it can determine multiple communication methods that can be used to send the document to the second user 712. For example, when a user registers with the trusted platform 300, the trusted platform 300 can request the user to provide two or more contact methods (e.g., one or more e-mail addresses, one or more phone numbers (e.g., home, office, and mobile phone numbers), and/or one or more messaging app contact information) in order to verify the identity of the user. The service of process tool 302 can use the contact methods provided by the second user 712 to the trusted platform 300 during registration in order to serve legal notice to the second user 712. In addition, when the second user 712 uses one or more services provided on the trusted platform 300, the second user 712 may provide updated contact information to those services from time to time, so the trusted platform 300 can have updated contact information of the second user 712.

In some embodiments, when the service of process tool 302 attempts to deliver a legal notice to the second user 712, the service of process tool 302 can first detect whether the second user 712 is currently logged into the trusted platform 300 and using one or more services provided by the trusted platform 300, and determine the most efficient method of sending the legal notice to the second user 712. For example, if the trusted platform 300 detects that the second user 712 is currently using a messaging service provided on the trusted platform 300, the service of process tool 302 can send the court ordered document to the second user 712 using the messaging service. In some embodiments, the messaging service can have a built-in read receipt function indicating that a message has been read, and can send a read receipt back to the service of process tool 302. In some embodiments, the service of process tool 302 requests the second user 712 to manually acknowledge receipt and confirm identity. The second user 712 can confirm identity by providing one or more identifying information, and the service of process tool 302 invokes the trusted identity module 312 to verify the identity of the second user 712 to ensure that the person who received the court ordered document is indeed the intended recipient. The service of process tool 302 further invokes the trusted timing module 310 to generate a time stamp indicating the time of the read receipt from the messaging app or the time that the second user 712 acknowledge receipt.

It is advantageous for the first user 708 to use the service of process tool 302 because the tool 302 may be able to communicate with the second user 712 using a communication method that may not be known to the first user 708. For example, the first user 708 may only have a postal mailing address of the second user 712, in which the mailing address may or may not be up-to-date. By using the service of process tool 302, the first user 708 can more efficiently serve notice to the second user 712 using the most recent contact information of the second user 712 available to the trusted platform 300. In some embodiments, when a user registers with the trusted platform 300, the trusted platform 300 obtains consent from the user agreeing that the trusted platform 300 can serve legal notice using the communication methods provided by the user during registration.

Figure 8:
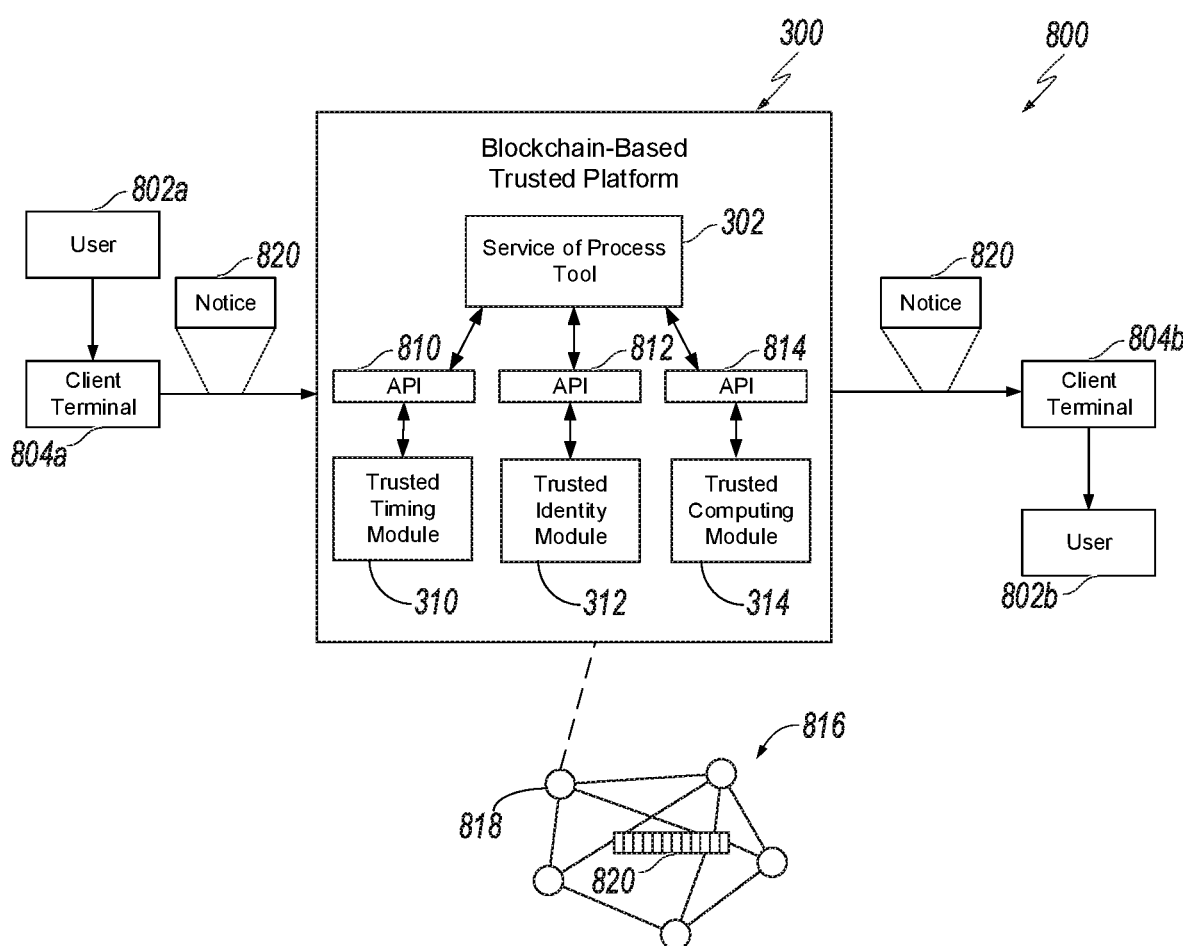
FIG. 8 is a diagram illustrating another example of a system for providing service of process in accordance with embodiments of this specification.

The following describes another embodiment of the service of process tool. FIG. 8 is a diagram illustrating an example of a system 800 in accordance with embodiments of this specification. The system 800 implements a service of process based on a blockchain network. In general, a service of process is the procedure by which a party to a lawsuit gives an appropriate notice of initial legal action to another party (such as a defendant), court, or administrative body in an effort to exercise jurisdiction over that person so as to enable that person to respond to the proceeding before the court, body, or other tribunal. For example, system 800 can be implemented to enable delivering a legal notice (e.g., notice 820) from a first party (e.g., user 802a operating on client terminal 804a) to a second party (e.g., user 802b operating on client terminal 804b).

As an example, the system 800 includes client terminals 804a and 804b (used by users 802a and 802b, respectively), a blockchain-based trusted platform 300, and a blockchain network 816. As shown, the blockchain-based trusted platform 300 includes a service of process tool 302, application programming interfaces (API) 810, 812, and 814, a trusted timing module 310, a trusted identity module 312, and a trusted computing module 314. Note that the blockchain-based trusted platform 300 is shown to include the service of process tool 302 for illustrative purposes only. The blockchain-based trusted platform 300 can include any suitable number of tools, such as a dispute resolution tool (e.g., dispute resolution tool 304 of FIG. 3), a legal documentation tool (e.g., legal documentation tool 306) and a judgement execution tool (e.g., judgement execution tool 308), etc. In some embodiments, the trusted platform 300 is associated with one of the nodes 818 of the blockchain network 816 in which a blockchain (e.g., blockchain 810) is replicated across the blockchain network 816.

In one example, a user 802a can use the client terminal 804a to send a web service request (e.g., a request to deliver a legal notice 820 to user 802b) to the blockchain network 816. The trusted platform 300 implemented on the blockchain network node 818 of the blockchain network 816 can process and fulfill the web service request (e.g., deliver notice 820 to the user 802b via the client terminal 804b).

The client terminals 804a and 804b can include, for example, any suitable computer, module, server, or computing element programmed to perform methods described herein. In some embodiments, the client terminals 804a and 804b can include a web browser and software applications for providing various functions of the client terminals 804a and 804b.

The trusted timing module 310 can be configured to generate time stamps based on national standard timing information (e.g., Greenwich Mean Time (GMT), UTC), or timing information obtained from a global positioning system.

In some embodiments, the trusted timing module 310 can be configured to generate time stamps associated with different users using different standard times for courts systems in different regions. For example, the trusted timing module 310 can generate time stamps associated with a first user using a first standard time recognized by a first court system associated with the first user, and to generate time stamps associated with a second user using a second standard time recognized by a second court system associated with the second user, in which the first and second users reside in different regions having different court systems.

The trusted identity module 312 can be configured to verify an identity of a user (e.g., users 802a and 802b) based on one or more of identifiers associated with the user. In some embodiments, the identifiers can include at least one of the following: (i) a mobile phone number, (ii) a credit card number, (iii) a user ID associated with an online payment system, (iv) a user ID associated with an online shopping account, (v) a user ID associated with a music streaming or downloading account, (vi) a user IDS associated with a movie streaming or downloading account, (vii) a user ID associated with a messaging or chat account, (viii) a user ID associated with an online banking account, (ix) a user ID associated with a ride hailing service, (x) a user ID associated with an online food ordering service, (xi) a social security number, (xii) a driver's license number, (xiii) a passport number, (xiv) a user ID associated with an online gaming service, (xv) an ID issued by a government entity, (xvi) one or more fingerprints, (xvii) one or more voice prints, or (xviii) iris information.

In some embodiments, the trusted identity module 312 can be configured to verify different users residing in different regions having different court systems by using different identifiers. For example, the trusted identity module 312 can be configured to verify the identity of a first user using at least one of a first set of identifiers recognized by a first court system associated with the first user, and to verify the identity of a second user using at least one of a second set of identifiers recognized by a second court system associated with the second user, in which the first and second users reside in different regions having different court systems.

In some embodiments, the trusted computing module 314 can include one or more data processors having a TEE that is isolated from the one or more data processors' operating system and configured to provide enhanced confidentiality and integrity of code executing, and data loaded within, the one or more data processors.

In some embodiments, the trusted computing module 314 can be configured to record information associated with the user in compliance with privacy laws. For example, the trusted computing module 314 can generate a hash value of the record, and adds a block that includes the record and the hash value to the blockchain 820 that stores records associated with the user 802a.

In some embodiments, the trusted computing module 314 can be configured to provide a verified record of the steps/operations performed by the service of process tool 302 in response to a request for the verified record associated with the serving of the notice to the party to be served. The trusted computing module 314 can also provide the verified time stamp, the verified identity, and/or the computation result associated with each step/operation of the steps/operations performed by the service of process tool 302.

In some embodiments, the service of process tool 302 can allow a serving party (e.g., a plaintiff such as user 802a) to serve a notice (e.g., serve summons or other related documents such as notice 820) to a party to be digitally served (e.g., a defendant such as user 802b) while complying with the legal requirements for service of process. In some embodiments, the service of process tool 302 can obtain and record a verified time stamp, a verified identity, and/or a computation result for each step of a number of steps that are performed by the service of process tool 302 for the service of process. The service of process tool 302 can obtain the verified time stamp from the trusted timing module 310, the verified identity from the trusted identity module 312, and computation results from the trusted computing module 314.

In some embodiments, the service of process tool 302 can include a trusted component (not shown) that is configured to be executed in the trusted execution environment and record the steps performed by the service of process tool 302 and the verified time stamp, the verified identity, and/or the computation result associated with each step of the steps. In some embodiments, the trusted component can include a hash computation component that is configured to generate hash values of data representing the steps performed by the service of process tool based on a hash algorithm.

In some embodiments, the service of process tool 302 can be configured to invoke functions of the trusted timing module 310, the trusted identity module 312, or the trusted computing module 314 through a corresponding application programming interface (API) (e.g., APIs 810, 812, and 814) associated with the trusted timing module 310, the trusted identity module 312, or the trusted computing module 314. In some embodiments, the APIs 810, 812, and 814 can include any suitable APIs such as Representational State Transfer (REST) web APIs (or RESTful APIs) or Simple Object Access Protocol (SOAP)-based web APIs, etc.

In some embodiments, the service of process tool 302 can invoke the trusted identity module 312 to verify an identity of a first party (e.g., user 802a) and an identity of a second party (e.g., user 802b) upon receiving a request from the first party to serve notice to the second party. The service of process tool 302 can further invoke the trusted timing module 310 to verify a timing of placement of the order by the user, and invoke the trusted computing module 314 to update the blockchain 820 that includes data representing activities associated with service of process.

In some embodiments, the service of process tool 302 can be configured to invoke the trusted identity module 312 to verify that the second party is the party who actually received the notice upon completing serving the notice to the second party. The service of process tool 302 can be further configured to invoke the trusted timing module 310 to verify a timing of the receipt of the notice by the second party, and invoke the trusted computing module 314 to update the blockchain 820 that includes data representing activities associated with the service of process.

In some embodiments, the service of process tool 302 can be configured to determine a method for serving the notice to the second party based on one or more communication methods associated with one or more accounts of the second party registered on the system, such as by using one or more e-mail addresses, one or more phone numbers, or one or more messaging app user identifiers of the second party.

In the example of FIG. 8, in some embodiments, the user 802 a can log into the trusted platform 300, and the trusted platform 300 can provide a menu of available services, or shows a desktop having icons representing available tools and application programs. The user 802 a can select one of the services, such as service of process, using the menu or the icons, upon which the service of process tool 302 is executed. The user 802 a can use the service of process tool 302 to serve the trusted platform 300 can be associated with the blockchain 816, and the service of process tool 302 can invoke the trusted computing module 314 to process blockchain data and record relevant data in the blockchain 816. The service of process tool 302 can be used to deliver documents other than court ordered notices.

Figure 9:
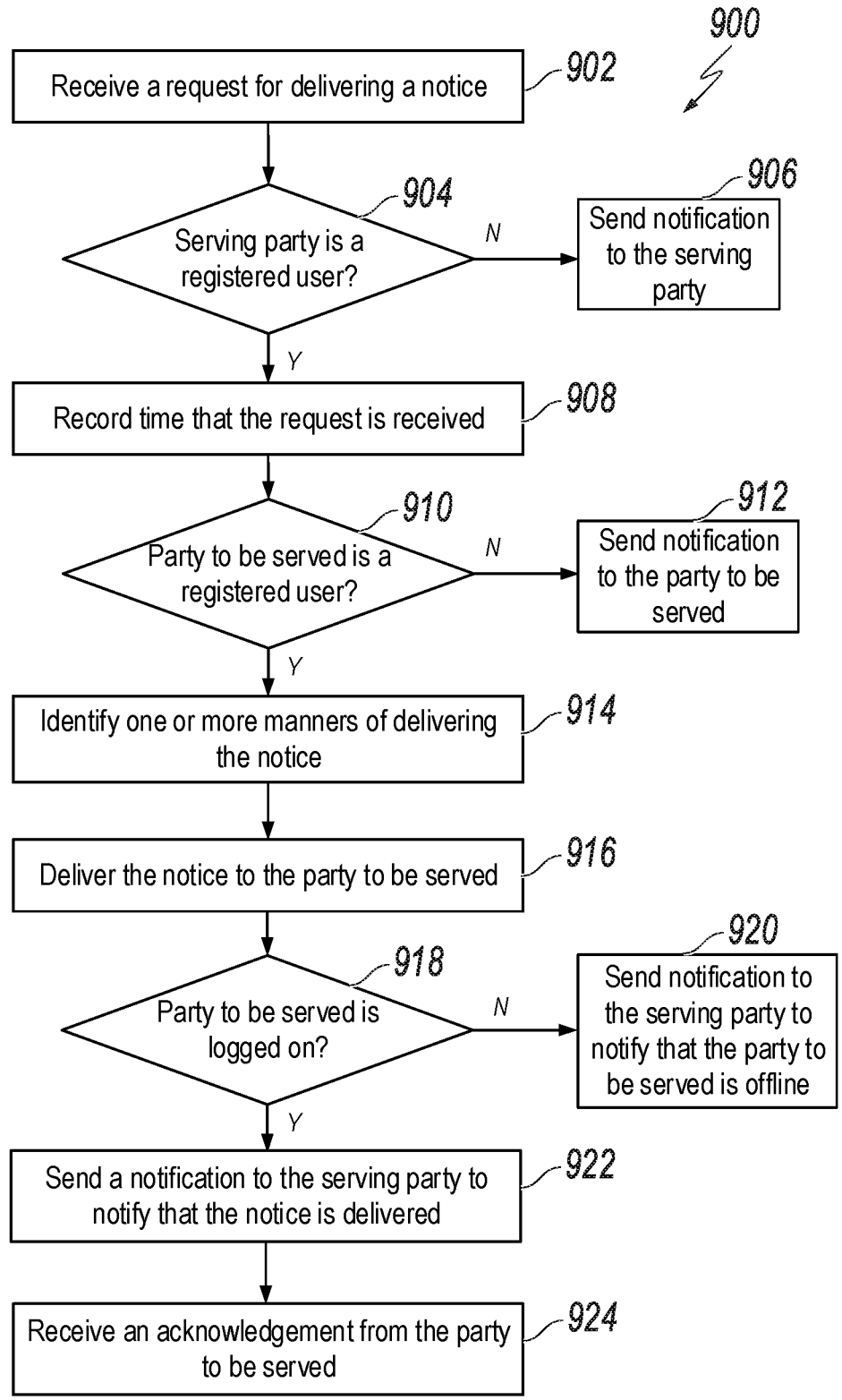
FIG. 9 is a flowchart illustrating an example of a process in accordance with embodiments of this specification.

FIG. 9 is a flowchart illustrating an example of a process 900 in accordance with embodiments of this specification. For convenience, the process 900 will be described as being performed by a system of one or more computers, located in one or more locations, and programmed appropriately in accordance with this specification. For example, a distributed system, e.g., the system 800 of FIG. 8, appropriately programmed, can perform the process 900.

At step 902, a request is received at a blockchain-based application for delivering a notice (e.g., notice 820) associated with a legal action from a serving party (e.g., user 802*a*) to a party to be served (e.g., user 802*b*). In some embodiments, the blockchain-based application is supported by a blockchain-based platform. For example, the blockchain-based application can be the service of process tool 302, and the blockchain-based platform can be the blockchain-based trusted platform 300. In some embodiments, the user 802*a* generates the request by selecting a function of the blockchain-based application for delivering legal notices. In some embodiments, the request can include an identity associated with the serving party and an identity associated with the party to be served. The request can also include the contact information of the party to be served.

At step 904, it is determined whether the serving party is a registered user of the blockchain-based application or the blockchain-based platform. In some embodiments, the blockchain-based application can invoke a trusted identity module (e.g., trusted identity module 312) to verify the identity of the serving party to determine whether the serving party is a registered user of the blockchain-based application or the blockchain-based platform. In some embodiments, the determination can be based on matching the identity of the serving party with an identity included in registration information of the serving party recorded on a blockchain (e.g., blockchain 810). In some embodiments, registration information of users (e.g., users 802*a* and 802*b*) that are recorded on the blockchain can include identity information of the users. The identify information can include user ID of an account associated with the user, biometric identity information (e.g., finger print, facial data, retina print), and digital secret key associated with the user, etc.

In some embodiments, the registration information can include available communication methods associated with the users. The available communication methods can include at least one of the following: e-mail, telephone call, or instant messaging. For example, registration information for user 802*a* can include an e-mail address associated with the user 802*a*, a telephone number associated with user 802*a*, and/or an instant messaging account associated with the user 802*a*. In some embodiments, the identity information and the available communication methods in the registration information can be verified for the users during registration to determine that they are genuine.

In some embodiments, the blockchain-based application can invoke a trusted computing module (e.g., trusted computing module 314) to update the blockchain that includes data representing events or activities associated with the process 900. For example, the blockchain-based application can invoke the trusted computing module to record data of one or more computing results of the determination in step 904 in the blockchain.

If it is determined that the serving party is not a registered user of the blockchain-based application, the process 900 proceeds to step 906 in which a notification is sent to the serving party to indicate that the serving party is not a registered user of the blockchain-based application. If it is determined that the serving party is a registered user of the blockchain-based application, the process 900 proceeds to step 908.

At step 908, a time that the request is received on the blockchain is recorded. In some embodiments, the blockchain-based application can invoke a trusted timing module (e.g., trusted timing module 310) to generate a time stamp associated with the request. In some embodiments, the trusted timing module 310 can generate the time stamp associated with the request from the serving party (e.g., user 802*a*) using a standard time (e.g., UTC) recognized by a court system associated with the serving party. In some embodiments, the trusted timing module 310 can generate the time stamp based on timing information obtained from a global positioning system.

In some embodiments, the time and a digital signature generated based on the time can be added to the notice. In some embodiments, the digital signature can include the time that is signed using a private key associated with the serving party.

At step 910, it is determined whether the party to be served is a registered user of the blockchain-based application. In some embodiments, the blockchain-based application can invoke a trusted identity module (e.g., trusted identity module 312) to verify the identity of the party to be served to determine whether the party to be served is a registered user of the blockchain-based application. In some embodiments, the determination can be based on matching the identity of the party to be served with an identity included in registration information of the party to be served recorded on the blockchain (e.g., blockchain 810). If it is determined that the party to be served is not a registered user of the blockchain-based application, the process 900 proceeds to step 912 in which a notification is sent to the serving party to indicate that the party to be served is not a registered user of the blockchain-based application. If it is determined that the party to be served is a registered user of the blockchain-based application, the process 900 proceeds to step 914.

At 914, one or more manners of delivering the notice are identified if it is determined that the party to be served is a registered user of the blockchain-based application. In some embodiments, the identifying can be based on one or more available communication methods included in the registration information of the party to be served. For example, the blockchain-based application can determine that the available communication methods for the party to be served include e-mail, telephone call, and/or instant messaging, and identify an e-mail address, a telephone number, and an instant messaging account associated with the party to be served.

At 916, it is determined whether the party to be served is logged on to an account registered with the blockchain-based application after delivering the notice to the party to be served. If it is determined that the party to be served is not logged on to the account, the process 900 proceeds to step 918 in which a notification is sent to the serving party to notify that the party to be served is offline. In some embodiments, the notification can be sent to the account associated with the serving party to notify that the party to be served is offline. In some embodiments, if it is determined that the party to be served is not logged on to the account, the blockchain-based application can attempt to deliver the notice to the party to be served at another time. If it is determined that the party to be served is logged on to the account, the process 900 proceeds to step 920.

At step 920, the notice is delivered to the party to be served. In some embodiments, if the party to be served is logged on to the account of the blockchain-based application or the blockchain-based platform using a service that has a built-in communication method, the application attempts to deliver the notice to the party to be served using the built-in communication method. For example, if the application determines, at 916, that the party to be served is logged on to an instant messaging account provided by the platform, the application can deliver the notice to the instant messaging account of the party to be served. In some embodiments, the notice can be delivered to the party to be served based on at least one of the one or more manners of delivering the notice determined at step 914. In some embodiments, the notice can be delivered to the party to be served simultaneously or otherwise in parallel using the communication methods that are identified at step 914. For example, the notice can be sent to the party to be served by simultaneously sending the notice to the e-mail address of the party to be served, calling the telephone number of the party to be served, and sending an instant message to the instant messaging account of the party to be served.

In some embodiments, the notice can be delivered to the party to be served by making a contract call to a smart contract (not shown) executing on a blockchain node (e.g., blockchain node 818) that the blockchain-based application resides. The smart contract can include defined functions or operations to retrieve, generate, store, or otherwise manipulate or manage blockchain data. In some embodiments, the smart contract can be automatically executed when some predetermined execution conditions are met. For example, when the one or more manners of delivering the notice are identified at step 914, the smart contract can self-execute and deliver the notice to the party to be served using the available communication methods.

At step 922, an acknowledgement is received from the party to be served for accepting the notice. For example, if the notice is delivered to an instant messaging account of the party to be served, when the party to be served reads the message containing the notice, the instant messaging program can generate a read receipt. In some embodiments, the notice requests the party to be served to manually acknowledge receipt by, e.g., clicking on a button in the message indicating receipt of the notice, or sending a reply message acknowledging receipt.

At step 924, after receiving an acknowledgement from the party to be served for accepting the notice, a notification is sent to the serving party to notify that the notice is delivered. In some embodiments, the notification can be sent to an account associated with the serving party to notify that the notice is delivered. In some embodiments, the acknowledgement can be delivered to the serving party based on the available communication methods included in the registration information of the serving party.

In some embodiment, the time the acknowledgement is received can be recorded on the blockchain. For example, the blockchain based application can invoke the trusted timing module 310 to verify a timing of the receipt of acknowledgement and record the time that the acknowledgement is received upon verification.

In some embodiments, the blockchain-based application can invoke the trusted identity module 312 to verify that party to be served is the party who actually received the notice. For example, the blockchain-based application can verify an identity information or a digital signature included in the acknowledgement to determine whether the acknowledgement is received from the party to be served.

In some embodiments, the blockchain-based application can invoke the trusted computing module 314 to update the blockchain that includes data representing associated with the process 900. For example, the blockchain-based application can invoke the trusted computing module 314 to record data of computing results of any one of steps 902-924 in the blockchain.

The following describes an example in which a user uses the legal documentation tool 306 to fill out an electronic form. In this example, each step of filling out the electronic form is recorded to a blockchain and is verifiable. A unique ID is generated and embedded in the digital content of the electronic form at each step. The unique ID can be used to retrieve the recordings of each step.

The embodiments of the legal documentation tool enables a user and a service provider to complete an electronic form, e.g., a legal document needed as part of the process of providing a service to the user. One of the problems with conventional technologies is that the digital content of an electronic form is easy to tamper with. It is also difficult to verify the identity and the time when the digital form was filled out. Thus, some of the legal documentations require a user and/or a service provider to fill out one or more paper forms, which usually requires the user and/or service provider to meet in person and complete the form together. Completing the paper form offline leads to low service efficiency and difficulties of keeping the paper forms.

The techniques described in this specification produce several technical effects. In some embodiments, the system records each step for filling out an electronic form of a service, such as the user filling out the form at each step, the time at each step, and the digital content on the electronic form at each step. The record enables the verification of each step for filling out the electronic form, and thus prevents the user from tampering with the content of the electronic form, forging the electronic form, or providing fraudulent information in filling out the electronic form. The data integrity and security for the electronic form required for the service can be enhanced. With the enhanced data integrity and security, the electronic form can replace the paper form which may be required to complete the service using the previous technologies.

In some embodiments, a unique ID is generated and embedded in the digital content of the electronic form for each step. The unique ID can be extracted from the electronic form to retrieve the time and the digital content of the electronic form in each step from the blockchain. Thus, the status of the electronic form in each step can be looked up and verified. The authenticity of the electronic form is further enhanced.

Figure 10:
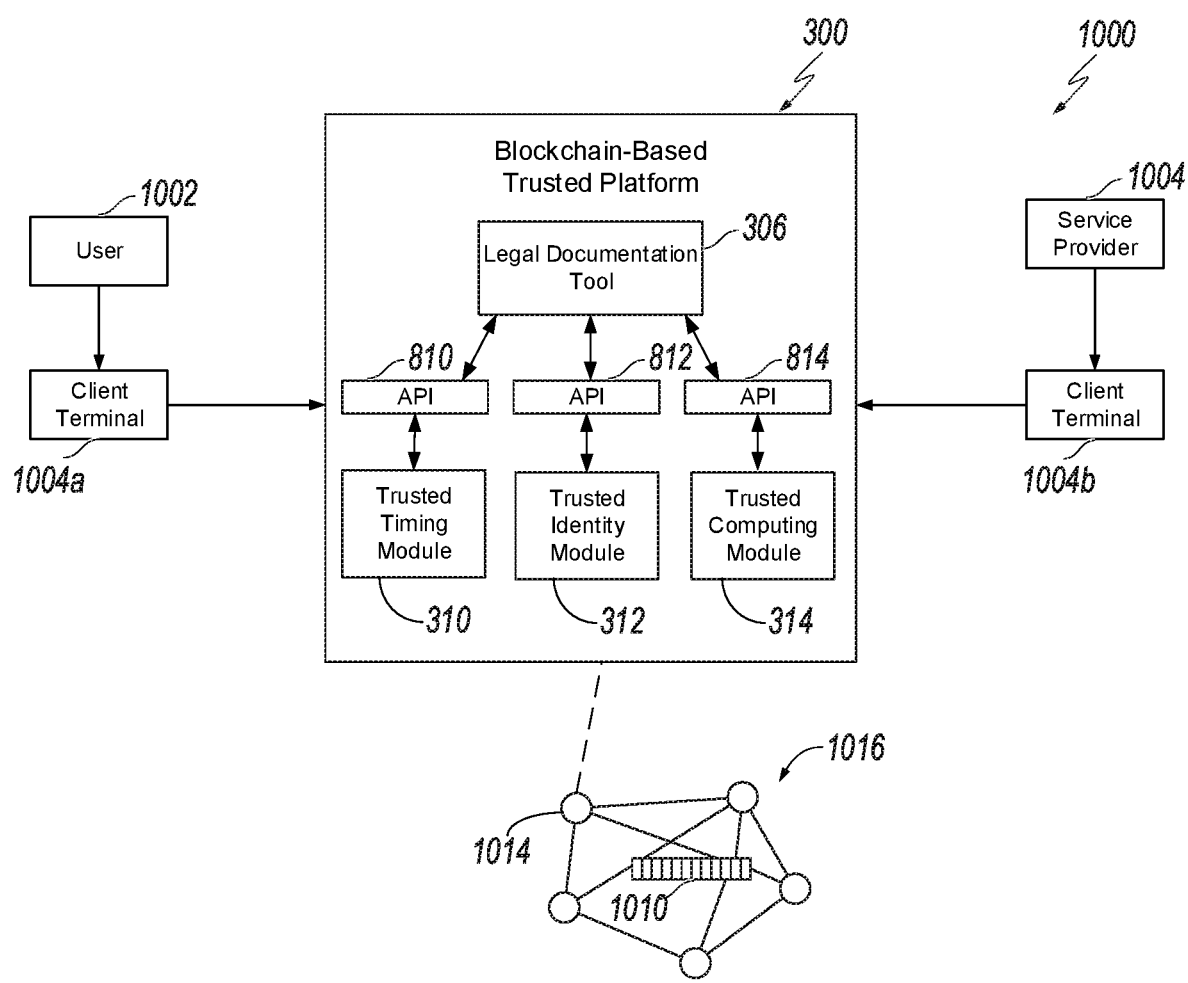
FIG. 10 is a diagram illustrating an example of a system for providing legal documentation in accordance with embodiments of this specification.

FIG. 10 is a diagram illustrating an example of a system 1000 for providing legal documentation in accordance with embodiments of this specification. The system 1000 implements a legal documenting process based on a blockchain network. In general, a legal documenting process is a procedure by which a user and/or a service provider fill out one or more electronic forms of a legal documentation corresponding to a service provided by the service provider.

As an example, the system 1000 includes client terminals 1004*a* and 1004*b* (used by a user 1002 and a service provider 1004, respectively), a blockchain-based trusted platform 300, and a blockchain network 1016. As shown, the blockchain-based trusted platform 300 includes a legal documentation tool 306, APIs 810, 812, and 814, a trusted timing module 310, a trusted identity module 312, and a trusted computing module 314. Note that the blockchain-based trusted platform 300 is shown to include the legal documentation tool 306 for illustrative purposes only. The blockchain-based trusted platform 300 can include any suitable number of tools, such as a service of process tool (e.g., service of process tool 302 of FIG. 3), dispute resolution tool (e.g., dispute resolution tool 304 of FIG. 3), and a judgement execution tool (e.g., judgement execution tool 308), etc. In some embodiments, the trusted platform 300 is associated with one of the nodes 1014 of the blockchain network 1016 in which a blockchain (e.g., blockchain 1010) is replicated across the blockchain network 1016.

In one example, a user 1002 can use the client terminal 1004a to send a service request (e.g., a request to fill out a legal documentation for a service) to the blockchain network 1016. The trusted platform 300 implemented on the blockchain network node 1014 of the blockchain network 1016 can process and fulfill the service request (e.g., a request to fill out a legal documentation for a service).

In some embodiments, the legal documentation tool 306 can be configured to adopt the SM2 algorithm which is a public key cryptographic algorithm based on elliptic curves, to encrypt the data communications and verify the identities. In some embodiments, access levels can be specified for the contents recorded by the legal documentation tool 306. Some recorded contents can only be accessed by the personnel with the specified access level.

The client terminals 1004a and 1004b can include, for example, any suitable computer, module, server, or computing element programmed to perform methods described herein. In some embodiments, the client terminals 1004a and 1004b can include a web browser and software applications for providing various functions of the client terminals 1004a and 1004b.

The trusted timing module 310 can be configured to obtain a time from a time source such as the National Time Service Center (NTSC), UTC, GPST, GLONASS Time (GLONASST), Galileo System Time (GST), or BeiDou Time (BDT). In some embodiments, the blockchain network can obtain the time from a single source, such that all the blockchain nodes of the blockchain network can be synchronized with the same time.

In some embodiments, the trusted timing module can be configured to generate time stamps based on at least one of (i) national standard timing information, or (ii) timing information obtained from a global positioning system.

In some embodiments, the trusted timing module 310 can be configured to generate time stamps associated with different users using different standard times for court systems in different regions. For example, the trusted timing module 310 can generate time stamps associated with a first user using a first standard time recognized by a first court system associated with the first user, and to generate time stamps associated with a second user using a second standard time recognized by a second court system associated with the second user, in which the first and second users reside in different regions having different court systems.

The trusted identity module 312 can be configured to verify an identity of a user or an identity of a service provider (e.g., user 1002 and service provider 1004) based on one or more of identifiers associated with the user or the service provider. In some embodiments, the identifiers can include at least one of the following: (i) a mobile phone number, (ii) a credit card number, (iii) a user ID associated with an online payment system, (iv) a user ID associated with an online shopping account, (v) a user ID associated with a music streaming or downloading account, (vi) a user IDS associated with a movie streaming or downloading account, (vii) a user ID associated with a messaging or chat account, (viii) a user ID associated with an online banking account, (ix) a user ID associated with a ride hailing service, (x) a user ID associated with an online food ordering service, (xi) a social security number, (xii) a driver's license number, (xiii) a passport number, (xiv) a user ID associated with an online gaming service, or (xv) an ID issued by a government entity.

In some embodiments, the trusted identity module 312 can be configured to verify different users residing in different regions having different court systems by using different identifiers. For example, the trusted identity module 312 can be configured to verify the identity of a first user using at least one of a first set of identifiers recognized by a first court system associated with the first user, and to verify the identity of a second user using at least one of a second set of identifiers recognized by a second court system associated with the second user, in which the first and second users reside in different regions having different court systems.

In some embodiments, the trusted computing module 314 can include one or more data processors having a TEE that is isolated from the one or more data processors' operating system and configured to provide enhanced confidentiality and integrity of code executing, and data loaded within, the one or more data processors.

In some embodiments, the trusted computing module 314 can be configured to record information associated with the user in compliance with privacy laws. For example, the trusted computing module 314 can generate a hash value of the record, and adds a block that includes the record and the hash value to a blockchain 1010 that stores records associated with the user 1002.

In some embodiments, the legal documentation tool 306 can be configured to perform a plurality of steps to process information for conducting a service, and for each step of at least some of the plurality of steps, the legal documentation tool 306 can be configured to invoke the trusted computing module to process blockchain data to update a blockchain to record information including at least one of a verified time stamp generated by the trusted timing module or a verified identity determined by the trusted identity module, where the verified time stamp represents a timing of an event in the information process for conducting the service, and the verified identity represents an identity of the user.

In some embodiments, the trusted computing module 314 can be configured to provide a verified record of the steps/operations performed by the legal documentation tool 306 in response to a request for the verified record associated with the legal documentation. The trusted computing module 314 can also provide the verified time stamp, the verified identity, and/or the computation result associated with each step/operation of the steps/operations performed by the legal documentation tool 306.

In some embodiments, the legal documentation tool 306 can allow a user to fill out an electronic legal documentation while complying with the legal requirements for legal documenting process. In some embodiments, the legal documentation tool 306 can obtain and record a verified time stamp, a verified identity, and/or a computation result for each step of a number of steps that are performed by the legal documentation tool 306 for the legal documenting process. The legal documentation tool 306 can obtain the verified time stamp from the trusted timing module 310, the verified identity from the trusted identity module 312, and computation results from the trusted computing module 314.

In some embodiments, the legal documentation tool 306 can include a trusted component (not shown) that is configured to be executed in the trusted execution environment and record the steps performed by the legal documentation tool 306 and the verified time stamp, the verified identity, and/or the computation result associated with each step of the steps. In some embodiments, the trusted component can include a hash computation component that is configured to generate hash values of data representing the steps performed by the legal documentation tool based on a hash algorithm.

In some embodiments, the legal documentation tool 306 can be configured to invoke functions of the trusted timing module 310, the trusted identity module 312, or the trusted computing module 314 through a corresponding API (e.g., APIs 810, 812, and 814) associated with the trusted timing module 310, the trusted identity module 312, or the trusted computing module 314. In some embodiments, the APIs 810, 812, and 814 can include any suitable APIs such as REST web APIs (or RESTful APIs) or SOAP-based web APIs, etc.

In some embodiments, the legal documentation tool 306 can invoke the trusted identity module 312 to verify an identity of a user (e.g., user 1002) upon receiving a request for providing the service initiated from an account of a user associated with a blockchain-based application. The legal documentation tool 306 can further identify one or more electronic forms to be filled out and submitted in a plurality of steps for providing the service.

In some embodiments, at each step of the plurality of steps, the legal documentation tool 306 can invoke the trusted timing module 310 to generate a time that the step is performed, and generate a unique identifier (ID) based on the time that the step is performed and digital content on the electronic form at the time. The legal documentation tool 306 can further invoke the trusted computing module to record the unique ID, the time, and the digital content on the blockchain. The legal documentation tool 306 can then embed the unique ID in the digital content at the time by changing one or more attributes associated with the digital content to be representative of the unique ID, where the embedding produces information-embedded digital content that enables retrieval of the time and the digital content from the blockchain based on the unique ID. The legal documentation tool 306 can further invoke the trusted computing module to record the information-embedded digital content to the blockchain.

Figure 11:
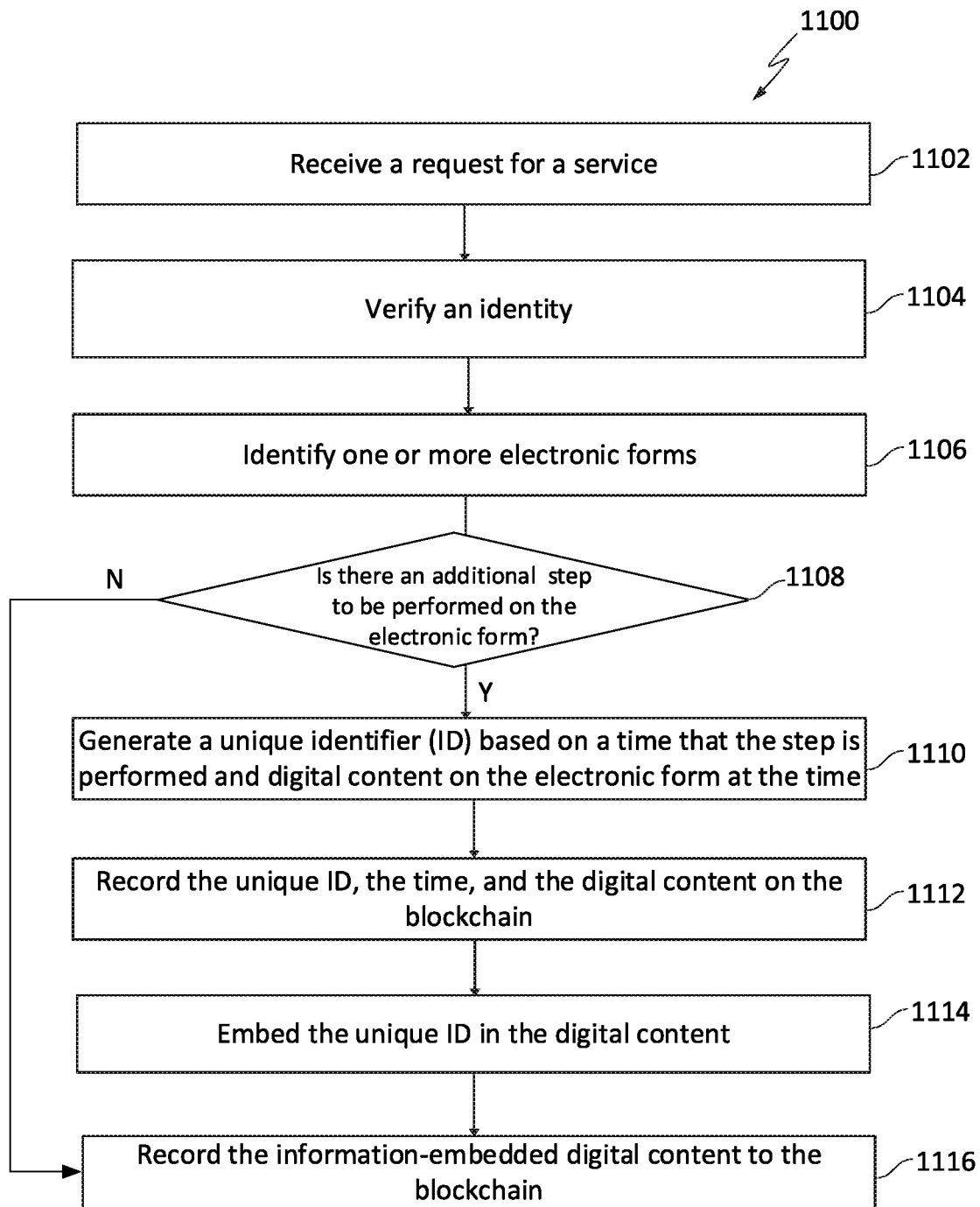
FIG. 11 is a flowchart illustrating another example of a process in accordance with embodiments of this specification.

FIG. 11 is a flowchart illustrating an example of a process 1100 that can be executed in accordance with embodiments of this specification. The process 1100 can be performed by one or more blockchain nodes or a computing device communicably coupled to the one or more blockchain nodes. For clarity of presentation, the description that follows generally describes process 1100 in the context of the other figures in this description. However, it will be understood that process 1100 can be performed, for example, by any system, environment, software, and hardware, or a combination of systems, environments, software, and hardware, as appropriate. In some embodiments, various steps of process 1100 can be run in parallel, in combination, in loops, or in any order.

At 1102, a request for a service is received. The service can be a public service provided by a government agency, a business service provided by a business service provider. For example, the service can be a driver's license renewal service, tax registration service, marriage license service, bank account opening service, residence ID card service, apartment leasing service, etc. In some embodiments, the user can initiate a request for a service by accessing the legal documentation tool 306 of the trusted platform 300 from the user's account of the legal documentation tool 306 or another blockchain-based application that hosts the legal documentation tool 306. For example, the user can open the legal documentation tool 306 on the user's client terminal and logging into the account. The available services can then be displayed on the user's client terminal and the user can initiate the request by selecting a desired service.

In some embodiments, a second request for handling the user's service request can be initiated from an account of a service provider associated with the legal documentation tool 306. The second request for handling the user's request can be examining the user's paperwork, making a decision on the user's paperwork, endorsing the user's signature, sending supplemental document requests after examining the user's paperwork, etc.

At 1104, an identity is verified. The identity can be the identity of the user or a representative of the service provider. In some embodiments, the identity can be included in the request for the service.

In some embodiments, the legal documentation tool 306 invokes the trusted identity module 312 to verify the identity of the user or the representative of the service provider. In some embodiments, the user or the representative can use biometric information for registration. When the user or the representative accesses the legal documentation tool 306, the user or the representative can be asked to use fingerprint, voice, iris, or facial recognition to verify his/her identity. After entering the corresponding biometric information through a sensor, the trusted identity module 312 can match the biometric information to registration information stored in memory to verify if the user or representative is authorized to use the legal documentation tool 306.

At 1106, one or more electronic forms to be filled out and submitted for providing a service are identified. The one or more electronic forms can be the digital paperwork needed by the service provider for providing the service. For example, the electronic form can be an application form, a service agreement, a membership renewal form, a rental agreement, a purchase order, etc. The electronic form can include one or more online pages.

At 1108, it is determined that if there is an additional step to be performed on the electronic form. In some embodiments, filling out an electronic form can include multiple steps. For example, filling out a leasing agreement can include signing each page of the rental agreement. Signing each signature or initial can be a separate step of filling out the agreement. The steps can be performed by the user, the service provider, or both the user and the service provider. For example, the user can sign on a page of the electronic form in one step, and in another step, the service provider can sign on the same page to endorse the user's signature. In some embodiments, the user and the service provider can both access the legal documentation tool 306 to perform the steps interactively, e.g., one party can remain logged in to wait for the other party to complete his/her signature before the party can endorse or countersign. In some embodiments, the user and the service provider can logged in separately to perform their own steps of the information documentation process. If there is an additional step to perform, the process 1100 proceeds to 1110. Otherwise, the process 1100 proceeds to 1116.

At 1110, a unique ID is generated based on a time that the step is performed and digital content on the electronic form at the time. The unique ID can be used to uniquely identify the user. In some embodiments, the unique ID can include the user's identity information digitally signed by its private key. The user can then be identified by decrypting the digital signature with the public key corresponding to the user and verified by comparing the decrypted information to the user's trusted identity recorded on the blockchain. In some embodiments, the unique ID can be generated based on the time and the digital content on the electronic form filled in by the user at the time. In some embodiments, the unique ID can be generated based on the time and the electronic form.

In some embodiments, the unique ID can be embedded in the digital content filled in by the user. In some embodiments, a second unique ID can be generated based on the time that a second step is performed and the digital content on the electronic form filled in by the service provider at the time. The second unique ID can be embedded in the digital content filled in by the service provider.

In some embodiments, at least a portion of the content, including the time that the step is performed and the digital content on the electronic form at the time, can be used to generate the unique ID, such as by generating a hash value based on the portion of the content. In some embodiments, the content used to generate the unique ID further includes the identity of the user or the service provider.

In some embodiments, the unique ID can be encrypted or hashed to enhance the robustness and security. For example, the encryption can be performed based on public key encryption using a user's or a service provider's public key. In some embodiments, the encryption can also be performed based on encryption schemes such as the Arnold scrambling encryption to adapt to the embedding technique used. By performing encryption, even if an attacker extracts the digital watermark, the associated unique ID cannot be decrypted if the encryption scheme or encryption key is unknown to the attacker.

At 1112, the unique ID, the time, and the digital content are recorded on the blockchain. In some embodiments, the unique ID, the time, and the digital content can be recorded as a transaction on the blockchain in the form of a key-value pair, where the key is the unique ID, and the value includes the time and the digital content. The unique ID can then be used to retrieve the value including the time and the digital content. In some embodiments, a blockchain network can adopt a content-addressed tree structure, such as a Merkle Patricia Tree or fixed depth Merkle tree. In some embodiments, each blockchain node of a blockchain network associated with the trusted platform can store a portion of block data or state data. For example, a blockchain node can be a light weight node, which stores only the unique ID and the time, but not the digital content, as compared to a full node that stores the unique ID, the time, and the digital content. In some embodiments, the blockchain network can include one or more shared storage nodes that store historic state data, while other regular blockchain node only stores current state data to save on storage.

At 1114, the unique ID is embedded in the digital content. In some embodiments, each step corresponds to a page of the electronic form. A unique ID can be embedded in each page of the electronic form. In some embodiments, the unique ID can be embedded in the digital content by changing one or more attributes associated with the digital content to be representative of the unique ID, where the embedding produces information-embedded digital content that enables retrieval of the time and the digital content from the blockchain based on the unique ID. In some embodiments, the unique ID can be invisibly embedded. The embedded unique ID can be considered invisible if its addition is not noticeable or visible to naked eyes. In other words, the unique ID can be considered invisible if the visual difference between the digital content before embedding the unique ID and after embedding the unique ID is not apparent to an unaided human eye. The unique ID can be embedded in digital content, foreground of the digital content, or background of the digital content. The foreground of the digital content can be a film or screen attached or integrated to a platform where the digital content is displayed. The foreground of the digital content can also be a layer including the unique ID that is configured not to be rendered by a viewing application. The background of the digital content can be a background of a visual representation of an electronic file containing the digital content that is rendered on a display.

In some embodiments, the invisible embedding of digital content can be performed based on digital watermarking. Digital watermarking is a technique of using data carriers to embed the unique ID. Data carriers can include text, images, or electronic media. The unique ID can be embedded in the data carriers as an invisible digital watermark. When a query for a digital content occurs, the unique ID can be extracted from the data carriers to retrieve the digital content corresponding to the unique ID.

Digital watermarking techniques can include background brightness masking, illuminance masking, texture masking, spatial masking and frequency masking. Different techniques can be based on different digital watermarking algorithms. In some embodiments, digital watermark embedding can be based on human visual system (HVS) characteristics to achieve visual imperceptibility or invisibility. For example, the human eyes are more sensitive to the changes in the low intensity pixels than the higher intensity ones. In illuminance masking, pixels of digital content can be scanned to identify those with high intensity levels. The high intensity pixels can be used to embed the digital watermark. Modifications made to the high intensity pixels can be difficult to perceive by human eyes, such that the digital watermark can be considered invisibly embedded. Using illuminance masking, the digital watermark can be embedded in the entire digital content or a portion of the digital content. For example, if the digital content is textual content, the digital watermark can be embedded in a letter, a word, a sentence, or all the way up to the entire textual content.

As another example, in texture masking, the more complex the texture is, the more difficult the human eyes can discern the change of the texture. Therefore, the digital watermark can be embedded to a portion of a digital image or background of digital content with more complex texture to be less perceptible by human eyes.

As yet another example, digital watermarking can be performed based on frequency masking by transforming the digital content to frequency domain coefficients based on mathematical transformations such as discrete cosine transform (DCT), discrete wavelet transform (DWT), or Arnold transform. In frequency masking, intermediary or low frequency coefficients are normally modified according to the watermark information. Those frequency ranges are less impactful to the appearance of the original content. The digital watermark (i.e., the unique ID) can be in the form of a character string. The character string can be converted to a single binary string. Each bit can be embedded to adjust lower frequency coefficients depending on the transformation technique used. In frequency masking, the digital watermark can be dispersed to the whole digital content, which can increase robustness and invisibility. Other example mathematical transformations for performing digital watermarking can include DWT and singular value decomposition (DWT-SVD), least significant bit (LSB), or highly undetectable steganography (HUGO).

In some embodiments, more than one digital watermarking technique can be used to embed multiple layers of digital watermarks to the data carrier. In such cases, an index of the layers of digital watermarking can also be generated and embedded in the data carrier. The index can be used to more easily extract digital watermarks from the data carriers. In some embodiments, the unique ID can be randomized or mixed with a random signal before embedding to the data carrier.

In some examples, the digital content can be textual content. The embedded unique ID can be considered invisible if it does not materially change the content. The content can be considered not materially changed if the embedded information does not alter the meaning of the text. For example, the original text is "he becomes a monster after seven years," and the information embedded text is "he has become a 'monster' after seven years." The information embedded in the added text is not considered as materially changed from the original text, since the meaning of the text stays the same. In this example, the unique ID can be embedded in the quotation marks, or the auxiliary word "has," according to the techniques described herein. In some embodiments, the unique ID can be embedded in spaces or function words such as articles, prepositions, conjunctions, and auxiliaries, which do not normally alter the material meaning of textual content.

In some embodiments, a plurality of unique IDs can be used to track the updates of the textual content. For example, one or more unique IDs can be generated based on timestamps corresponding to one or more digital content updates recorded on the blockchain. When a content update is performed and recorded on the blockchain, a unique ID including the corresponding timestamp can be embedded in at least a portion of the updated content. The timestamps in the unique IDs extracted from the digital content can form a timeline of creation and update history of the digital content. The timeline can be used as evidence of the content development process, and compared to the update history recorded on the blockchain to authenticate authorship of the textual content.

In some embodiments, the unique ID can be embedded in characteristics information of textual or image content. Example characteristics information can include color, brightness, and transparency of text or image. For example, text or image color can be encoded based on a red, green, and blue (RGB) color model. The unique ID can be embedded to slightly change the RGB value combination not noticeable by naked eyes. As another example, the unique ID can be embedded in YCbCr formatted text or image, where Y represents the luminance signal, Cb represents chrominance blue signal, and Cr represents chrominance red signal. The luminance signal is relatively insensitive to information embedding, which can be preferably used to invisibly embed the unique ID.

In some embodiments, the unique ID can be embedded in punctuations of textual content. For example, in the text "after seven years, he becomes a 'monster'," the unique ID can be embedded in the encoding of the commas and quotation marks.

In some embodiments, the unique ID can be embedded in fonts used by textual content. Fonts can be encoded using Unicode such as UTF-8. The UTF-8 is based on variable width character encoding, which uses one to four 8-bit bytes. Embedding the unique ID in some of the bits may slightly change pixel positions, size, angle, shape of font or punctuations invisible to the naked eye. For example, pixels of text fonts and punctuations can be encoded with redundancy. Redundancy is normally added to pixels for error checking in data communications. Redundancy such as check bits can be used to check data integrity at the receiver end. If the check bits are not consistent with the rest of the information bearing pixels when they arrive at the receiver, the receiver can ask the sender to retransmit the content. The unique ID can be randomly embedded in redundant pixels or embedded in redundant pixels in fixed positions. It is to be understood that the unique ID can also be invisibly embedded in other hidden characteristics of fonts or punctuations.

In some embodiments, the unique ID can be embedded in forms or tables within or containing the digital content. Those embodiments are especially suitable for right authentication of text or images inserted in online forms or tables. For example, an online form can be a form defined in the Hypertext Markup Language (HTML) definition of a webpage (such as by using the "<form>" tag) and rendered by a browser program displaying the webpage. Similarly, an online table can be a table defined in the Hypertext Markup Language (HTML) definition of a webpage (such as by using the "<table>" tag) and rendered by a browser program displaying the webpage. The unique ID can be invisibly embedded in values associated with color, shade, cell size, or other properties of the forms or tables.

In some cases, the unique ID can be embedded in electronic media that can be used to display or publish digital content. For example, the unique ID can be embedded in background textures of webpages or electronic files such as MICROSOFT WORD, POWERPOINT, or ADOBE PDF.

At 1116, the information-embedded digital content is recorded to the blockchain. In some embodiments, a correlation between the unique ID and the information-embedded digital content can be established, and the information-embedded digital content can be retrieved from the blockchain based on querying the unique ID.

Figure 12:
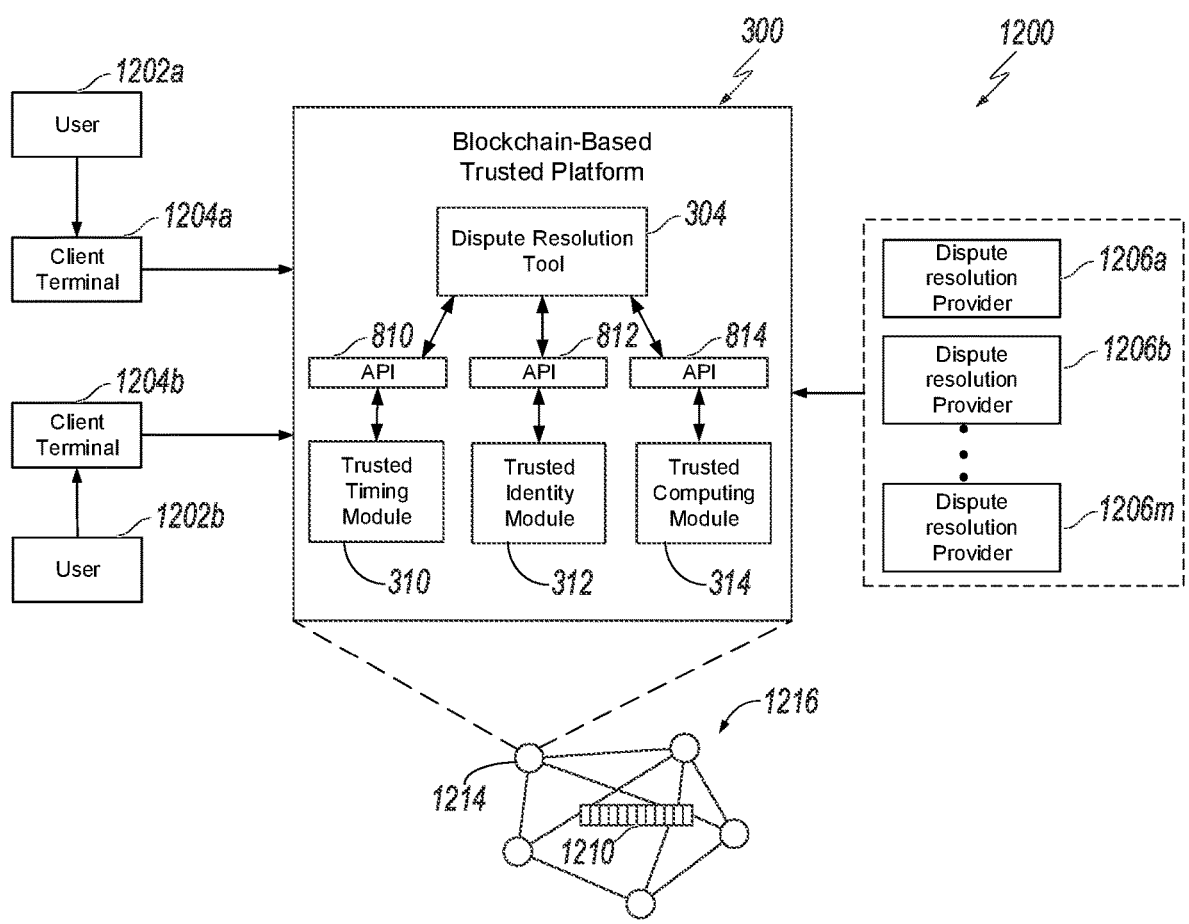
FIG. 12 is a diagram illustrating an example of a system for providing dispute resolution in accordance with embodiments of this specification.

FIG. 12 is a diagram illustrating an example of a system 1200 for providing dispute resolution in accordance with embodiments of this specification. The system 1200 implements dispute resolution based on a blockchain network. Generally, the system 1200 allows two or more parties in dispute to find one or more potential solutions to the dispute from multiple dispute resolution providers (e.g., dispute mediators) in a convenient manner.

As an example, the system 1200 includes client terminals 1204*a* and 1204*b* (used by users 702*a* and 702*b*, respectively), a blockchain-based trusted platform 300, and a blockchain network 1216. The system 1200 communicates with several dispute resolution providers 1206*a*-1206*m*. As shown, the blockchain-based trusted platform 300 includes a dispute resolution tool 304, APIs 810, 812, and 814, a trusted timing module 310, a trusted identity module 312, and a trusted computing module 314. Note that the blockchain-based trusted platform 300 is shown to include the dispute resolution tool 304 for illustrative purposes only. The blockchain-based trusted platform 300 can include any suitable number of tools, such as a service of process tool (e.g., service of process tool 302 of FIG. 3), a legal documentation tool (e.g., legal documentation tool 306) and a judgement execution tool (e.g., judgement execution tool 308), etc. In some embodiments, the trusted platform 300 is associated with one of the nodes 1214 of the blockchain network 1216 in which a blockchain (e.g., blockchain 1210) is replicated across the blockchain network 1216.

In one example, a user 1202*a* can use client terminal 1204*a* to send a web service request (e.g., a request to resolve a legal dispute) to the blockchain network 1216. The trusted platform 300 associated with the blockchain network node 1214 of the blockchain network 1216 can process and fulfill the web service request (e.g., provide dispute resolutions to user 1202*a* via client terminal 1204*a*). As another example, user 1202*a* and user 1202*b* can jointly submit a legal dispute involving user 1202*a* and user 1202*b* to the trusted platform 300. The trusted platform 300 can invite dispute resolutions from multiple dispute resolution provider 1206a-1206m and identify one or more dispute resolutions that both user 1202a and user 1202b agree on.

The client terminals 1204a and 1204b can include, for example, any suitable computer, module, server, or computing element programmed to perform methods described herein. In some embodiments, the client terminals 1204a and 1204b can include a web browser and software applications for providing various functions of the client terminals 704a and 704b.

In some embodiments, the dispute resolution tool 304 can provide one or more potential solutions to a dispute between at least a first party (e.g., user 1202a) and a second party (e.g., user 1202b). In some embodiments, the dispute resolution tool 304 can invoke a trusted identity module (e.g., trusted identity module 312) to verify an identity of the first party, verify an identity of the second party, and verify identities of a number of dispute resolution providers (e.g., dispute resolution provider 1206a-1206m). The dispute resolution tool 304 can further send information related to the dispute to the number of dispute resolution providers.

In some embodiments, the dispute resolution tool 304 can receive potential solutions for the dispute from the number of dispute resolution providers 1206a-1206m, and send the potential solutions to the first party and the second party. In some embodiments, the dispute resolution tool 304 can receive responses from the first and second parties and determine whether there is at least one resolution accepted by both parties based on the responses. For example, the dispute resolution tool 304 can receive a first set of potential dispute resolutions from the first party and a second set of potential dispute resolutions from the second party. The dispute resolution tool 304 can determine whether there is at least one common dispute resolution for the first and the second sets. If it is determined that there is no common dispute resolution, the dispute resolution tool 304 can determine that none of the potential resolutions are acceptable to the first and second parties.

In some embodiments, the dispute resolution tool 304 can update a blockchain (e.g., blockchain 1210) to record data associated with the service provided by the dispute resolution tool 304. For example, the dispute resolution tool 304 can update the blockchain 1210 to record data representing the dispute between the parties 1202a and 1202b and the potential solutions provided by the dispute resolution providers 1206a-1206m. The dispute resolution tool 304 can update the blockchain 1210 to record data representing identities of the parties 1202a and 1202b that are in dispute and identities of the dispute resolution providers 1206a-1206m.

In some embodiments, it is further determined that whether the received dispute resolution matches a dispute resolution in the first set of the one or more dispute resolutions and the second set of the one or more dispute resolutions. If it is determined that the dispute resolution most closely matches a dispute resolution in the first set of the dispute resolutions selected by the first party, the virtual asset withdrawn from the second account of the second party can be sent to a dispute resolution provider that provides the dispute resolution in the first set of the dispute resolutions. If it is determined that the dispute resolution most closely matches a dispute resolution in the second set of the dispute resolutions selected by the second party, the virtual asset withdrawn from the first account of the first party can be sent to a dispute resolution provider that provides the dispute resolution in the second set of the dispute resolutions.

In some embodiments, the dispute resolution tool 304 can receive a first response from the first party 1202a indicating that at least a first set of the potential dispute resolutions is acceptable to the first party 1202a, and receive a second response from the second party 1202b indicating that at least a second set of the potential dispute resolutions is acceptable to the second party 1202b. The dispute resolution tool 304 can determine whether there is at least one final potential solution based on the first and second responses. For example, the dispute resolution tool 304 can determine at least one final potential solution based one or more potential solutions that are acceptable to both the first and second parties 1202a-1202b.

In some embodiments, the dispute resolution tool 304 can provide an asset to at least one of the dispute resolution providers 1206a-1206m who contributed to the at least one final potential solution acceptable to both the first and second parties 1202a-1202b.

In some embodiments, the dispute resolution tool 304 can be configured to invoke functions of the trusted timing module 310, the trusted identity module 312, or the trusted computing module 314 through a corresponding API (e.g., APIs 810, 812, and 814) associated with the trusted timing module 310, the trusted identity module 312, or the trusted computing module 314. In some embodiments, the APIs 810, 812, and 814 can include any suitable APIs such as REST web APIs (or RESTful APIs) or SOAP-based web APIs, etc.

Figure 13:
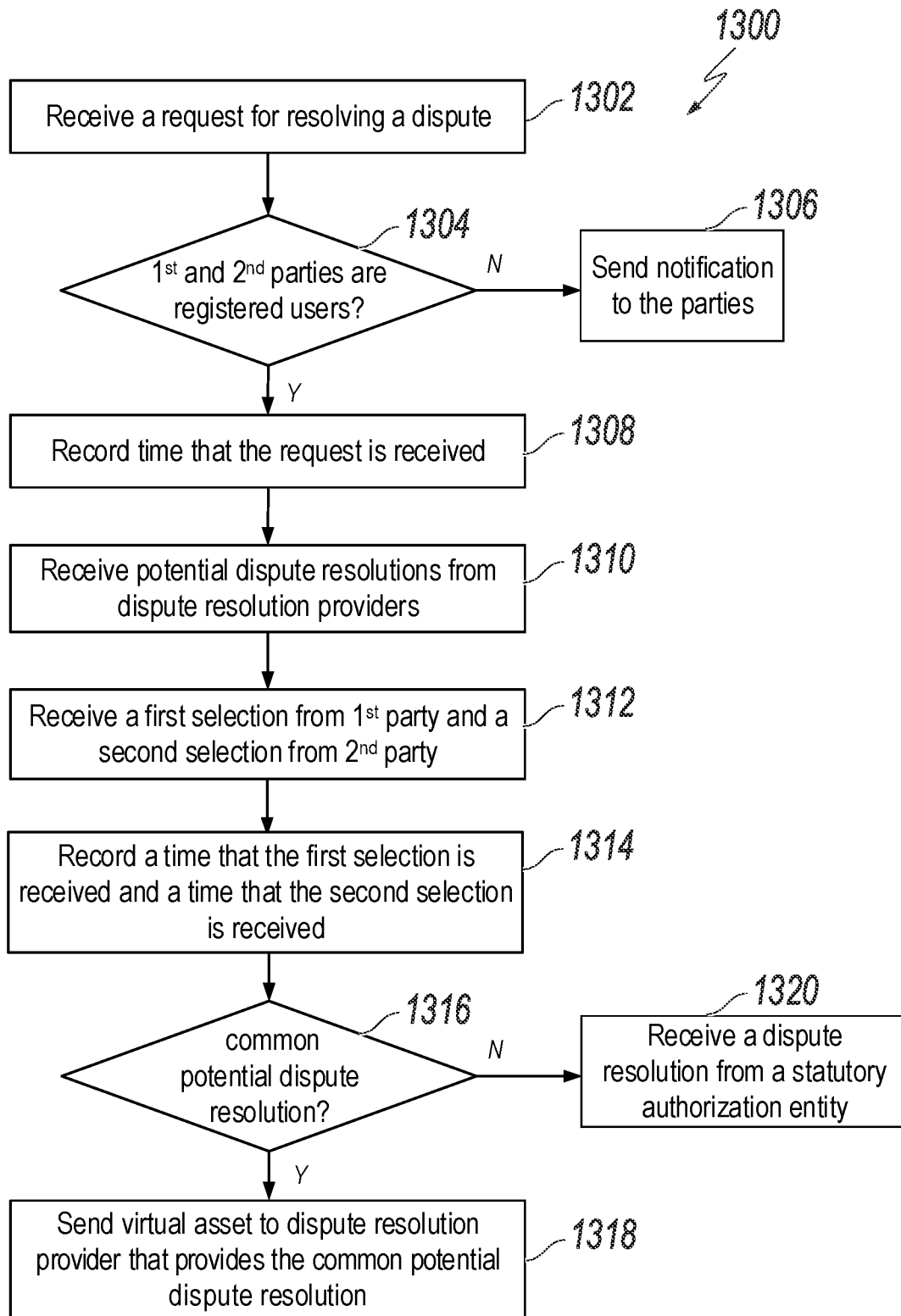
FIG. 13 is a flowchart illustrating another example of a process in accordance with embodiments of this specification.

FIG. 13 is a flowchart illustrating an example of a process 1300 for implementation of a dispute resolution that can be executed in accordance with embodiments of this specification. For convenience, the process 1300 will be described as being performed by a system of one or more computers, located in one or more locations, and programmed appropriately in accordance with this specification. For example, a distributed system, e.g., the system 1200 of FIG. 12, appropriately programmed, can perform the process 1300.

At 1302, a request for resolving a dispute between at least a first party (e.g., user 1202a) and a second party (e.g., user 1202b) is received at a blockchain-based application (e.g., the dispute resolution tool 304). In some embodiments, the request for resolving the dispute can include virtual asset. In some embodiments, the virtual asset is a representation of a digital asset that can be defined as either a medium of exchange or a property that has value in a specific environment, such as a financial trading environment. In some embodiments, the virtual asset can be offered to a dispute resolution provider (e.g., dispute resolution provider 1206a-1206m) as a reward to incentivize dispute resolution providers to study the dispute and propose sensible dispute resolutions.

In some embodiments, the blockchain-based application can receive a first request from the first party for resolving the dispute. The first request can include a first virtual asset having a first value. The blockchain-based application can receive a second request from the second party for resolving the dispute. The second request can include a second virtual asset having a second value. In some embodiments, the blockchain-based application can determine the virtual asset based on one of the first virtual asset and the second virtual asset that has a higher value. For example, if the first virtual asset has a higher value than the second virtual asset, the first virtual asset can be determined as the virtual asset.

In some embodiments, blockchain-based application can store the virtual asset as a deposit. In some embodiments, the blockchain-based application can remove the virtual asset from a first account associated with the first party and remove the virtual asset from a second account associated with the second party respectively, and store the virtual assets removed from the first account and the second account on the blockchain. Continuing with the above example, if the first virtual asset has a higher value than the second virtual asset, first virtual asset can be determined as a final virtual asset and can be withdrawn from the first account associated with the first party. The first virtual asset can be also withdrawn from the second account associated with the second party. The blockchain-based application can store the two pieces of the first virtual asset as a final virtual asset for rewarding the dispute resolution providers.

At 1304, it is determined that whether the first party and the second party are registered users of the blockchain-based application. In some embodiments, the determination is based on matching the first identity with an identity included in registration information of the first party recorded on a blockchain and matching the second identity with an identity included in registration information of the second party recorded on the blockchain. In some embodiments, the blockchain-based application can invoke a trusted identity module (e.g., trusted identity module 312) to verify the identity of the first party and the identity of the second party. The blockchain-based application can further invoke the trusted identity module to verify identities of a number of dispute resolution providers (e.g., dispute resolution provider 1206a-1206m).

In some embodiments, the blockchain-based application can invoke a trusted computing module (e.g., trusted computing module 314) to record data representing identities of the parties in dispute and identities of the dispute resolution providers.

If it is determined that the first party and the second party are not registered users of the blockchain-based application, the process proceeds to step 1306 where notification are sent to the first and the second parties to notify that first and the second parties are not registered users. If it is determined that the first party and the second party are registered users of the blockchain-based application, the process proceeds to step 1308.

At 1308, a time that the request is received on the blockchain is recorded. In some embodiments, the blockchain-based application can invoke a trusted timing module (e.g., trusted timing module 310) to record a time stamp indicating when the first request is received from the first party and a time stamp indicating when the second request is received from the second party. In some embodiments, the blockchain-based application can invoke a trusted computing module (e.g., trusted computing module 314) to record data representing the dispute between the parties.

In some embodiments, the blockchain-based application can send information related to the disputer to the number of disputer solution providers. In some embodiments, the blockchain-based application 300 can invoke the trusted timing module 310 to record data representing a time stamp indicating when the information about the dispute was sent to the dispute resolution providers.

At 1310, one or more potential dispute resolutions are received from one or more dispute resolution providers that are registered with the blockchain-based application (e.g., the dispute resolution tool 304). In some embodiments, the one or more potential dispute resolutions can be requested to be received within a predetermined time window. In some embodiments, the blockchain-based application (e.g., 304) can invoke the trusted timing module 310 to record data representing a time stamp indicating when each dispute service provider provided a potential dispute resolution. In some embodiments, the blockchain-based application can invoke the trusted computing module 314 to record data representing the potential solutions provided by the dispute resolution providers.

In some embodiments, the blockchain-based application can send the potential solutions to the first party and the second party. In some embodiments, the blockchain-based application can invoke the trusted timing module 310 to record data representing a time stamp indicating when the potential dispute resolutions were sent to the first party and a time stamp indicating when the potential dispute resolutions were sent to the second party.

At 1312, a first selection and a second selection are received from the first and the second parties. In some embodiments, the first selection includes a first set of the one or more potential dispute resolutions and the second selection includes a second set of the one or more potential dispute resolutions. In some embodiments, the blockchain-based application can invoke the trusted computing module 314 to record data representing the first selection from the first party and the second selection from the second party.

At 1314, a time that the first selection is received and a time that the second selection is received are recorded on the blockchain. For example, the blockchain-based application can invoke the trusted timing module 310 to record data representing a time stamp indicating when the first party provided the first selection of the potential dispute resolutions, and a time stamp indicating when the second party provided the first selection of the potential dispute resolutions.

At 1316, it is determined that whether there is at least one common potential dispute resolution between the first set of the one or more potential dispute resolutions and the second set of the one or more potential dispute resolutions.

If it is determined that there is at least one common potential dispute resolution between the first set of the one or more potential dispute resolutions and the second set of the one or more potential dispute resolutions, the process proceeds to step 1318. If it is determined that there is no common potential dispute resolution between the first set of the one or more potential dispute resolutions and the second set of the one or more potential dispute resolutions, the blockchain-based application can determine that the none of the potential dispute resolutions are acceptable to the first and second parties, and the process proceeds to step 1320.

At 1318, the virtual asset is sent to at least one of the dispute resolution providers that provides the common potential dispute resolutions. For example, the virtual asset can be provided to at least one of the dispute resolution providers who contributed to the at least one common potential solution acceptable to both the first and second parties.

At 1320, a dispute resolution can be received from a statutory authorization entity if it is determined that there is no common potential dispute resolution between the first set of the one or more potential dispute resolutions and the second set of the one or more potential dispute resolutions. In some embodiments, the statutory authorization entity is different from the dispute resolution providers.

In some embodiments, the first selection and the second selection are received from the first party and the second party respectively within a predetermined time window.

In some embodiments, it is further determined that whether the received dispute resolution matches a dispute resolution in the first set of the one or more dispute resolutions and the second set of the one or more dispute resolutions. If it is determined that the dispute resolution most closely matches a dispute resolution in the first set of the dispute resolutions selected by the first party, the virtual asset withdrawn from the second account of the second party can be sent to a dispute resolution provider that provides the dispute resolution in the first set of the dispute resolutions. If it is determined that that the dispute resolution most closely matches a dispute resolution in the second set of the dispute resolutions selected by the second party, the virtual asset withdrawn from the first account of the first party can be sent to a dispute resolution provider that provides the dispute resolution in the second set of the dispute resolutions.

Figure 14:
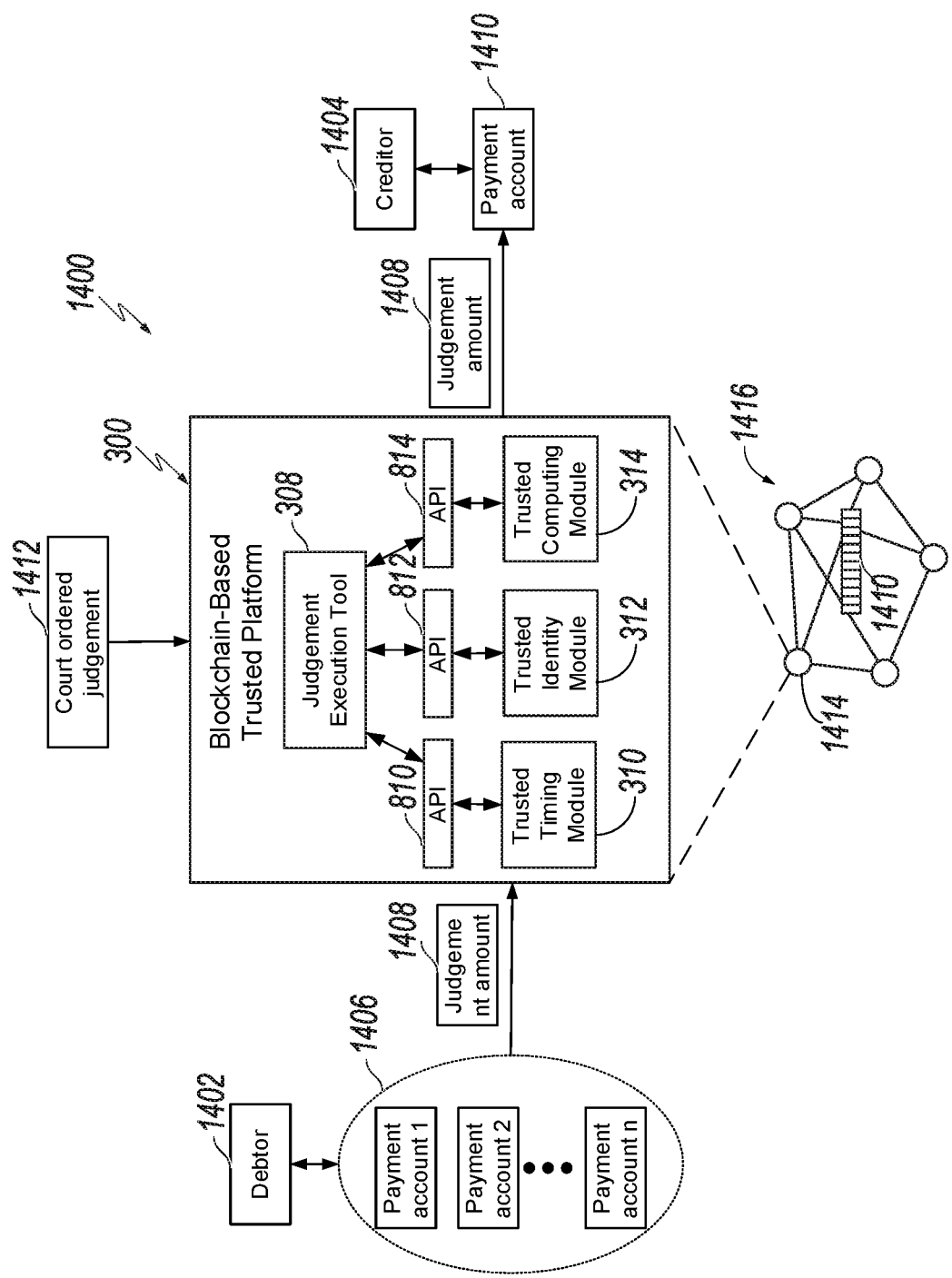
FIG. 14 is a diagram illustrating an example of a system for judgment execution in accordance with embodiments of this specification.

FIG. 14 is a diagram illustrating an example of a system 1400 for judgment execution in accordance with embodiments of this specification. The system 1400 implements a process to execute court ordered judgements based on a blockchain network. In general, system 1400 enables a way to execute court ordered judgements, in which each judgement specifies a debtor, a creditor, and a judgement amount owed by the debtor to the creditor.

As an example, the system 1400 includes a debtor 1402, a creditor 1404, one or more payment accounts of the debtor 1406, a judgement amount 1408, a payment account of the creditor 1410, a court ordered judgement 1412, a blockchain-based trusted platform 300, and a blockchain network 1416. As shown, the blockchain-based trusted platform 300 includes a legal documentation tool 306, APIs 810, 812, and 814, a trusted timing module 310, a trusted identity module 312, and a trusted computing module 314. Note that the blockchain-based trusted platform 300 is shown to include the judgement execution tool 308 for illustrative purposes only. The blockchain-based trusted platform 300 can include any suitable number of tools, such as a service of process tool (e.g., service of process tool 302 of FIG. 3), a dispute resolution tool (e.g., dispute resolution tool 304), and a legal documentation tool (e.g., legal documentation tool 306), etc. In some embodiments, the trusted platform 300 is one of the nodes 1414 of the blockchain network 1416 in which a blockchain (e.g., blockchain 1410) is replicated across the blockchain network 1416.

In one example, the blockchain-based trusted platform 300 implemented on the blockchain network node 1414 of the blockchain network 1416 can process and execute the court ordered judgement 1412. The judgement amount 1408 can then be transferred from one or more payment accounts of the debtor 1406 to the payment account of the creditor 1410.

In some embodiments, the judgement execution tool 308 can be configured to adopt the SM2 algorithm which is a public key cryptographic algorithm based on elliptic curves, to encrypt the data communications and verify the identities. In some embodiments, access levels are specified for the contents recorded by the judgement execution tool 308. Some recorded contents can only be accessed by the personnel with the specified access level.

The trusted timing module 310 can be configured to generate time stamps based on at least one of (i) national standard timing information or (ii) timing information obtained from a global positioning system. In some embodiments, the blockchain network obtains the time from a single source, such that all the blockchain nodes of the blockchain network are synchronized in time.

In some embodiments, the trusted timing module 310 can be configured to generate time stamps associated with a first debtor or creditor using a first standard time recognized by a first court system associated with the first debtor or creditor, and to generate time stamps associated with a second debtor or creditor using a second standard time recognized by a second court system associated with the second debtor or creditor, in which the first and second debtor(s) or creditor(s) reside in different regions having different court systems.

In some embodiments, the trusted identity module 312 can be configured to verify an identity of a debtor or creditor based on one or more of identifiers associated with the debtor or creditor, the identifiers including at least one of (i) a mobile phone number, (ii) a credit card number, (iii) a user ID associated with an online payment system, (iv) a user ID associated with an online shopping account, (v) a user ID associated with a music streaming or downloading account, (vi) a user IDS associated with a movie streaming or downloading account, (vii) a user ID associated with a messaging or chat account, (viii) a user ID associated with an online banking account, (ix) a user ID associated with a ride hailing service, (x) a user ID associated with an online food ordering service, (xi) a social security number, (xii) a driver's license number, (xiii) a passport number, (xiv) a user ID associated with an online gaming service, or (xv) an ID issued by a government entity.

In some embodiments, the trusted identity module 312 can be configured to verify the identity of a first debtor or creditor using at least one of a first set of identifiers recognized by a first court system associated with the first debtor or creditor, and to verify the identity of a second debtor or creditor using at least one of a second set of identifiers recognized by a second court system associated with the second debtor or creditor, in which the first and second debtor(s) or creditor(s) reside in different regions having different court systems.

In some embodiments, the trusted computing module 314 includes one or more data processors having a TEE) that is isolated from the one or more data processors' operating system and configured to provide enhanced confidentiality and integrity of code executing, and data loaded within, the one or more data processors.

In some embodiments, the trusted computing module 314 can be configured to record information associated with the debtor and/or creditor in compliance with privacy laws.

In some embodiments, the blockchain-based judgement execution tool 308 can be configured to execute court ordered judgements, in which each judgement specifies a debtor (e.g., debtor 1402), a creditor (e.g., creditor 1404), and a judgement amount owed by the debtor to the creditor (e.g., judgement amount 1408). The judgement execution tool 308 can further invoke the trusted timing module to generate a first verified time stamp representing a time when the court ordered judgement was received by the judgement execution tool.

In some embodiments, the judgement execution tool 308 can be configured to identify one or more assets associated with the debtor. The judgement execution tool 308 can further collect at least a portion of the judgement amount from the one or more assets associated with the debtor. The judgement execution tool 308 can be further configured to send the collected asset to the creditor.

In some embodiments, the judgement execution tool 308 can be configured to determine one or more payment accounts associated with the debtor, send the court ordered judgement to one or more financial institutions that manage the one or more payment accounts associated with the debtor, and request the one or more financial institutions to collect at least a portion of the judgement amount from the payment accounts associated with the debtor.

In some embodiments, the judgement execution tool 308 can be configured to invoke the trusted timing module to generate a second verified time stamp representing a time when the collected asset was sent to the creditor. The judgement execution tool 308 can further invoke the trusted computing module to process blockchain data to add a record in a blockchain, in which the record includes information about the identities of the debtor and creditor, the first and second verified time stamps, and the amount of asset collected from the debtor and sent to the creditor.

In some embodiments, the judgement execution tool 308 can be configured to perform a plurality of steps to execute a court ordered judgement, and for each step of at least some of the plurality of steps, the judgement execution tool 308 can be configured to invoke the trusted computing module to process blockchain data to update a blockchain to record information including at least one of a verified time stamp generated by the trusted timing module or a verified identity determined by the trusted identity module, where the verified time stamp represents a timing of an event in the execution of the court ordered judgement, and the verified identity represents an identity of the creditor or the debtor.

In some embodiments, the judgement execution tool 308 can be configured to process data in the blockchain to provide a verified record associated with the plurality of steps of execution of a judgement.

In some embodiments, the judgement execution tool 308 includes a trusted component that is configured to be executed in the TEE and record data associated with at least some of the steps performed by the judgement execution tool 308.

In some embodiments, the trusted component comprises a hash computation component that is configured to generate hash values of data representing the data associated with at least some of steps performed by the judgement execution tool 308 based on a hash algorithm.

In some embodiments, the blockchain based judgement execution tool 308 is configured to invoke functions of the trusted timing module, the trusted identity module, or the trusted computing module through a corresponding application programming interface (API) associated with the trusted timing module, the trusted identity module, or the trusted computing module.

In some embodiments, the blockchain-based judgement execution tool 308 can include a client component and a server component, the client component can be configured to be executed at a client terminal of the debtor or the creditor, and the server component can be configured to be executed at a computer server of the system.

In some embodiments, the judgement execution tool 308 can be configured to enable the debtor to access the blockchain data to verify that the amount collected from the one or more assets associated with the debtor is consistent with the court ordered judgement.

In some embodiments, the judgement execution tool 308 can be configured to enable the creditor to access the blockchain data to verify the amount that has been collected from the one or more assets associated with the debtor.

In some embodiments, the judgement execution tool 308 can be configured to enable a representative of a court to access the blockchain data to verify a progress of the execution of the judgement.

Figure 15:
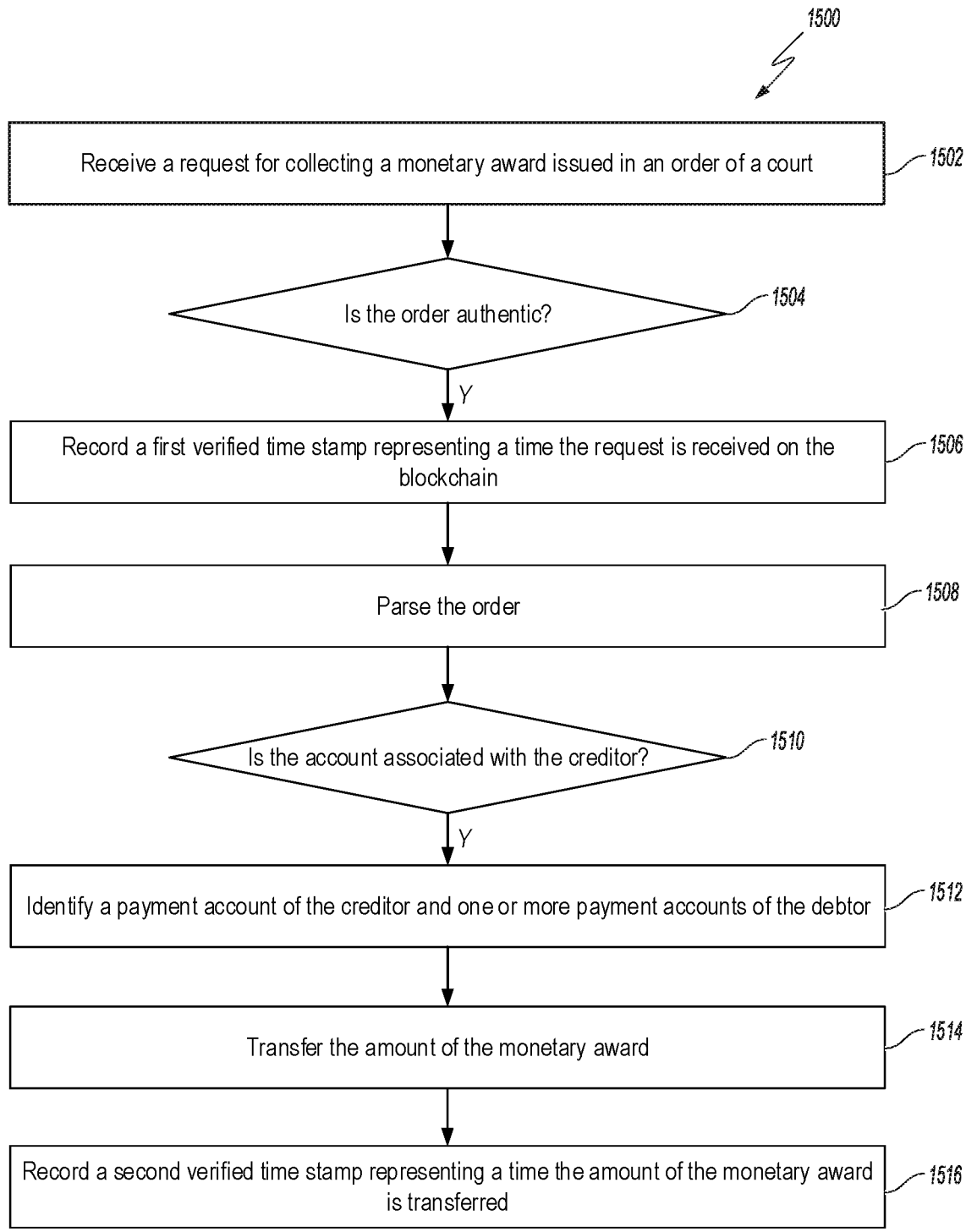
FIG. 15 is a flowchart illustrating yet another example of a process in accordance with embodiments of this specification.

FIG. 15 is a flowchart illustrating an example of a process 1500 that can be executed in accordance with embodiments of this specification. The process 1500 can be performed by one or more blockchain nodes or a computing device communicably coupled to the one or more blockchain nodes. For clarity of presentation, the description that follows generally describes process 1500 in the context of the other figures in this description. However, it will be understood that process 1500 can be performed, for example, by any system, environment, software, and hardware, or a combination of systems, environments, software, and hardware, as appropriate. In some embodiments, various steps of process 1500 can be run in parallel, in combination, in loops, or in any order.

At 1502, a request for collecting a monetary award issued in an order of a court is received. In some embodiments, the request is associated with an account of a blockchain-based application. In some embodiments, the request can include an identity associated with the account. The monetary award can be, for example, cash, funds, stocks, bonds, foreign currencies, or other type of asset. In some embodiments, the request can be initiated by the court or by the creditor.

In some embodiments, the request is a first request, and the account is a first account. Before receiving the first request, a second request associated with a second account of the blockchain-based application for recording the order of the court can be received, where the second request includes an identity associated with the second account. Based on the trusted identity module, a determination can be made that the second account is associated with the court based on the identity associated with the second account and registration information of the second account recorded on the blockchain. The trusted computing module can be invoked to record the order on the blockchain as hash value of the order. A third verified time stamp can be recorded, by the trusted timing module, representing a time the order is recorded on the blockchain.

At 1504, a determination is made whether the order is authentic. In some embodiments, the determination can be made, by a trusted identity module (e.g., trusted identity module 312), based on matching with a hash value associated with the order recorded on a blockchain.

At 1506, a first verified time stamp representing a time the request is received on the blockchain is recorded. In some embodiments, the first verified time stamp is recorded by a trusted timing module (e.g., trusted timing module 310).

At 1508, the order is parsed. In some embodiments, the trusted computing module (e.g., trusted computing module 314) can be invoked to determine, based on parsing the order, a creditor of the monetary award, a debtor of the monetary award, and an amount of the monetary award.

In some embodiments, the trusted computing module can be invoked to determine, based on parsing the order, a deadline of enforcing the monetary award, where the trusted computing module is invoked to transfer the amount of the monetary award before the deadline.

At 1510, a determination is made whether the account is associated with the creditor. In some embodiments, based on the trusted identity module, the determination is made that the account is associated with the creditor based on the identity and registration information of the account recorded on the blockchain.

At 1512, a payment account of the creditor and one or more payment accounts of the debtor are identified. In some embodiments, the trusted computing module is invoked to identify, based on the registration information, a payment account of the creditor and one or more payment accounts of the debtor with an aggregated balance greater than or equal to the amount of the monetary award.

In some embodiments, the trusted computing module can inquire all of the payment accounts of the debtor, without inquiring the exact balances of all of the payment accounts of the debtor, to identify the one or more payment accounts of the debtor with an aggregated balance greater than or equal to the amount of the monetary award. The trusted computing module can inquire a payment account if the balance of the payment account is greater than a certain amount. The financial institution associated with the payment account can then reply with a yes or no. For example, assuming the monetary award is $20,000, the trusted computing module can start by inquiring each payment account of the debtor whether the payment account has a balance of $20,000. If more than one payment accounts reply yes, a payment account can be randomly selected. If no payment account replies yes, the trusted computing module can reduce the inquiry balance, for example, inquire whether the payment account has a balance of $10,000. The trusted computing module can keep decreasing the inquiry balance until one or more payment accounts of the debtor with an aggregated balance greater than or equal to the amount of the monetary award are identified.

At 1514, the amount of the monetary award is transferred. In some embodiments, the trusted computing module can be invoked to transfer the amount of the monetary award from the one or more payment accounts of the debtor to the payment account of the creditor. In some embodiments, the trusted computing module can be invoked to transfer the amount of the monetary award based on receiving an alert from a financial institution associated with the one or more payment accounts, and wherein the alert indicates that a withdrawal request or a money transfer request is initiated from the at least one of the one or more payment accounts.

In some embodiments, the trusted computing module can be invoked to transfer the amount of the monetary award when the alert indicates that a withdrawal amount or a money transfer amount associated with the withdrawal request or the money transfer request will make the remaining balance less than the monetary award. For example, assuming the monetary award is $20,000 and the balance of a payment account of the debtor is $30,000, if the withdrawal amount or the money transfer amount is $20,000, the remaining balance of the payment account after the withdrawal or the money transfer will be $10,000, which is less than the monetary award. An alert can then be triggered to indicate that the withdrawal amount or the money transfer amount associated with the withdrawal request or the money transfer request will make the remaining balance less than the monetary award, and the trusted computing module can be invoked to transfer the amount of the monetary award.

In some embodiments, there is a waiting period, e.g., 24 hours, between the time that the withdrawal request or the money transfer request is initiated and the time that the withdrawal request or the money transfer request is executed by the financial institution. An alert from the financial institution can be sent to the trusted computing module at the time that the withdrawal request or the money transfer request is initiated. The trusted computing module can then determine whether to transfer the amount of the monetary award in the waiting period.

At 1516, a second verified time stamp representing a time the amount of the monetary award is transferred is recorded. In some embodiments, the second verified time stamp can be recorded by the trusted timing module.

Although the present invention is defined in the attached claims, it should be understood that the present invention can also be defined in accordance with the following embodiments:

Embodiment 1: A system comprising: an application layer comprising at least one blockchain-based application program configured to perform a plurality of steps to provide a service; and a trusted service layer comprising a trusted timing module, a trusted identity module, and a trusted computing module; wherein for each step of at least some of the plurality of steps, the application program is configured to perform, at least one of obtaining a verified time stamp from the trusted timing module, obtaining a verified identity from the trusted identity module, or obtaining a computation result based on a processing of blockchain data using the trusted computing module, and the trusted computing module is configured to record information about the corresponding step that is performed by the application program and at least one of the verified time stamp, the verified identity, or the computation result in a blockchain.

Embodiment 2: The system of embodiment 1, wherein the trusted computing module is configured to, in response to a request for a verified record associated with the service, provide the verified record of the plurality of steps performed by the application program and the at least one of the verified time stamp, the verified identity, or the computation result associated with each step of the plurality of steps.

Embodiment 3: The system of embodiment 1 or 2, wherein the trusted computing module comprises one or more data processors having a TEE that is isolated from the one or more data processors' operating system and configured to provide enhanced confidentiality and integrity of code executing, and data loaded within, the one or more data processors.

Embodiment 4: The system of embodiment 3, wherein the blockchain based application program comprises a trusted component that is configured to be executed in the trusted execution environment and record the plurality of steps performed by the application program and the at least one of the verified time stamp, the verified identity, or the computation result associated with each step of the plurality of steps.

Embodiment 5: The system of embodiment 4, wherein the trusted component comprises a hash computation component that is configured to generate hash values of data representing the steps performed by the application program based on a hash algorithm.

Embodiment 6: The system of any of embodiments 1 to 5, wherein the blockchain-based application program is configured to invoke functions of the trusted timing module, the trusted identity module, or the trusted computing module through a corresponding application programming interface (API) associated with the trusted timing module, the trusted identity module, or the trusted computing module.

Embodiment 7: The system of any of embodiments 1 to 6, wherein the trusted timing module is configured to generate time stamps based on at least one of (i) national standard timing information, or (ii) timing information obtained from a global positioning system.

Embodiment 8: The system of any of embodiments 1 to 7, wherein the trusted timing module is configured to generate time stamps associated with a first user using a first standard time recognized by a first court system associated with the first user, and to generate time stamps associated with a second user using a second standard time recognized by a second court system associated with the second user, in which the first and second users reside in different regions having different court systems.

Embodiment 9: The system of any of embodiments 1 to 8, wherein the trusted identity module is configured to verify an identity of a user based on one or more of identifiers associated with the user, the identifiers including at least one of (i) a mobile phone number, (ii) a credit card number, (iii) a user ID associated with an online payment system, (iv) a user ID associated with an online shopping account, (v) a user ID associated with a music streaming or downloading account, (vi) a user IDS associated with a movie streaming or downloading account, (vii) a user ID associated with a messaging or chat account, (viii) a user ID associated with an online banking account, (ix) a user ID associated with a ride hailing service, (x) a user ID associated with an online food ordering service, (xi) a social security number, (xii) a driver's license number, (xiii) a passport number, (xiv) a user ID associated with an online gaming service, (xv) an ID issued by a government entity, (xvi) one or more fingerprints, (xvii) one or more voice prints, or (xviii) iris information.

Embodiment 10: The system of any of embodiments 1 to 9, wherein the trusted identity module is configured to verify the identity of a first user using at least one of a first set of identifiers recognized by a first court system associated with the first user, and to verify the identity of a second user using at least one of a second set of identifiers recognized by a second court system associated with the second user, in which the first and second users reside in different regions having different court systems.

Embodiment 11: The system of any of embodiments 1 to 10, wherein the trusted computing module is configured to record information associated with the user in compliance with privacy laws.

Embodiment 12: The system of any of embodiments 1 to 11, wherein the blockchain based application program provides a shopping service to enable the user to search for information about a product provided by a seller and place an order for the product, wherein the application program is configured to invoke the trusted identity module to verify an identity of the user and an identity of the seller, and invoke the trusted timing module to verify a timing of placement of the order by the user.

Embodiment 13: The system of embodiment 12, wherein the blockchain based application program is configured to invoke the trusted computing module to update the blockchain, and the blockchain is configured to include data representing online activities of the user associated with the placement of the order of the product.

Embodiment 14: The system of embodiment 13, wherein the blockchain based application program is configured to invoke the trusted computing module to update the blockchain to include data representing information shown to the user and each piece of information provided by the user to the seller after the user initiates a checkout process, an identity of the user, an identity of the seller, and a timing of the placement of the order.

Embodiment 15: The system of embodiment 14, wherein the information shown to the user after the user initiates the checkout process includes a description of the product that is being ordered, a price of the product, an identifier of the seller, a name of an entity to receive the product, a shipping address, and a message asking the user to confirm placement of the order.

Embodiment 16: The system of any of embodiments 1 to 15, wherein the blockchain based application program comprises a web browser configured to enable the user to view web pages on a network and save contents of one or more of the web pages in a storage, wherein the application program is configured to invoke the trusted identity module to verify an identity of the user, and invoke the trusted timing module to verify a timing that a web page has been viewed and/or saved by the user.

Embodiment 17: The system of embodiment 16, wherein the blockchain based application program is configured to invoke the trusted computing module to update the blockchain, and the blockchain is configured to include data representing contents of web pages viewed and/or saved by the user, URLs of the web pages, an identity of the user, and time stamps showing when the web pages were viewed and/or saved by the user.

Embodiment 18: The system of any of embodiments 1 to 17, wherein the blockchain based application program provides an online agreement signing service to enable two or more parties to enter into an agreement online, wherein the application program is configured to invoke the trusted identity module to verify identities of parties to the agreement, and invoke the trusted timing module to verify a timing of signing the agreement by each of the parties.

Embodiment 19: The system of embodiment 18, wherein the blockchain based application program invokes the trusted computing module to update the blockchain, and the blockchain is configured to include data representing online activities of the parties associated with the signing of the agreement.

Embodiment 20: The system of embodiment 18, wherein the blockchain based application program invokes the trusted computing module to update the blockchain to include data representing (i) contents of the agreement signed by each party, (ii) modifications, if any, made to the agreement by each party, (iii) identity of each party signing the agreement, and (iv) time stamps shown when the agreement was signed by each party.

Embodiment 21: A method comprising: at a blockchain-based trusted platform, providing a service to a user in a plurality of steps; for each step of the plurality of steps, performing at least one of obtaining a verified time stamp from a trusted timing module of the trusted platform, obtaining a verified identity from a trusted identity module of the trusted platform, or obtaining a computation result from a trusted computing module of the trusted platform, and recording data associated with the service provided to the user and at least one of the verified time stamp, the verified identity, or the computation result associated with the step in a blockchain.

Embodiment 22: The method of embodiment 21, comprising in response to a request for a verified record associated with the service, providing the verified record of the plurality of steps performed by an application program and the at least one of the verified time stamp, the verified identity, or the computation result associated with each step of the plurality of steps.

Embodiment 23: The method of embodiment 21 or 22, comprising using the trusted computing module to process blockchain data of the blockchain using one or more data processors having a TEE that is isolated from the one or more data processors' operating system and configured to provide enhanced confidentiality and integrity of code executing, and data loaded within, the one or more data processors.

Embodiment 24: The method of embodiment 23, comprising executing a trusted component associated with provisioning of the service in the trusted execution environment and recording the plurality of steps of the service provided to the user and the at least one of the verified time stamp, the verified identity, or the computation result associated with each step of the plurality of steps in the blockchain.

Embodiment 25: The method of embodiment 24, wherein executing the trusted component comprises calculating hash values of data associated with the steps of the services provided to the user based on a hash algorithm.

Embodiment 26: The method of any of embodiments 1 to 25, comprising, at a blockchain based application program of the trusted platform configured to provide the service to the user, invoking functions of the trusted timing module, the trusted identity module, or the trusted computing module through a corresponding application programming interface (API) associated with the trusted timing module, the trusted identity module, or the trusted computing module.

Embodiment 27: The method of any of embodiments 21 to 26, comprising at the trusted timing module, generating time stamps based on at least one of (i) national standard timing information, or (ii) timing information obtained from a global positioning system.

Embodiment 28: The method of any of embodiments 21 to 27, comprising at the trusted timing module, generating time stamps associated with a first user using a first standard time recognized by a first court system associated with the first user, and generating time stamps associated with a second user using a second standard time recognized by a second court system associated with the second user, in which the first and second users reside in different regions having different court systems.

Embodiment 29: The method of any of embodiments 21 to 28, comprising at the trusted identity module, verifying an identity of a user based on one or more of identifiers associated with the user, the identifiers including at least one of (i) a mobile phone number, (ii) a credit card number, (iii) a user ID associated with an online payment system, (iv) a user ID associated with an online shopping account, (v) a user ID associated with a music streaming or downloading account, (vi) a user IDS associated with a movie streaming or downloading account, (vii) a user ID associated with a messaging or chat account, (viii) a user ID associated with an online banking account, (ix) a user ID associated with a ride hailing service, (x) a user ID associated with an online food ordering service, (xi) a social security number, (xii) a driver's license number, (xiii) a passport number, (xiv) a user ID associated with an online gaming service, (xv) an ID issued by a government entity, (xvi) one or more fingerprints, (xvii) one or more voice prints, or (xviii) iris information.

Embodiment 30: The method of any of embodiments 21 to 29, comprising at the trusted identity module, verifying the identity of a first user using at least one of a first set of identifiers recognized by a first court system associated with the first user, and verifying the identity of a second user using at least one of a second set of identifiers recognized by a second court system associated with the second user, in which the first and second users reside in different regions having different court systems.

Embodiment 31: The method of any of embodiments 21 to 30, comprising at the trusted computing module, recording information associated with the user in compliance with privacy laws.

Embodiment 32: The method of any of embodiments 21 to 31, wherein providing the service comprises providing a shopping service to enable the user to search for information about a product provided by a seller and place an order for the product, and the method comprises invoking the trusted identity module to verify an identity of the user and an identity of the seller, and invoking the trusted timing module to verify a timing of placement of the order by the user.

Embodiment 33: The method of embodiment 32, comprising invoking the trusted computing module to update the blockchain, in which the blockchain is configured to include data representing online activities of the user associated with the placement of the order of the product.

Embodiment 34: The method of embodiment 33, comprising invoking the trusted computing module to update the blockchain to include data representing information shown to the user and each piece of information provided by the user to the seller after the user initiates a checkout process, an identity of the user, an identity of the seller, and a timing of the placement of the order.

Embodiment 35: The method of embodiment 34, wherein the information shown to the user after the user initiates the checkout process includes a description of the product that is being ordered, a price of the product, an identifier of the seller, a name of an entity to receive the product, a shipping address, and a message asking the user to confirm placement of the order.

Embodiment 36: The method of any of embodiments 21 to 35, wherein providing the service comprises providing a web browser configured to enable the user to view web pages on a network and save contents of one or more of the web pages in a storage, and the method comprises invoking the trusted identity module to verify an identity of the user, and invoking the trusted timing module to verify a timing that a web page has been viewed and/or saved by the user.

Embodiment 37: The method of embodiment 36, comprising invoking the trusted computing module to update the blockchain, in which the blockchain is configured to include data representing contents of web pages viewed and/or saved by the user, URLs of the web pages, an identity of the user, and time stamps showing when the web pages were viewed and/or saved by the user.

Embodiment 38: The method of any of embodiments 21 to 37, wherein providing the service comprises providing an online agreement signing service to enable two or more parties to enter into an agreement online, and the method comprises invoking the trusted identity module to verify identities of parties to the agreement, and invoking the trusted timing module to verify a timing of signing the agreement by each of the parties.

Embodiment 39: The method of embodiment 38, wherein the blockchain based application program invokes the trusted computing module to update the blockchain, in which the blockchain is configured to include data representing online activities of the parties associated with the signing of the agreement.

Embodiment 40: The method of embodiment 38 or 39, comprising invoking the trusted computing module to update the blockchain to include data representing (i) contents of the agreement signed by each party, (ii) modifications, if any, made to the agreement by each party, (iii) identity of each party signing the agreement, and (iv) time stamps shown when the agreement was signed by each party.

Figure 16:
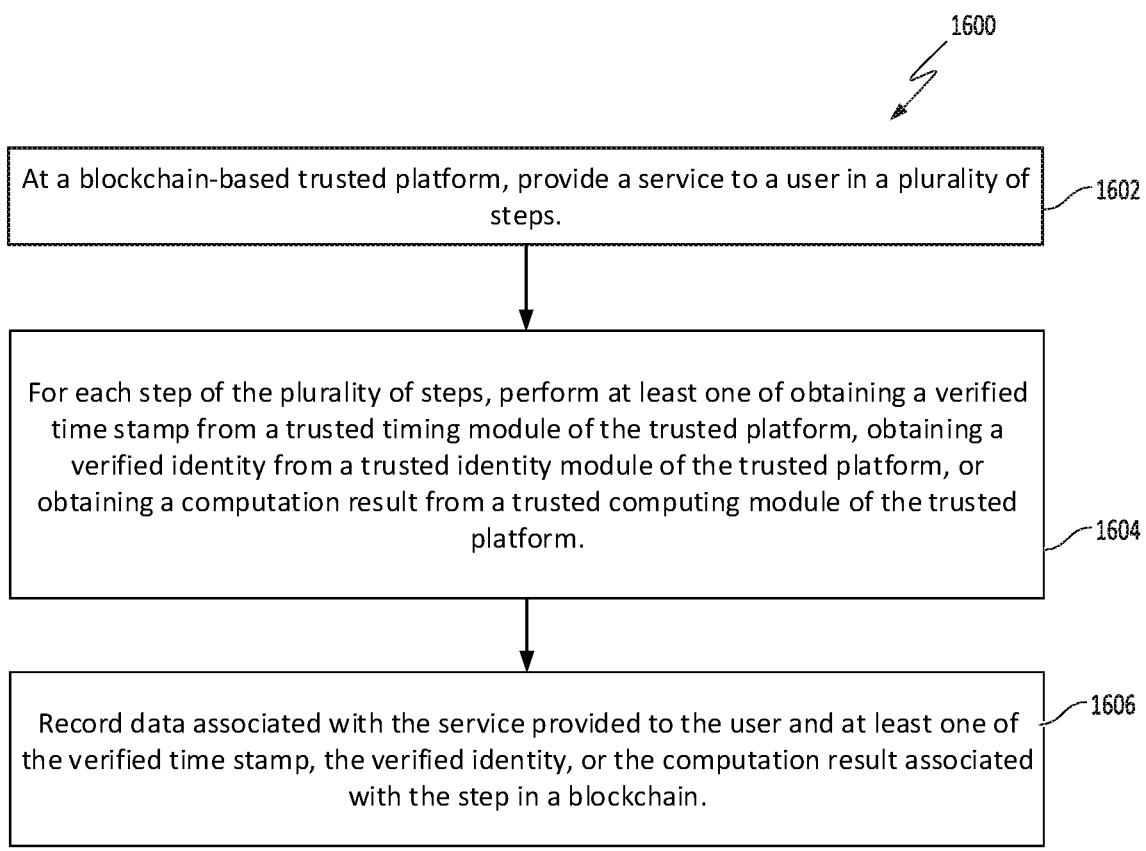
FIG. 16 is a flowchart illustrating yet another example of a process in accordance with embodiments of this specification.

FIG. 16 is a flowchart illustrating an example of a process 1600 that can be executed in accordance with embodiments of this specification. The process 1600 can be performed by one or more blockchain nodes or a computing device communicably coupled to the one or more blockchain nodes. For clarity of presentation, the description that follows generally describes process 1600 in the context of the other figures in this description. However, it will be understood that process 1600 can be performed, for example, by any system, environment, software, and hardware, or a combination of systems, environments, software, and hardware, as appropriate. In some embodiments, various steps of process 1600 can be run in parallel, in combination, in loops, or in any order.

At 1602, at a blockchain-based trusted platform, a service is provided to a user in a plurality of steps. In some embodiments, the service includes serving notice to another user. In some embodiments, the service includes providing potential dispute resolutions to two or more users having a dispute. In some embodiments, the service includes providing legal documentation. In some embodiments, the service includes execution of court ordered judgements.

At 1604, for each step of the plurality of steps, at least one of obtaining a verified time stamp from a trusted timing module of the trusted platform, obtaining a verified identity from a trusted identity module of the trusted platform, or obtaining a computation result from a trusted computing module of the trusted platform is performed.

In some embodiments, the trusted computing module is used to process blockchain data of the blockchain using one or more data processors having a TEE that is isolated from the one or more data processors' operating system and configured to provide enhanced confidentiality and integrity of code executing, and data loaded within, the one or more data processors. In some embodiments, a trusted component associated with provisioning of the service is executed in the trusted execution environment, and the plurality of steps of the service provided to the user and the at least one of the verified time stamp, the verified identity, or the computation result associated with each step of the plurality of steps are recorded in the blockchain. In some embodiments, executing the trusted component includes calculating hash values of data associated with the steps of the services provided to the user based on a hash algorithm.

In some embodiments, at a blockchain based application program of the trusted platform configured to provide the service to the user, functions of the trusted timing module, the trusted identity module, or the trusted computing module are invoked through a corresponding API associated with the trusted timing module, the trusted identity module, or the trusted computing module.

In some embodiments, the trusted timing module generates time stamps based on at least one of (i) national standard timing information, or (ii) timing information obtained from a global positioning system. In some embodiments, the trusted timing module generates time stamps associated with a first user using a first standard time recognized by a first court system associated with the first user, and generates time stamps associated with a second user using a second standard time recognized by a second court system associated with the second user, in which the first and second users reside in different regions having different court systems.

In some embodiments, the trusted identity module verifies an identity of a user based on one or more of identifiers associated with the user, in which the identifiers include at least one of (i) a mobile phone number, (ii) a credit card number, (iii) a user ID associated with an online payment system, (iv) a user ID associated with an online shopping account, (v) a user ID associated with a music streaming or downloading account, (vi) a user IDS associated with a movie streaming or downloading account, (vii) a user ID associated with a messaging or chat account, (viii) a user ID associated with an online banking account, (ix) a user ID associated with a ride hailing service, (x) a user ID associated with an online food ordering service, (xi) a social security number, (xii) a driver's license number, (xiii) a passport number, (xiv) a user ID associated with an online gaming service, (xv) an ID issued by a government entity, (xvi) one or more fingerprints, (xvii) one or more voice prints, or (xviii) iris information. In some embodiments, the trusted identity module verifies the identity of a first user using at least one of a first set of identifiers recognized by a first court system associated with the first user, and verifies the identity of a second user using at least one of a second set of identifiers recognized by a second court system associated with the second user, in which the first and second users reside in different regions having different court systems.

In some embodiments, the trusted computing module records information associated with the user in compliance with privacy laws.

At 1606, data associated with the service provided to the user and at least one of the verified time stamp, the verified identity, or the computation result associated with the step is recorded in a blockchain.

The process 1600 includes, optionally, in response to a request for a verified record associated with the service, providing the verified record of the plurality of steps performed by the application program and the at least one of the verified time stamp, the verified identity, or the computation result associated with each step of the plurality of steps.

In some embodiments, providing the service includes providing a shopping service to enable the user to search for information about a product provided by a seller and place an order for the product, the trusted identity module is invoked to verify an identity of the user and an identity of the seller, and the trusted timing module is invoked to verify a timing of placement of the order by the user. In some embodiments, the trusted computing module is invoked to update the blockchain, and the blockchain is configured to include data representing online activities of the user associated with the placement of the order of the product. In some embodiments, the trusted computing module is invoked to update the blockchain to include data representing information shown to the user and each piece of information provided by the user to the seller after the user initiates a checkout process, an identity of the user, an identity of the seller, and a timing of the placement of the order. In some embodiments, the information shown to the user after the user initiates the checkout process includes a description of the product that is being ordered, a price of the product, an identifier of the seller, a name of an entity to receive the product, a shipping address, and a message asking the user to confirm placement of the order.

In some embodiments, providing the service includes providing a web browser configured to enable the user to view web pages on a network and save contents of one or more of the web pages in a storage, the trusted identity module is invoked to verify an identity of the user, and the trusted timing module is invoked to verify a timing that a web page has been viewed and/or saved by the user. In some embodiments, the trusted computing module is invoked to update the blockchain, in which the blockchain is configured to include data representing contents of web pages viewed and/or saved by the user, URLs of the web pages, an identity of the user, and time stamps showing when the web pages were viewed and/or saved by the user.

In some embodiments, providing the service includes providing an online agreement signing service to enable two or more parties to enter into an agreement online, the trusted identity module is invoked to verify identities of parties to the agreement, and the trusted timing module is invoked to verify a timing of signing the agreement by each of the parties. In some embodiments, the blockchain based application program invokes the trusted computing module to update the blockchain, in which the blockchain is configured to include data representing online activities of the parties associated with the signing of the agreement. In some embodiments, the trusted computing module is invoked to update the blockchain to include data representing (i) contents of the agreement signed by each party, (ii) modifications, if any, made to the agreement by each party, (iii)

identity of each party signing the agreement, and (iv) time stamps shown when the agreement was signed by each party.

Figure 17:
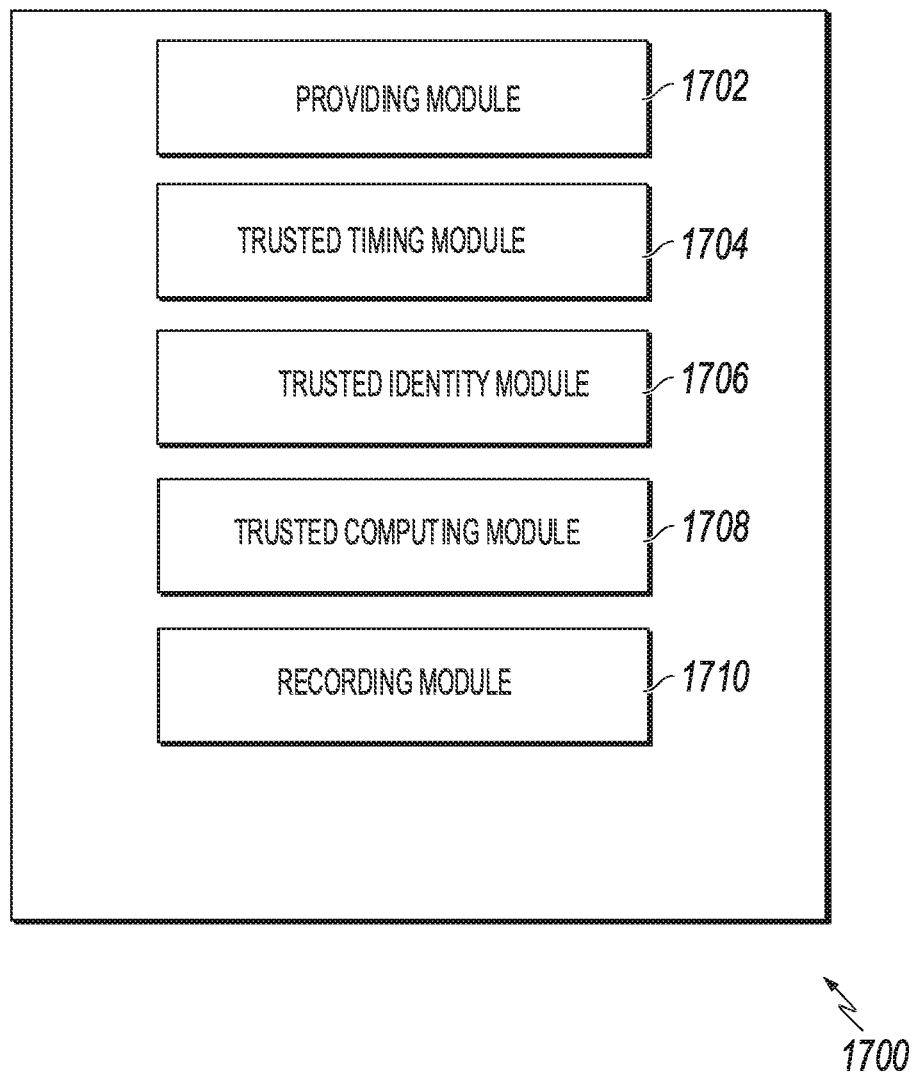
FIG. 17 depicts examples of modules of an apparatus in accordance with embodiments of this specification.

FIG. 17 is a diagram of an example of modules of an apparatus 1700 in accordance with embodiments of this specification. The apparatus 1700 can be an example of an embodiment of a blockchain-based trusted platform configured to provide a legal service to a user. The apparatus 1700 can correspond to the embodiments described above, and the apparatus 1700 includes the following: a providing module 1702 that provides a service to a user in a plurality of steps, a trusted timing module 1704 that provides a verified time stamp, a trusted identity module 1706 that provides a verified identity, a trusted computing module 1708 that provides a trusted computation result, and a recording module 1710 that records data associated with the service provided to the user and at least one of the verified time stamp, the verified identity, or the computation result associated with the step in a blockchain.

In an optional embodiment, the providing module 1702 includes a blockchain-based trusted platform, such as a blockchain-based trusted online platform.

In an optional embodiment, the apparatus 1700 further includes a providing module that, in response to a request for a verified record associated with the service, provides the verified record of the plurality of steps performed by an application program and the at least one of the verified time stamp, the verified identity, or the computation result associated with each step of the plurality of steps.

In an optional embodiment, the trusted computing module 1708 processes blockchain data of the blockchain using one or more data processors having a TEE that is isolated from the one or more data processors' operating system and configured to provide enhanced confidentiality and integrity of code executing, and data loaded within, the one or more data processors.

In an optional embodiment, the trusted computing module 1708 executes a trusted component associated with provisioning of the service in the trusted execution environment and records the plurality of steps of the service provided to the user and the at least one of the verified time stamp, the verified identity, or the computation result associated with each step of the plurality of steps in the blockchain.

In an optional embodiment, the trusted component calculates hash values of data associated with the steps of the services provided to the user based on a hash algorithm.

In an optional embodiment, the blockchain based trusted platform includes a blockchain-based application program that provides the service to the user, and the application program invokes functions of the trusted timing module 1704, the trusted identity module 1706, or the trusted computing module 1708 through a corresponding application programming interface (API) associated with the trusted timing module, the trusted identity module, or the trusted computing module.

In an optional embodiment, the trusted timing module 1704 generates time stamps based on at least one of (i) national standard timing information, or (ii) timing information obtained from a global positioning system.

In an optional embodiment, the trusted timing module 1704 generates time stamps associated with a first user using a first standard time recognized by a first court system associated with the first user, and generating time stamps associated with a second user using a second standard time recognized by a second court system associated with the second user, in which the first and second users reside in different regions having different court systems.

In an optional embodiment, the trusted identity module 1706 verifies an identity of a user based on one or more of identifiers associated with the user, in which the identifiers include at least one of (i) a mobile phone number, (ii) a credit card number, (iii) a user ID associated with an online payment system, (iv) a user ID associated with an online shopping account, (v) a user ID associated with a music streaming or downloading account, (vi) a user IDS associated with a movie streaming or downloading account, (vii) a user ID associated with a messaging or chat account, (viii) a user ID associated with an online banking account, (ix) a user ID associated with a ride hailing service, (x) a user ID associated with an online food ordering service, (xi) a social security number, (xii) a driver's license number, (xiii) a passport number, (xiv) a user ID associated with an online gaming service, (xv) an ID issued by a government entity, (xvi) one or more fingerprints, (xvii) one or more voice prints, or (xviii) iris information.

In an optional embodiment, the trusted identity module 1706 verifies the identity of a first user using at least one of a first set of identifiers recognized by a first court system associated with the first user, and verifies the identity of a second user using at least one of a second set of identifiers recognized by a second court system associated with the second user, in which the first and second users reside in different regions having different court systems.

In an optional embodiment, the trusted computing module 1708 records information associated with the user in compliance with privacy laws.

In an optional embodiment, the providing module 1702 provides a shopping service to enable the user to search for information about a product provided by a seller and place an order for the product, the trusted identity module 1706 is invoked to verify an identity of the user and an identity of the seller, and the trusted timing module 1704 is invoked to verify a timing of placement of the order by the user.

In an optional embodiment, the trusted computing module 1708 is invoked to update the blockchain, in which the blockchain is configured to include data representing online activities of the user associated with the placement of the order of the product.

In an optional embodiment, the trusted computing module 1708 is invoked to update the blockchain to include data representing information shown to the user and each piece of information provided by the user to the seller after the user initiates a checkout process, an identity of the user, an identity of the seller, and a timing of the placement of the order.

In an optional embodiment, the information shown to the user after the user initiates the checkout process includes a description of the product that is being ordered, a price of the product, an identifier of the seller, a name of an entity to receive the product, a shipping address, and a message asking the user to confirm placement of the order.

In an optional embodiment, the providing module 1702 provides a web browser configured to enable the user to view web pages on a network and save contents of one or more of the web pages in a storage, the trusted identity module 1706 is invoked to verify an identity of the user, and the trusted timing module 1704 is invoked to verify a timing that a web page has been viewed and/or saved by the user.

In an optional embodiment, the trusted computing module 1704 is invoked to update the blockchain, in which the blockchain is configured to include data representing contents of web pages viewed and/or saved by the user, URLs of the web pages, an identity of the user, and time stamps showing when the web pages were viewed and/or saved by the user.

In an optional embodiment, the providing module 1702 provides an online agreement signing service to enable two or more parties to enter into an agreement online, the trusted identity module 1706 is invoked to verify identities of parties to the agreement, and the trusted timing module 1704 is invoked to verify a timing of signing the agreement by each of the parties.

In an optional embodiment, the blockchain based application program invokes the trusted computing module to update the blockchain, in which the blockchain is configured to include data representing online activities of the parties associated with the signing of the agreement.

In an optional embodiment, the trusted computing module 1708 is invoked to update the blockchain to include data representing (i) contents of the agreement signed by each party, (ii) modifications, if any, made to the agreement by each party, (iii) identity of each party signing the agreement, and (iv) time stamps shown when the agreement was signed by each party.

Figure 18:
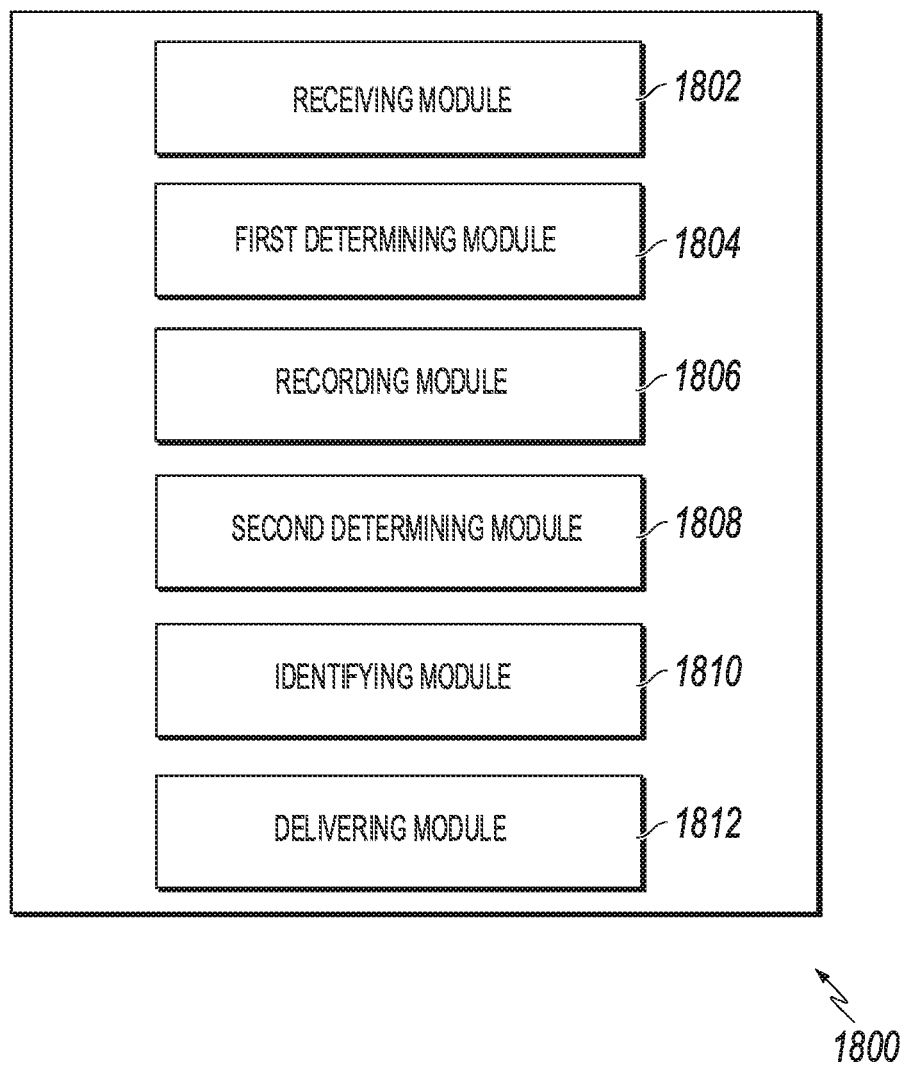
FIG. 18 depicts examples of modules of another apparatus in accordance with embodiments of this specification.

FIG. 18 is a diagram of an example of modules of another apparatus 1800 in accordance with embodiments of this specification. The apparatus 1800 can be an example of an embodiment of a blockchain node configured to implement service of process in a blockchain network. The apparatus 1800 can correspond to the embodiments described above, and the apparatus 1800 includes the following: a receiving module 1802 that receives a request generated based on a blockchain-based application for delivering a notice associated with a legal action from a serving party to a party to be served, wherein the request includes an identity associated with the serving party and an identity associated with the party to be served; a first determining module 1804 that determines that the serving party is a registered user of the blockchain-based application based on matching the identity of the serving party with an identity included in registration information of the serving party recorded on a blockchain; a recording module 1806 that records a time that the request is received on the blockchain; a second determining module 1808 that determines whether the party to be served is a registered user of the blockchain-based application based on the identity associated with the party to be served; an identifying module 1810 that identifies one or more manners of delivering the notice based on available communication methods included in the registration information of the serving party and registration information of the party to be served in response to determining that the party to be served is a registered user; and a delivering module 1812 that delivers the notice to the party to be served based on at least one of the one or more manners.

In an optional embodiment, the apparatus 1800 further includes the following: a sending sub-module that sends a notification to an account associated with the serving party in response to determining that the party to be served is not a registered user of the blockchain-based application.

In an optional embodiment, the apparatus 1800 further includes the following: a determining sub-module that determines whether the party to be served is logged on to an account registered with the blockchain-based application after delivering the notice to the party to be served; and a sending sub-module that sends a notification to an account associated with the serving party to notify that the notice is delivered in response to determining that the party to be served is logged on to the account registered with the blockchain-based application.

In an optional embodiment, the apparatus 1800 further includes the following: a sending sub-module that sends a notification to the account associated with the serving party to notify that the party to be served is offline in response to determining that the party to be served is not logged on to the account registered with the blockchain-based application.

In an optional embodiment, the apparatus 1800 further includes the following: an adding sub-module that adds the time, and a digital signature generated based on the time to the notice before delivering the notice to the party to be served.

In an optional embodiment, the apparatus 1800 further includes the following: a receiving sub-module that receives, from an account associated with the party to be served, an acknowledgement for accepting the notice from a serving party; a recording sub-module that records a time the acknowledgement is received on the blockchain; and a delivering sub-module that delivers the acknowledgement to the serving party based on the available communication methods included in the registration information of the serving party.

In an optional embodiment, the available communication methods comprise at least one of the following: e-mail, telephone call, or instant messaging.

Referring again to FIG. 18, it can be interpreted as illustrating an internal functional module and a structure of a blockchain service of process apparatus. The blockchain service of process apparatus can be an example of a blockchain node configured to implement service of process in a blockchain network. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification.

Described embodiments of the subject matter can include one or more features, alone or in combination. For example, in a first embodiment, a method for facilitating blockchain-based service of process performed by a blockchain node includes: receiving a request generated based on a blockchain-based application for delivering a notice associated with a legal action from a serving party to a party to be served, wherein the request comprises an identity associated with the serving party and an identity associated with the party to be served; determining that the serving party is a registered user of the blockchain-based application based on matching the identity of the serving party with an identity included in registration information of the serving party recorded on a blockchain; recording a time that the request is received on the blockchain; determining whether the party to be served is a registered user of the blockchain-based application based on the identity associated with the party to be served; in response to determining that the party to be served is a registered user, identifying one or more manners of delivering the notice based on available communication methods included in the registration information of the serving party and registration information of the party to be served; and delivering the notice to the party to be served based on at least one of the one or more manners.

The foregoing and other described embodiments can each, optionally, include one or more of the following features:

A first feature, combinable with any of the following features, specifies that the method further includes: in response to determining that the party to be served is not a registered user of the blockchain-based application, sending a notification to an account associated with the serving party.

A second feature, combinable with any of the previous or following features, specifies that the method further includes: determining whether the party to be served is logged on to an account registered with the blockchain-based application after delivering the notice to the party to be served; and in response to determining that the party to be served is logged on to the account registered with the blockchain-based application, sending a notification to an account associated with the serving party to notify that the notice is delivered.

A third feature, combinable with any of the previous or following features, specifies that the method further includes: in response to determining that the party to be served is not logged on to the account registered with the blockchain-based application, sending a notification to the account associated with the serving party to notify that the party to be served is offline.

A fourth feature, combinable with any of the previous or following features, specifies that the method further includes: adding the time, and a digital signature generated based on the time to the notice before delivering the notice to the party to be served.

A fifth feature, combinable with any of the previous or following features, specifies that the method further includes: receiving, from an account associated with the party to be served, an acknowledgement for accepting the notice from a serving party; recording a time the acknowledgement is received on the blockchain; and delivering the acknowledgement to the serving party based on the available communication methods included in the registration information of the serving party.

A sixth feature, combinable with any of the previous or following features, specifies that the available communication methods comprise at least one of the following: e-mail, telephone call, or instant messaging.

Figure 19:
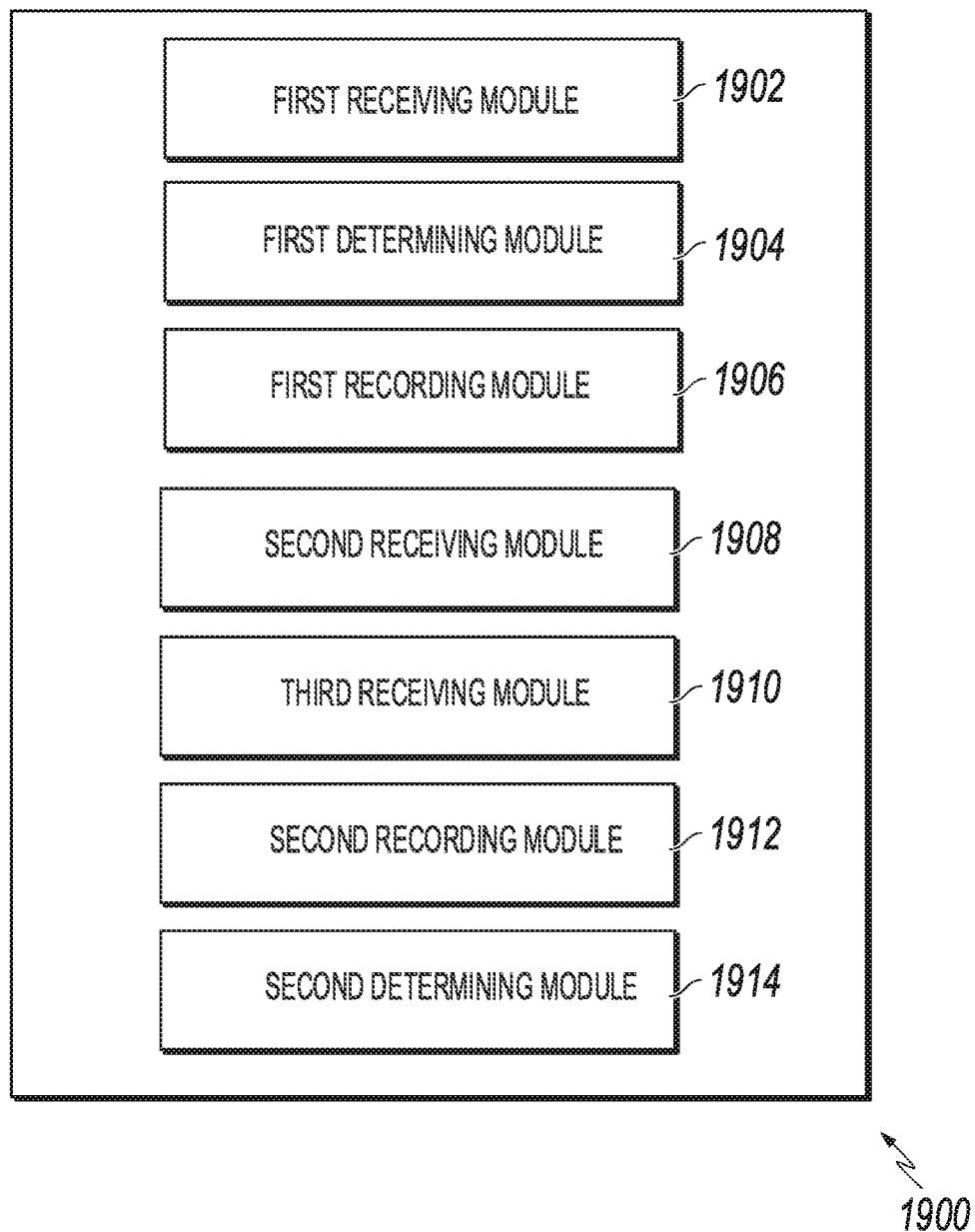
FIG. 19 depicts examples of modules of yet another apparatus in accordance with embodiments of this specification.

FIG. 19 is a diagram of on example of modules of yet another apparatus 1900 in accordance with embodiments of this specification. The apparatus 1900 can be an example of an embodiment of a blockchain node configured to perform a dispute resolution process in a blockchain network. The apparatus 1900 can correspond to the embodiments described above, and the apparatus 1900 includes the following: a first receiving module 1902 that receives a request for resolving a dispute between at least a first party and a second party, wherein the request comprises a first identity associated with the first party and a second identify associated with the second party; a first determining module 1904 that determines that the first party and the second party are registered users of the blockchain-based application based on matching the first identity with an identity included in registration information of the first party recorded on a blockchain and matching the second identity with an identity included in registration information of the second party recorded on the blockchain; a first recording module 1906 that records a time that the request is received on the blockchain; a second receiving module 1908 that receives one or more potential dispute solutions from one or more dispute solution providers that are registered on the blockchain-based application; a third receiving module 1910 that receives a first selection from the first party and a second selection from the second party, wherein the first selection comprises a first set of the one or more potential dispute solutions and the second selection comprises a second set of the one or more potential dispute solutions; a second recording module 1912 that records a time that the first selection is received on the blockchain and a time that the second selection is received on the blockchain; and a second determining module 1914 that determines at least one of (i) at least one common potential dispute solution between the first set of the one or more potential dispute solutions and the second set of the one or more potential dispute solutions, or (ii) that none of the potential dispute solutions are acceptable to the first and second parties.

In an optional embodiment, the request for resolving the dispute comprises a virtual asset and the apparatus 1900 further includes the following: a sending sub-module that sends the virtual asset to at least one of the one or more dispute solution providers that provides the at least one common dispute solution.

In an optional embodiment, the apparatus 1900 further includes the following: a first receiving sub-module that receives a first request from the first party for resolving the dispute, the first request comprising a first virtual asset; a second receiving sub-module that receives a second request from the second party for resolving the dispute, the second request comprising a second virtual asset; and a determining sub-module that determines the virtual asset based on one of the first virtual asset and the second virtual asset that has a higher value.

In an optional embodiment, the apparatus 1900 further includes the following: a removing sub-module that removes the virtual asset from a first account associated with the first party and a second account associated with the second party respectively; and a storing sub-module that stores the virtual asset removed from the first account and the second account on the blockchain.

In an optional embodiment, the apparatus 1900 further includes the following: a first determining sub-module that determines that there is no common dispute solution between the first set of the one or more dispute solutions and the second set of the one or more dispute solutions; a receiving sub-module that receives a dispute solution from a statutory authorization entity that is different from the dispute solution providers; a second determining sub-module that determines whether the dispute solution matches a dispute solution in the first set of the one or more dispute solutions and the second set of the one or more dispute solutions; a first sending sub-module that sends the virtual asset removed from the second account to a dispute solution provider that provides the dispute solution in the first set of the one or more dispute solutions in response to determining that the dispute solution most closely matches a dispute solution in the first set of the one or more dispute solutions; or a second sending sub-module that sends the virtual asset removed from the first account to a dispute solution provider that provides the dispute solution in the second set of the one or more dispute solutions in response to determining that the dispute solution most closely matches a dispute solution in the second set of the one or more dispute solutions.

In an optional embodiment, the first selection and the second selection are received from the first party and the second party respectively within a predetermined time window.

Referring again to FIG. 16, it can be interpreted as illustrating an internal functional module and a structure of a blockchain dispute resolution apparatus. The blockchain dispute resolution apparatus can be an example of a blockchain node configured to perform a dispute resolution process in a blockchain network. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification.

Described embodiments of the subject matter can include one or more features, alone or in combination. For example, in a first embodiment, a method for performing for blockchain-based dispute resolution process includes: at a blockchain-based application, receiving a request for resolving a dispute between at least a first party and a second party, wherein the request comprises a first identity associated with the first party and a second identify associated with the second party; determining that the first party and the second party are registered users of the blockchain-based application based on matching the first identity with an identity included in registration information of the first party recorded on a blockchain and matching the second identity with an identity included in registration information of the second party recorded on the blockchain; recording a time that the request is received on the blockchain; receiving one or more potential dispute solutions from one or more dispute solution providers that are registered on the blockchain-based application; receiving a first selection from the first party and a second selection from the second party, wherein the first selection comprises a first set of the one or more potential dispute solutions and the second selection comprises a second set of the one or more potential dispute solutions; recording a time that the first selection is received on the blockchain and a time that the second selection is received on the blockchain; and determining at least one of (i) at least one common potential dispute solution between the first set of the one or more potential dispute solutions and the second set of the one or more potential dispute solutions, or (ii) that none of the potential dispute solutions are acceptable to the first and second parties.

The foregoing and other described embodiments can each, optionally, include one or more of the following features:

A first feature, combinable with any of the following features, specifies that the request for resolving the dispute comprises a virtual asset, and the method comprises sending the virtual asset to at least one of the one or more dispute solution providers that provides the at least one common dispute solution.

A second feature, combinable with any of the previous or following features, specifies that the method further includes: receiving a first request from the first party for resolving the dispute, the first request comprising a first virtual asset; receiving a second request from the second party for resolving the dispute, the second request comprising a second virtual asset; and determining the virtual asset based on one of the first virtual asset and the second virtual asset that has a higher value.

A third feature, combinable with any of the previous or following features, specifies that the method further includes: removing the virtual asset from a first account associated with the first party and a second account associated with the second party respectively; and storing the virtual asset removed from the first account and the second account on the blockchain.

A fourth feature, combinable with any of the previous or following features, specifies that the method further includes: determining that there is no common dispute solution between the first set of the one or more dispute solutions and the second set of the one or more dispute solutions; receiving a dispute solution from a statutory authorization entity that is different from the dispute solution providers; determining whether the dispute solution matches a dispute solution in the first set of the one or more dispute solutions and the second set of the one or more dispute solutions; in response to determining that the dispute solution most closely matches a dispute solution in the first set of the one or more dispute solutions, sending the virtual asset removed from the second account to a dispute solution provider that provides the dispute solution in the first set of the one or more dispute solutions; or in response to determining that the dispute solution most closely matches a dispute solution in the second set of the one or more dispute solutions, sending the virtual asset removed from the first account to a dispute solution provider that provides the dispute solution in the second set of the one or more dispute solutions.

A fifth feature, combinable with any of the previous or following features, specifies that the first selection and the second selection are received from the first party and the second party respectively within a predetermined time window.

Figure 20:
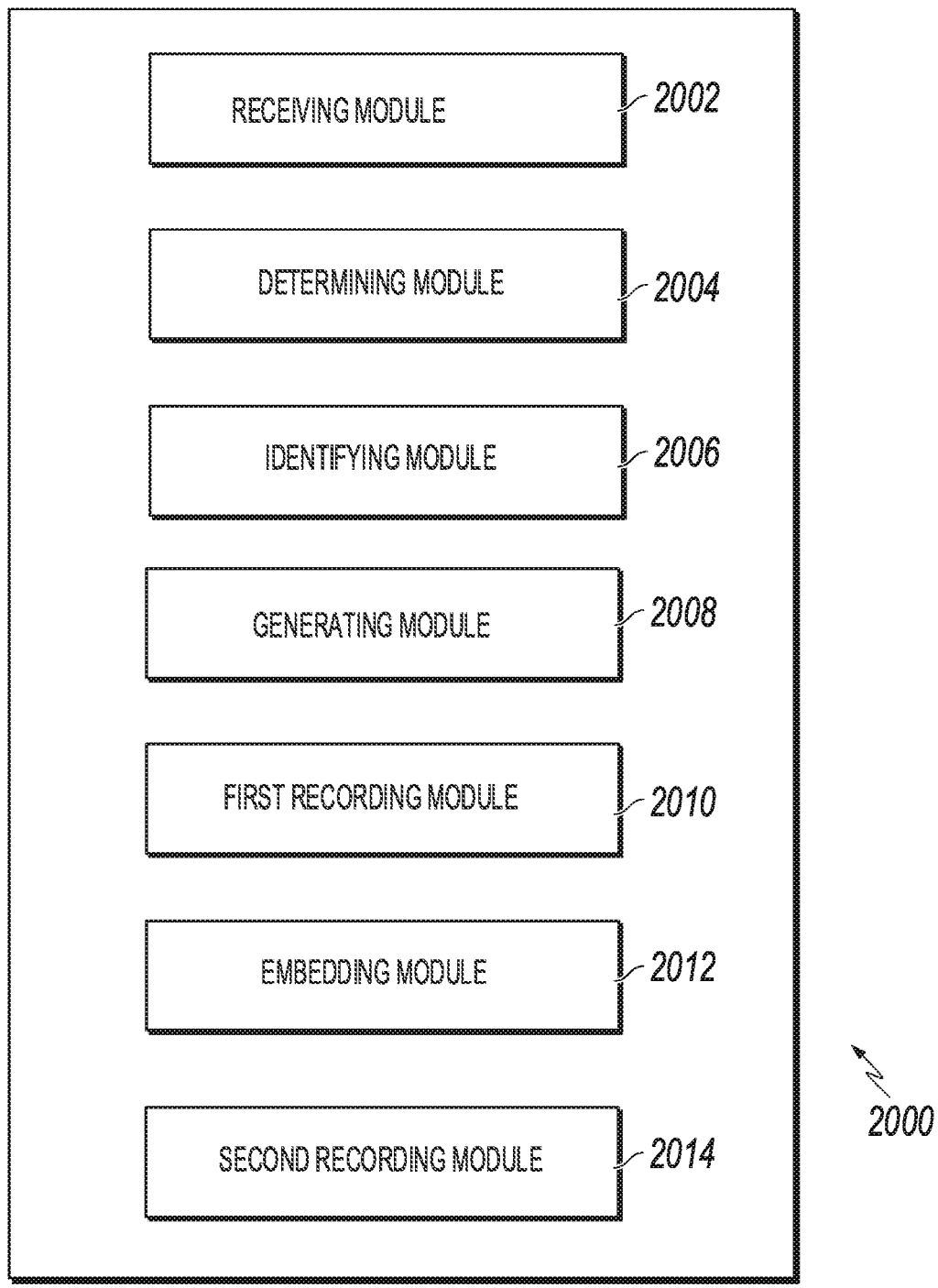
FIG. 20 depicts examples of modules of yet another apparatus in accordance with embodiments of this specification.

FIG. 20 is a diagram of on example of modules of yet another apparatus 2000 in accordance with embodiments of this specification. The apparatus 2000 can be an example of an embodiment of a blockchain node configured to process information. The apparatus 2000 can correspond to the embodiments described above, and the apparatus 2000 includes the following: a receiving module 2002 that receives a request for providing a service initiated from an account of a user associated with a blockchain-based application, wherein the request comprises an identity associated with the user; a determining module 2004 that determines that the user is a registered user of the blockchain-based application based on matching the identity with an identity included in registration information of the user associated with the blockchain-based application and recorded on a blockchain; an identifying module 2006 that identifies one or more electronic forms to be filled out and submitted in a plurality of steps for providing the service; a generating module 2008 that generates a unique identifier (ID) based on a time that the step is performed and digital content on the electronic form at the time, at each step of the plurality of steps; a first recording module 2010 that records the unique ID, the time, and the digital content on the blockchain, at each step of the plurality of steps; an embedding module 2012 that embeds the unique ID in the digital content at the time by changing one or more attributes associated with the digital content to be representative of the unique ID, wherein the embedding produces information-embedded digital content that enables retrieval of the time and the digital content from the blockchain based on the unique ID, at each step of the plurality of steps; and a second recording module 2014 that records the information-embedded digital content to the blockchain, at each step of the plurality of steps.

In an optional embodiment, the request is a first request, and the apparatus 2000 further includes the following: a receiving sub-module that receives a second request for handling the first request initiated from an account of a service provider associated with the blockchain-based application, wherein the second request comprises an identity associated with the service provider; and a determining sub-module determines that the service provider is a registered service provider of the blockchain-based application based on matching the identity associated with the service provider with an identity included in registration information of the service provider recorded on the blockchain.

In an optional embodiment, the plurality of steps are performed by the user and the service provider.

In an optional embodiment, at each step of the plurality of steps performed by the user, the unique ID is generated based on the time and the digital content on the electronic form filled in by the user at the time, and wherein the unique ID is embedded in the digital content filled in by the user.

In an optional embodiment, the unique ID is a first unique ID, and the apparatus 2000 further includes the following: a generating sub-module that generates a second unique ID based on the time that the step is performed and digital content on the electronic form filled in by the service provider at the time, at each step of the plurality of steps performed by the service provider, and an embedding sub-module that embeds the second unique ID in the digital content filled in by the service provider, at each step of the plurality of steps performed by the service provider.

In an optional embodiment, a visual difference between the electronic form and the information-embedded digital content is not apparent to an unaided human eye.

In an optional embodiment, the unique ID is generated based on at least one of a hash function or an asymmetric encryption.

In an optional embodiment, the embedding the unique ID is performed based on digital watermarking using one or more of a discrete wavelet transform, a discrete cosine transform, a singular value decomposition, a least significant bit, or undetectable steganography.

In an optional embodiment, the one or more attributes associated with the digital content include one or more of color, size, orientation, shape, and font of the digital content.

In an optional embodiment, the identity includes at least one of (i) a mobile phone number, (ii) a credit card number, (iii) a user ID associated with an online payment system, (iv) a user ID associated with an online shopping account, (v) a user ID associated with a music streaming or downloading account, (vi) a user IDS associated with a movie streaming or downloading account, (vii) a user ID associated with a messaging or chat account, (viii) a user ID associated with an online banking account, (ix) a user ID associated with a ride hailing service, (x) a user ID associated with an online food ordering service, (xi) a social security number, (xii) a driver's license number, (xiii) a passport number, (xiv) a user ID associated with an online gaming service, or (xv) an ID issued by a government entity.

Referring again to FIG. 20, it can be interpreted as illustrating an internal functional module and a structure of a blockchain information processing apparatus. The blockchain information processing apparatus can be an example of a blockchain node configured to implement information processing in a blockchain network. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification.

Described embodiments of the subject matter can include one or more features, alone or in combination. For example, in a first embodiment, a method for blockchain-based information processing performed by a blockchain node includes: receiving a request for providing a service initiated from an account of a user associated with a blockchain-based application, wherein the request comprises an identity associated with the user; determining that the user is a registered user of the blockchain-based application based on matching the identity with an identity included in registration information of the user associated with the blockchain-based application and recorded on a blockchain; identifying one or more electronic forms to be filled out and submitted in a plurality of steps for providing the service; at each step of the plurality of steps: generating a unique identifier (ID) based on a time that the step is performed and digital content on the electronic form at the time; at each step of the plurality of steps: recording the unique ID, the time, and the digital content on the blockchain; at each step of the plurality of steps: embedding the unique ID in the digital content at the time by changing one or more attributes associated with the digital content to be representative of the unique ID, wherein the embedding produces information-embedded digital content that enables retrieval of the time and the digital content from the blockchain based on the unique ID; and at each step of the plurality of steps: recording the information-embedded digital content to the blockchain.

The foregoing and other described embodiments can each, optionally, include one or more of the following features:

A first feature, combinable with any of the following features, specifies that the request is a first request, and the method further includes: receiving a second request for handling the first request initiated from an account of a service provider associated with the blockchain-based application, wherein the second request comprises an identity associated with the service provider; and determining that the service provider is a registered service provider of the blockchain-based application based on matching the identity associated with the service provider with an identity included in registration information of the service provider recorded on the blockchain.

A second feature, combinable with any of the previous or following features, specifies that the plurality of steps are performed by the user and the service provider.

A third feature, combinable with any of the previous or following features, specifies that at each step of the plurality of steps performed by the user, the unique ID is generated based on the time and the digital content on the electronic form filled in by the user at the time, and wherein the unique ID is embedded in the digital content filled in by the user.

A fourth feature, combinable with any of the previous or following features, specifies that the unique ID is a first unique ID, and the method further includes: at each step of the plurality of steps performed by the service provider: generating a second unique ID based on the time that the step is performed and digital content on the electronic form filled in by the service provider at the time; and at each step of the plurality of steps performed by the service provider: embedding the second unique ID in the digital content filled in by the service provider.

A fifth feature, combinable with any of the previous or following features, specifies that a visual difference between the electronic form and the information-embedded digital content is not apparent to an unaided human eye.

A sixth feature, combinable with any of the previous or following features, specifies that the unique ID is generated based on at least one of a hash function or an asymmetric encryption.

A seventh feature, combinable with any of the previous or following features, specifies that the embedding the unique ID is performed based on digital watermarking using one or more of a discrete wavelet transform, a discrete cosine transform, a singular value decomposition, a least significant bit, or undetectable steganography.

An eighth feature, combinable with any of the previous or following features, specifies that the one or more attributes associated with the digital content include one or more of color, size, orientation, shape, and font of the digital content.

A ninth feature, combinable with any of the previous or following features, specifies that the identity includes at least one of (i) a mobile phone number, (ii) a credit card number, (iii) a user ID associated with an online payment system, (iv) a user ID associated with an online shopping account, (v) a user ID associated with a music streaming or downloading account, (vi) a user IDS associated with a movie streaming or downloading account, (vii) a user ID associated with a messaging or chat account, (viii) a user ID associated with an online banking account, (ix) a user ID associated with a ride hailing service, (x) a user ID associated with an online food ordering service, (xi) a social security number, (xii) a driver's license number, (xiii) a passport number, (xiv) a user ID associated with an online gaming service, or (xv) an ID issued by a government entity.

Figure 21:
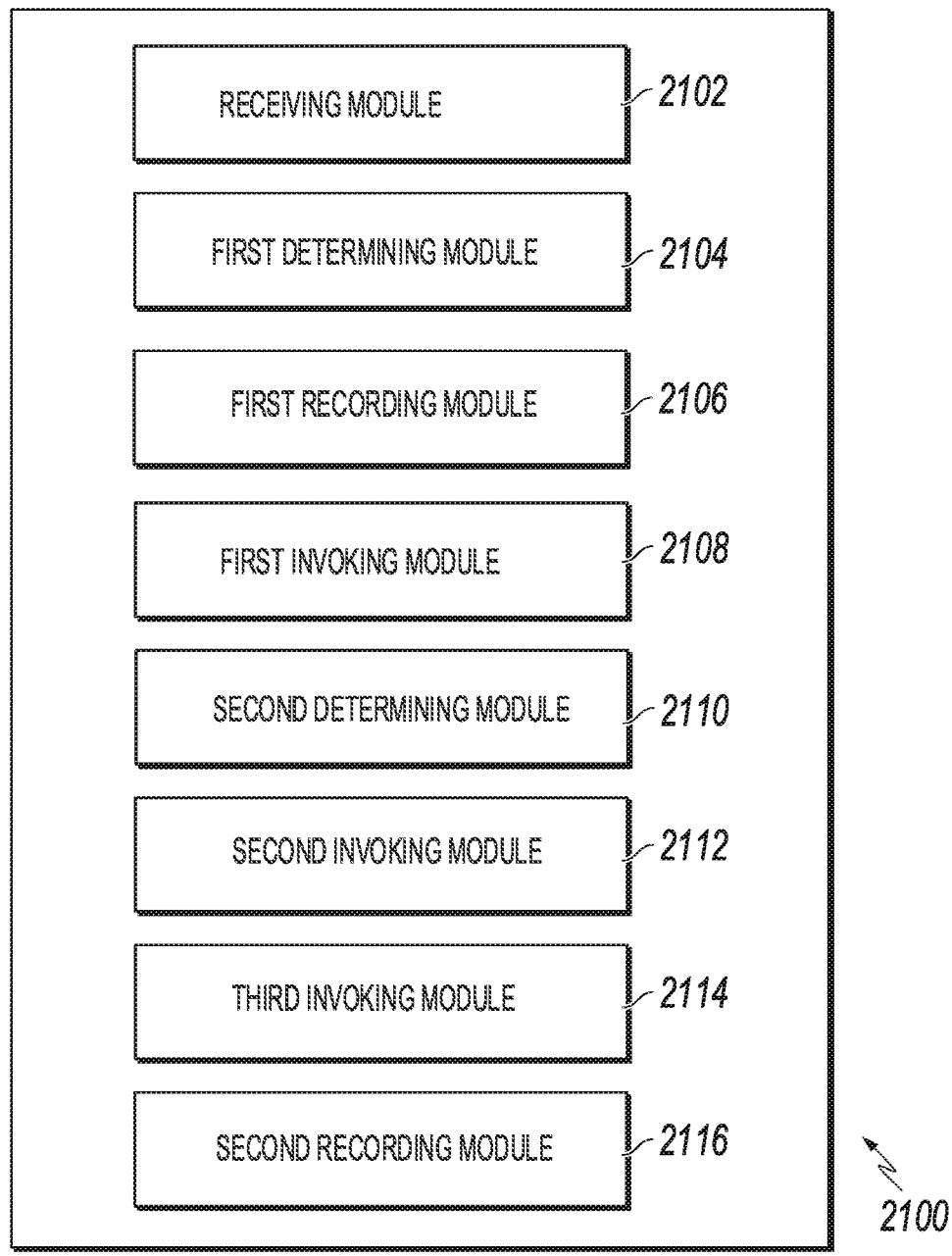
FIG. 21 depicts examples of modules of yet another apparatus in accordance with embodiments of this specification.

FIG. 21 is a diagram of on example of modules of yet another apparatus 2100 in accordance with embodiments of this specification. The apparatus 2100 can be an example of an embodiment of a blockchain node configured to handle court ordered judgements. The apparatus 2100 can correspond to the embodiments described above, and the apparatus 2100 includes the following: a receiving module 2102 that receives a request associated with an account of a blockchain-based application for collecting a monetary award issued in an order of a court, wherein the request comprises an identity associated with the account; a first determination module 2104 that determines that the order is authentic based on matching with a hash value associated with the order recorded on a blockchain; a first recording module 2106 that records a first verified time stamp representing a time the request is received on the blockchain; a first invoking module 2108 that invokes the trusted computing module to determine, based on parsing the order, a creditor of the monetary award, a debtor of the monetary award, and an amount of the monetary award; a second determining module 2110 that determines, based on the trusted identity module, that the account is associated with the creditor based on the identity and registration information of the account recorded on the blockchain; a second invoking module 2112 that invokes the trusted computing module to identify, based on the registration information, a payment account of the creditor and one or more payment accounts of the debtor with an aggregated balance greater than or equal to the amount of the monetary award; a third invoking module 2114 that invokes the trusted computing module to transfer the amount of the monetary award from the one or more payment accounts of the debtor to the payment account of the creditor; and a second recording module 2116 that records a second verified time stamp representing a time the amount of the monetary award is transferred.

In an optional embodiment, the apparatus 2100 further includes the following: a receiving sub-module that receives a second request associated with a second account of the blockchain-based application for recording the order of the court, wherein the second request comprises an identity associated with the second account, before receiving the first request, a determining sub-module that determines, based on the trusted identity module, that the second account is associated with the court based on the identity associated with the second account and registration information of the second account recorded on the blockchain, an invoking sub-module that invokes the trusted computing module to record the order on the blockchain as hash value of the order, and a recording sub-module that records a third verified time stamp representing a time the order is recorded on the blockchain.

In an optional embodiment, the apparatus 2100 further includes the following: an invoking sub-module that invokes the trusted computing module to seize an aggregated monetary amount equal to the amount of the monetary award from the one or more payment accounts.

In an optional embodiment, the apparatus 2100 further includes the following: an invoking sub-module that invokes the trusted computing module to determine, based on parsing the order, a deadline of enforcing the monetary award, wherein the trusted computing module is invoked to transfer the amount of the monetary award before the deadline.

In an optional embodiment, the trusted computing module is invoked to transfer the amount of the monetary award based on receiving an alert from a financial institution associated with the one or more payment accounts, and wherein the alert indicates that a withdrawal request or a money transfer request is initiated from the at least one of the one or more payment accounts.

Referring again to FIG. 21, it can be interpreted as illustrating an internal functional module and a structure of a blockchain judgement execution apparatus. The blockchain judgement execution apparatus can be an example of a blockchain node configured to implement judgement execution in a blockchain network. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification.

Described embodiments of the subject matter can include one or more features, alone or in combination. For example, in a first embodiment, a method for handling court ordered judgements performed by a blockchain node includes: receiving a request associated with an account of a blockchain-based application for collecting a monetary award issued in an order of a court, wherein the request comprises an identity associated with the account; determining, by a trusted identity module, that the order is authentic based on matching with a hash value associated with the order recorded on a blockchain; recording, by a trusted timing module, a first verified time stamp representing a time the request is received on the blockchain; invoking the trusted computing module to determine, based on parsing the order, a creditor of the monetary award, a debtor of the monetary award, and an amount of the monetary award; determining, based on the trusted identity module, that the account is associated with the creditor based on the identity and registration information of the account recorded on the blockchain; invoking the trusted computing module to identify, based on the registration information, a payment account of the creditor and one or more payment accounts of the debtor with an aggregated balance greater than or equal to the amount of the monetary award; invoking the trusted computing module to transfer the amount of the monetary award from the one or more payment accounts of the debtor to the payment account of the creditor; and recording, by the trusted timing module, a second verified time stamp representing a time the amount of the monetary award is transferred.

The foregoing and other described embodiments can each, optionally, include one or more of the following features:

A first feature, combinable with any of the following features, specifies that the request is a first request, the account is a first account, and the method further includes: before receiving the first request, receiving a second request associated with a second account of the blockchain-based application for recording the order of the court, wherein the second request comprises an identity associated with the second account; determining, based on the trusted identity module, that the second account is associated with the court based on the identity associated with the second account and registration information of the second account recorded on the blockchain; invoking the trusted computing module to record the order on the blockchain as hash value of the order; and recording, by the trusted timing module, a third verified time stamp representing a time the order is recorded on the blockchain.

A second feature, combinable with any of the previous or following features, specifies that the method further includes: invoking the trusted computing module to seize an aggregated monetary amount equal to the amount of the monetary award from the one or more payment accounts.

A third feature, combinable with any of the previous or following features, specifies that the method further includes: invoking the trusted computing module to determine, based on parsing the order, a deadline of enforcing the monetary award, wherein the trusted computing module is invoked to transfer the amount of the monetary award before the deadline.

A fourth feature, combinable with any of the previous or following features, specifies that the trusted computing module is invoked to transfer the amount of the monetary award based on receiving an alert from a financial institution associated with the one or more payment accounts, and wherein the alert indicates that a withdrawal request or a money transfer request is initiated from the at least one of the one or more payment accounts.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented system comprising:
an application layer comprising at least one blockchain-based application program configured to perform a plurality of steps to provide a service; and
a trusted service layer comprising a trusted timing module, a trusted identity module, and a trusted computing module to support the plurality of steps in the application layer, wherein for each step of at least some of the plurality of steps:
the at least one blockchain-based application program is configured to perform, at least one of obtaining a verified time stamp from the trusted timing module, obtaining a verified identity from the trusted identity module, or obtaining a computation result based on a processing of blockchain data using the trusted computing module; and
the trusted computing module is configured to record information about a corresponding step that is performed by the at least one blockchain-based application program and at least one of the verified time stamp, the verified identity, or the computation result in a blockchain; and
wherein the at least one blockchain-based application program is further configured to invoke the trusted computing module to update the blockchain to include data representing information shown to a user and each piece of information provided by the user to a seller after the user initiates a checkout process, wherein the information shown to the user comprises an identity of the user, an identity of the seller, and a timing of a placement of an order.

2. The computer-implemented system of claim 1, wherein the at least one blockchain-based application program comprises a trusted component that is configured to be executed in a trusted execution environment and record the plurality of steps performed by the at least one blockchain-based application program and the at least one of the verified time stamp, the verified identity, or the computation result associated with each step of the plurality of steps.

3. The computer-implemented system of claim 1, wherein the trusted computing module is configured to record information associated with a user in compliance with privacy laws.

4. A computer-implemented method comprising:
at a blockchain-based trusted platform, providing a service to a user in a plurality of steps:
for each step of the plurality of steps:
performing at least one of obtaining a verified time stamp from a trusted timing module of the blockchain-based trusted platform, obtaining a verified identity from a trusted identity module of the blockchain-based trusted platform, or obtaining a computation result from a trusted computing module of the blockchain-based trusted platform;
recording data associated with the service provided to the user and at least one of the verified time stamp, the verified identity, or the computation result associated with each step of the plurality of steps in a blockchain; and
updating the blockchain to include data representing information shown to the user and each piece of information provided by the user to a seller after the user initiates a checkout process, wherein the information shown to the user comprises an identity of the user, an identity of the seller, and a timing of a placement of an order.

5. The computer-implemented method of claim 4, comprising executing a trusted component associated with provisioning of the service in a trusted execution environment and recording the plurality of steps provided to the user and the at least one of the verified time stamp, the verified identity, or the computation result associated with each step of the plurality of steps in the blockchain.

* * * * *